United States Patent [19]
Kadowaki et al.

[11] Patent Number: 5,726,779
[45] Date of Patent: Mar. 10, 1998

[54] COLOR IMAGE PROCESSING APPARATUS

[75] Inventors: Toshihiro Kadowaki; Tetsuya Ohnishi, both of Yokohama; Yoshinori Ikeda, Tokyo, all of Japan

[73] Assignee: Canon Kabushiki Kaisha, Tokyo, Japan

[21] Appl. No.: 432,725

[22] Filed: May 2, 1995

Related U.S. Application Data

[60] Continuation of Ser. No. 977,787, Jan. 4, 1993, abandoned, which is a division of Ser. No. 230,741, Aug. 10, 1988, Pat. No. 5,194,945.

[30] Foreign Application Priority Data

Aug. 11, 1987 [JP] Japan ............................ 62-200592
Dec. 28, 1987 [JP] Japan ............................ 62-334976

[51] Int. Cl.[6] ............................................. G03S 3/08
[52] U.S. Cl. ................................. 358/520; 358/518
[58] Field of Search ................... ; 358/500, 520, 358/521, 531, 501, 518, 530; 382/162, 167; H04N 1/46

[56] References Cited

U.S. PATENT DOCUMENTS

| | | | |
|---|---|---|---|
| 4,204,728 | 5/1980 | Goshima et al. | 355/4 |
| 4,285,580 | 8/1981 | Murr | 351/35 |
| 4,472,736 | 9/1984 | Ushio et al. | 358/75 |
| 4,639,771 | 1/1987 | Hattori et al. | 358/80 |
| 4,649,423 | 3/1987 | Hoffrichter et al. | 358/80 |
| 4,670,778 | 6/1987 | Miyakawa | 358/75 |
| 4,689,666 | 8/1987 | Hatanaka | 358/75 |
| 4,717,954 | 1/1988 | Fujita et al. | 358/80 |
| 4,731,662 | 3/1988 | Udagawa et al. | 358/75 |
| 4,758,885 | 7/1988 | Sasaki et al. | 358/80 |
| 4,782,384 | 11/1988 | Tucker et al. | 358/80 |
| 4,813,570 | 3/1989 | Pontoppidan | 220/306 |
| 4,873,570 | 10/1989 | Suzuki et al. | 358/80 |
| 4,958,217 | 9/1990 | Kimura et al. | 358/75 |
| 4,989,079 | 1/1991 | Ito | 358/80 |
| 5,194,945 | 3/1993 | Kadowaki et al. | 358/75 |
| 5,296,946 | 3/1994 | Kadowaki et al. | 358/531 |
| 5,317,648 | 5/1994 | Sawada et al. | 382/162 |

FOREIGN PATENT DOCUMENTS

| | | | |
|---|---|---|---|
| 0145801 | 6/1985 | European Pat. Off. | H04N 1/46 |
| 0168818 | 1/1986 | European Pat. Off. | H04N 1/46 |
| 0269334 | 6/1988 | European Pat. Off. | H04N 1/46 |
| 0292212 | 11/1988 | European Pat. Off. | H04N 1/46 |
| 292212 | 11/1988 | European Pat. Off. | H04N 1/46 |
| 2069794 | 8/1981 | United Kingdom | H04N 1/46 |

*Primary Examiner*—Thomas D. Lee
*Assistant Examiner*—Jerome Grant, II
*Attorney, Agent, or Firm*—Fiztpatrick, Cella, Harper & Scinto

[57] ABSTRACT

A color image processing method and apparatus includes inputting a color image signal having at least two components, discriminating whether both of the two components meet respective predetermined conditions, and designating one of the two components to be more important than the other component for discrimination.

42 Claims, 75 Drawing Sheets

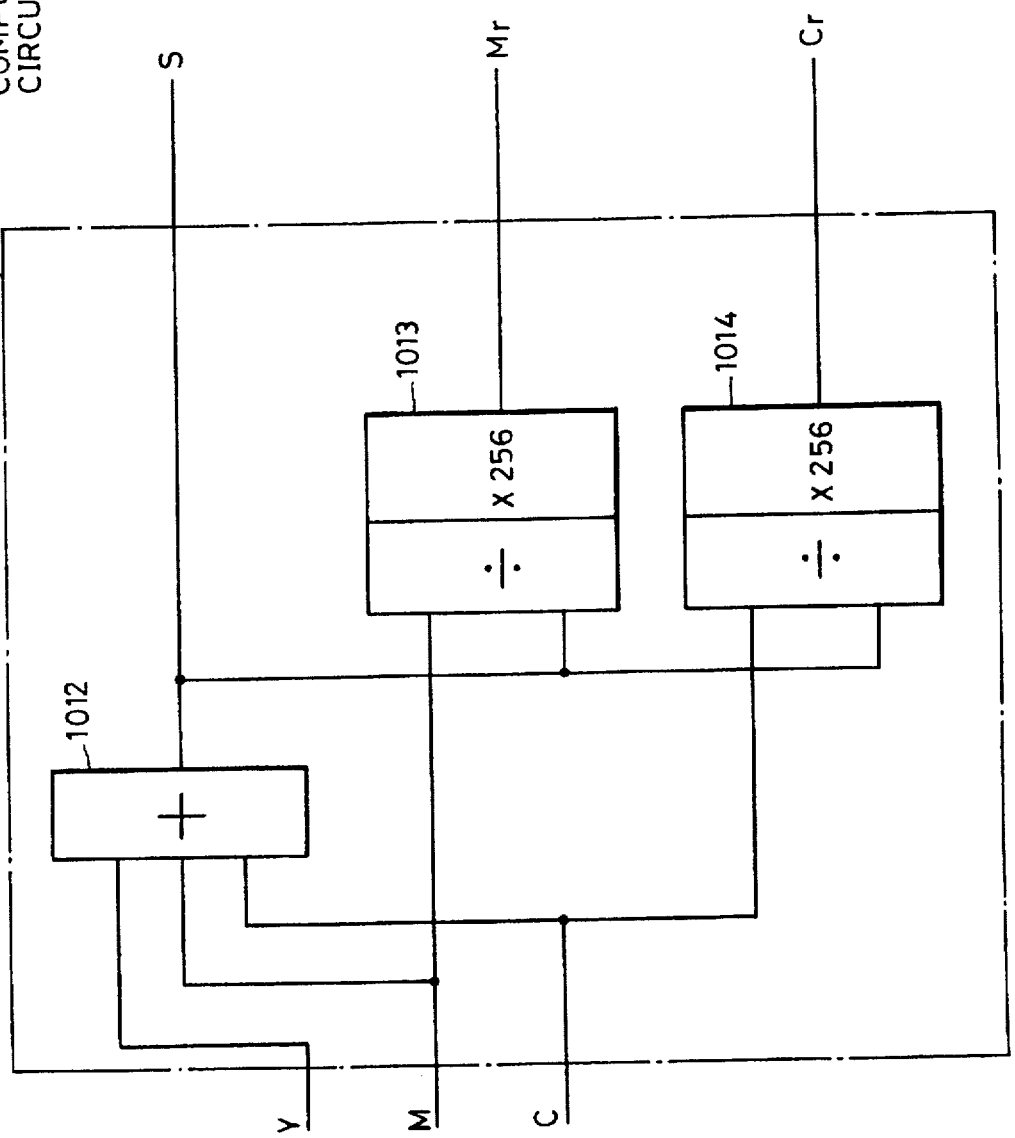

FIG. 11

| COMMAND NAME | CODE | FUNCTION |
|---|---|---|
| RESET COMMAND | 01H | COLD START AT 0 ADDRESS AFTER RECEIPT OF REST COMMAND AND AFTER A SERIES OF COMMUNICATION HAND SHAKE. |
| HOLD OFF COMMAND | 02H | MOTOR HOLDING STATE IS DISMISSED AND SCANNER FREE STATE ESTABLISHED BY STEPPING MOTOR CONTROLLER UPON RECEIPT OF THIS COMMAND. (POWER-ON STATE) |
| HOLD ON COMMAND | 03H | MOTOR HOLD STATE IS MAINTAINED BY STEPPING MOTOR CONTROLLER UPON RECEIPT OF THIS COMMAND. |
| H. P. SEARCH COMMAND | 04H | SCANNER MOVED TO H. P. SENSOR POSITION AFTER RECEIPT OF THIS COMMAND. (MOVING OPERATION CONSISTS OF THREE STATES) |
| SCAN COMMAND | 05H | THIS COMMAND IS TO APPOINT ORDINARY SCANNING MODE AND IS CONSTITUTED BY SUBSEQUENT 4-BYTE PARAMETER (SCAN LENGTH, MAGNIFICATION). SCANNER STARTED IN RESPONSE TO "START" SIGNAL UPON RECEIPT OF THIS COMMAND + SUBSEQUENT PARAMETER. THIS COMMAND IS MAINTAINED UNTIL IT IS RESET. DEFAULT VALUE IS A4 (210mm) REAL SIZE (100%). |
| MOVE TO APPOINTED POSITION COMMAND | 06H | THIS COMMAND IS FOR APPOINTING MOVING DISTANCES IN TWO DIRECTIONS FROM INSTANT POSITION. THIS COMMAND IS COMPLETED WITH SUBSEQUENT 2-BYTE PARAMETER. |

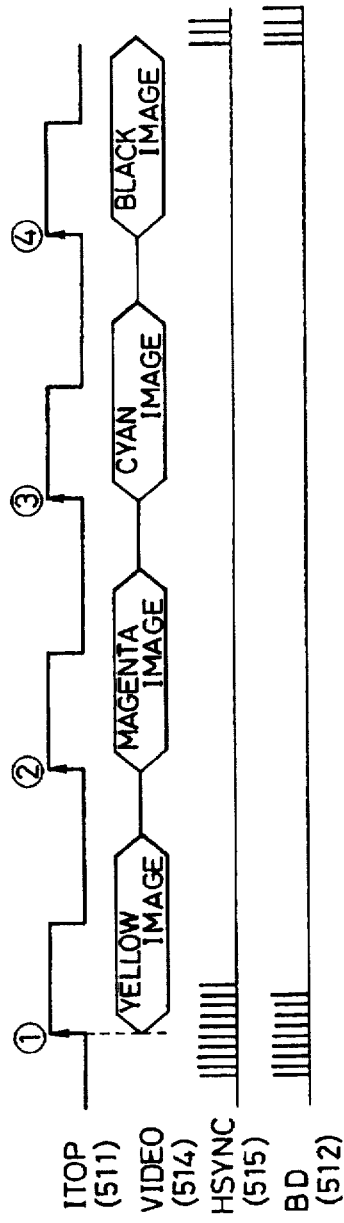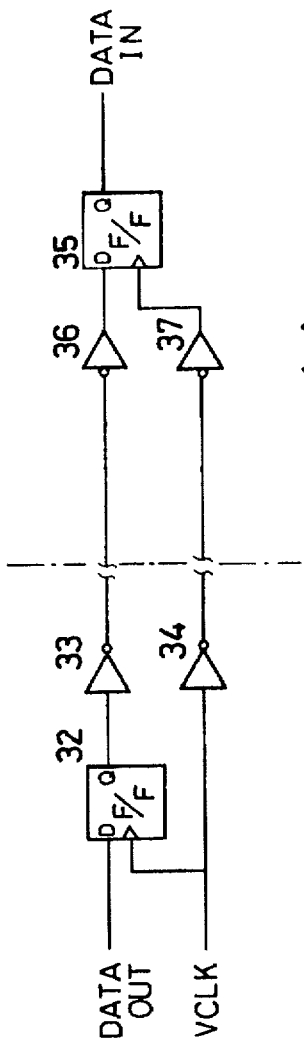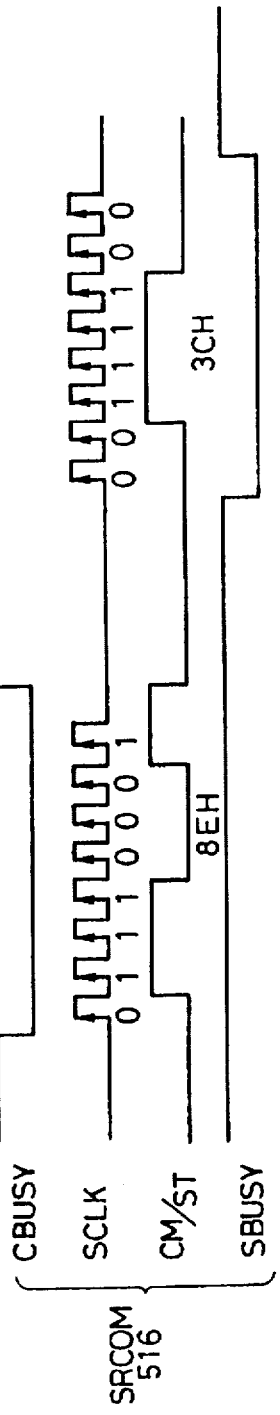

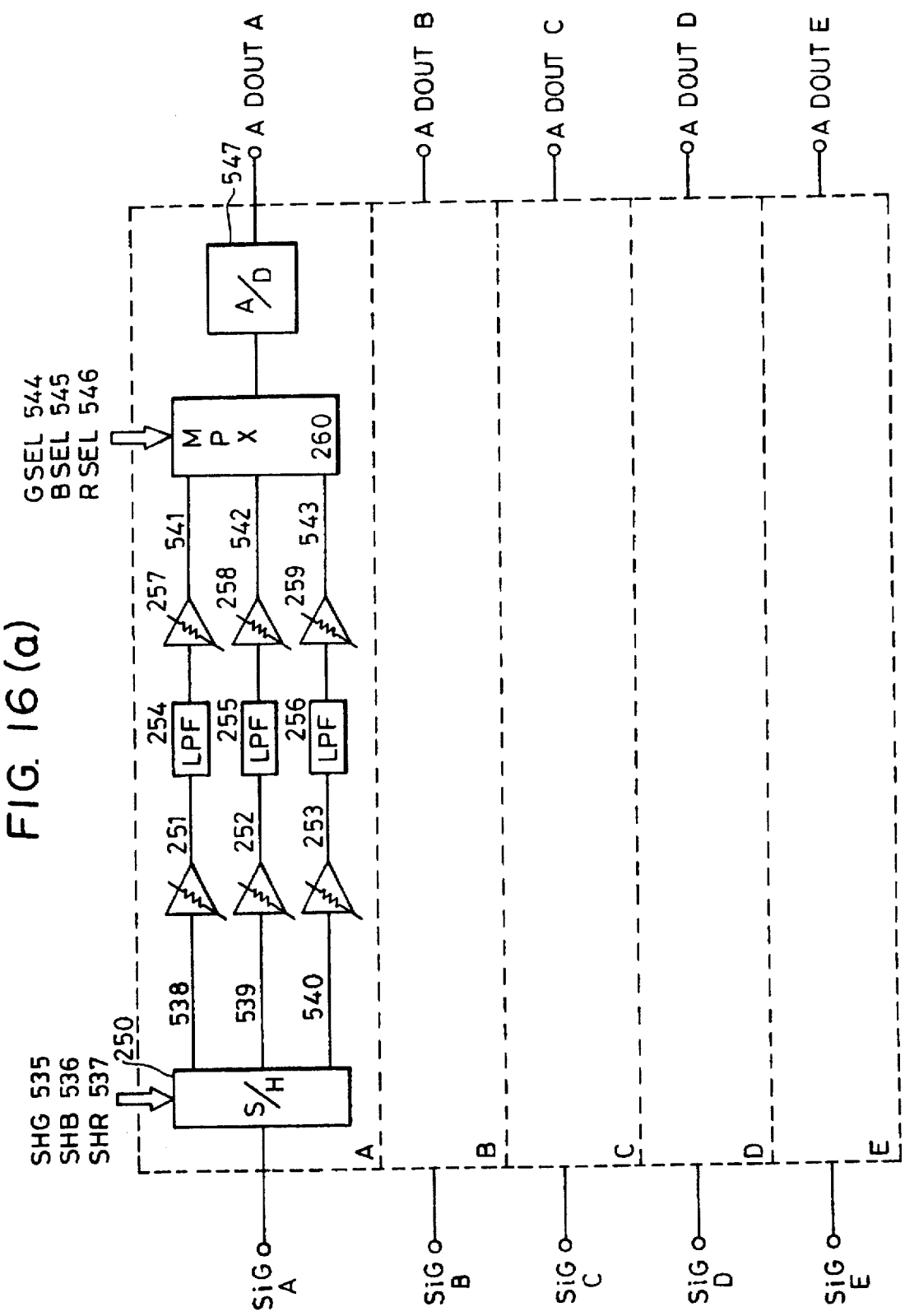

FIG. 22
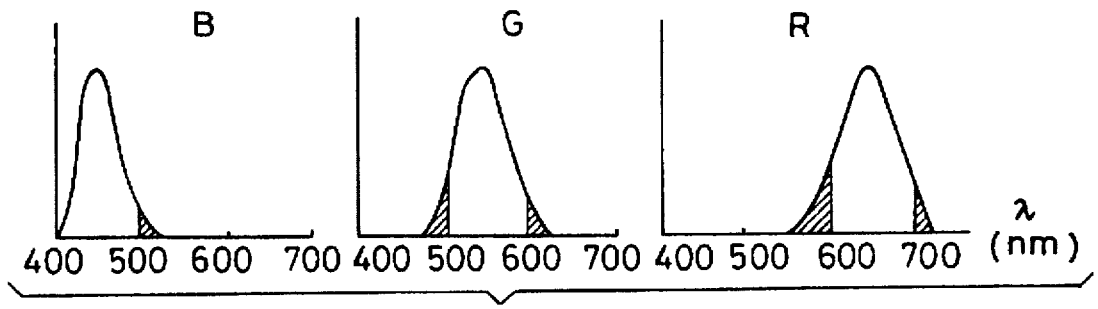
FIG. 23
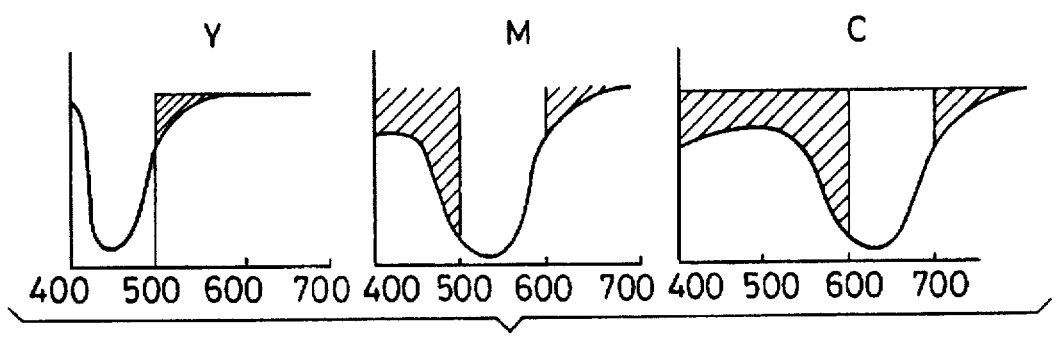
FIG. 24(b)
| C2 | C1 | C0 | a | b | c | | |
|----|----|----|-----|-----|-----|------|-----|
| 0 | 0 | 0 | 1a | 1b | 1c | Y | —① |
| 0 | 0 | 1 | 2a | 2b | 2c | M | —② |
| 0 | 1 | 0 | 3a | 3b | 3c | C | —③ |
| 0 | 1 | 1 | 4a | 4b | 4c | MONO | —④ |
| 1 | X | X | X | X | X | BK | —⑤ |

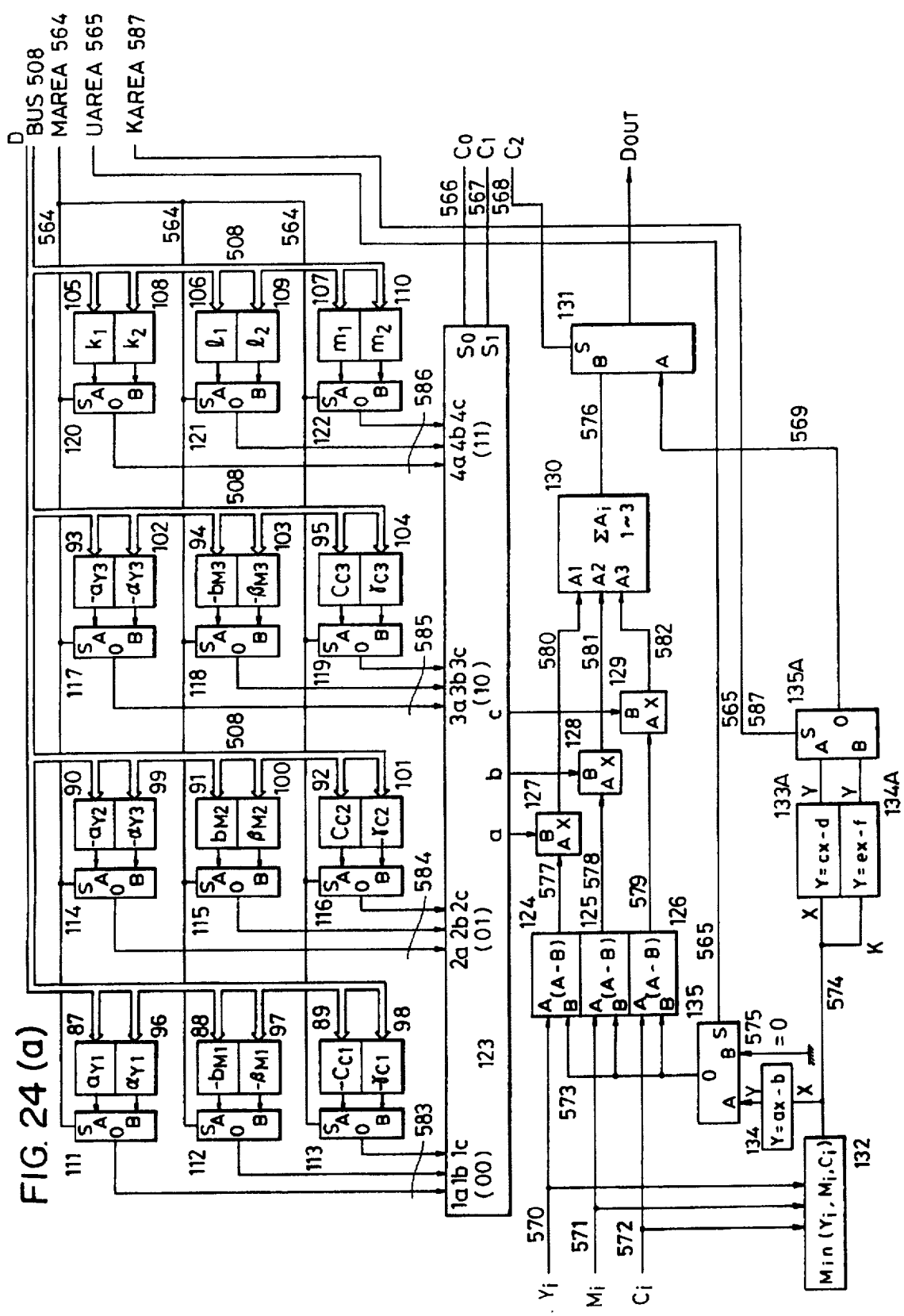

| BIT 0 | UAREA | 565 |
|---|---|---|
| 1 | KAREA | 587 |
| 2 | MAREA | 564 |
| 3 | GAREA | 626 |
| 4 | AWE | 628 |
| 5 | ARE | 632 |
| 6 | BWE | 629 |
| 7 | BRE | 633 |
| 8 | TMAREA | 660 |
| 9 | CHAREA 0 | 615 |
| 10 | CHAREA 1 | 665 |
| 11 | CHAREA 2 | 666 |
| 12 | CHAREA 3 | 667 |
| 13 | CHSEL 0 | 668 |
| 14 | CHSEL 1 | 669 |

| $S_0$ | $S_1$ | $S_2$ | $S_3$ | $\overline{0}$ |
|---|---|---|---|---|
| 1 | 1 | 0 | 0 | 1 |
| 1 | 1 | 0 | 1 | 2 |
| 1 | 1 | 1 | 0 | 3 |
| 0 | X | X | X | 4 |
| X | 0 | X | X | 4 |

Y . M . C . MONO

P430

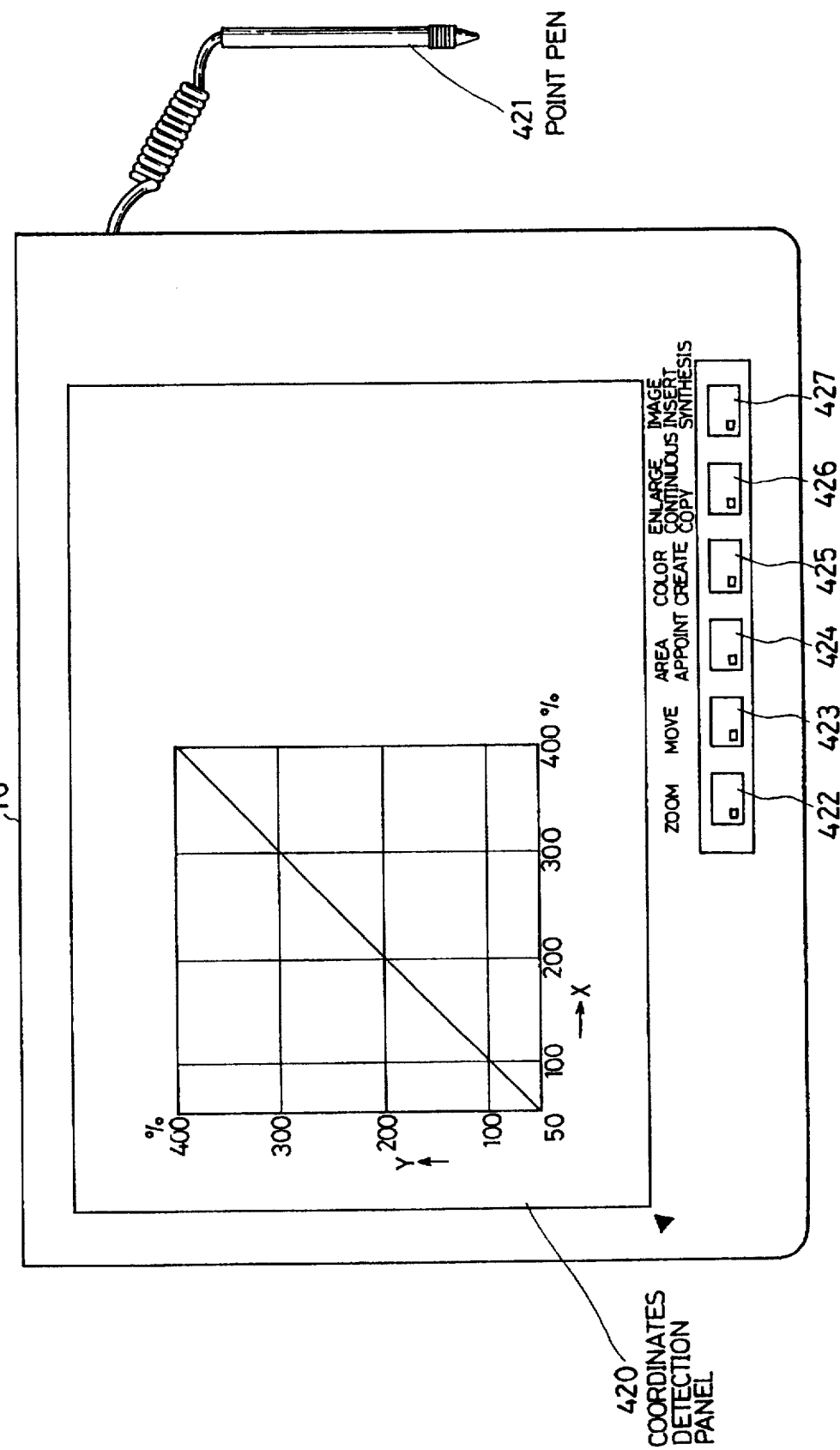

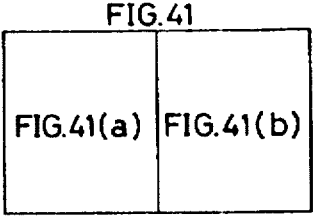
FIG.41(a)
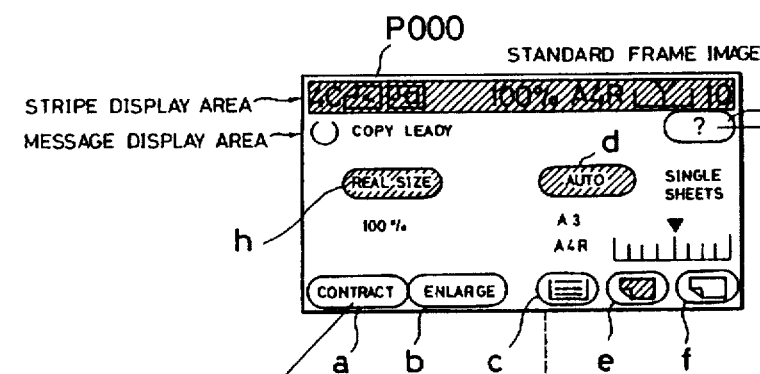
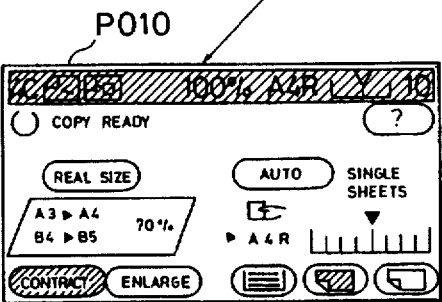
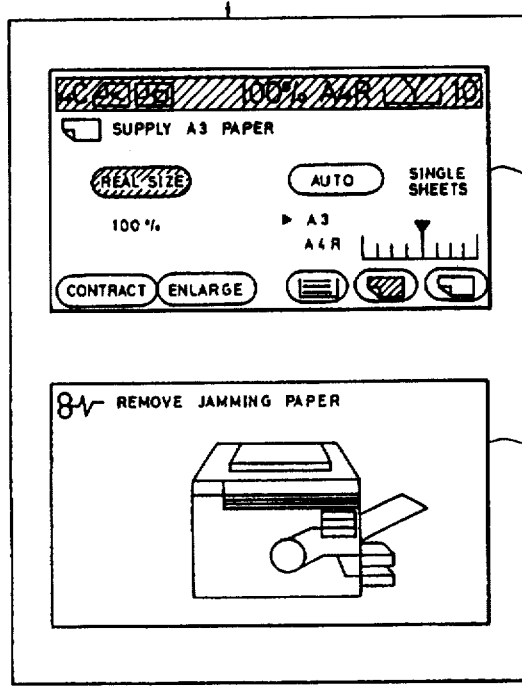

FIG.44(a)
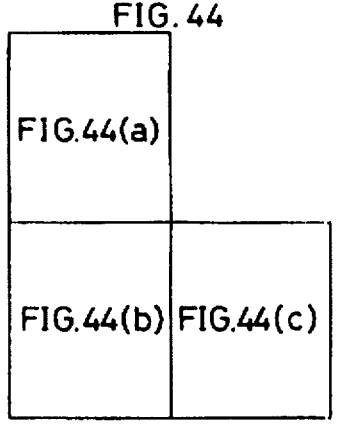
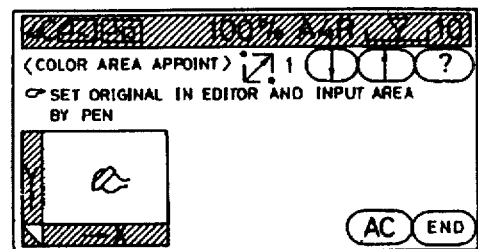
P300
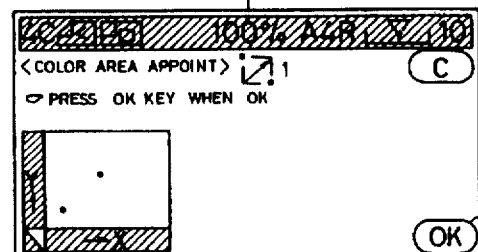
P310
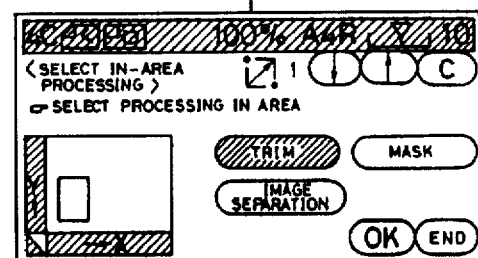
P320
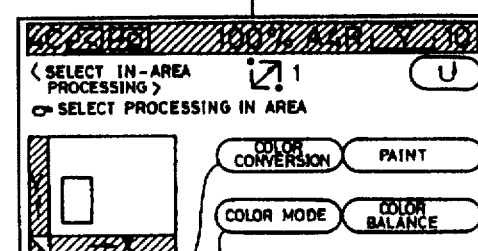
P330

FIG.44(b)
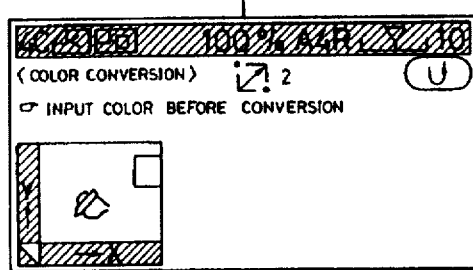
P340
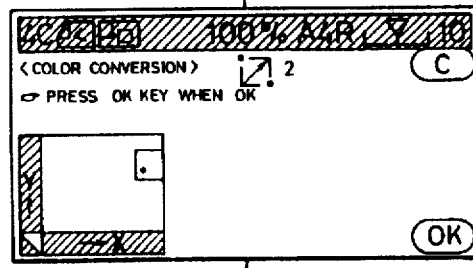
P341
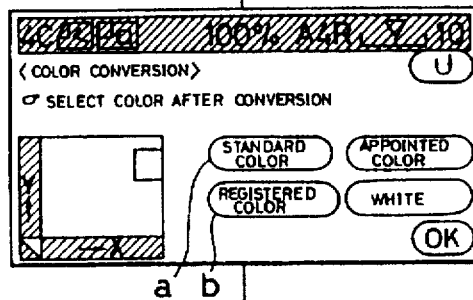
P370
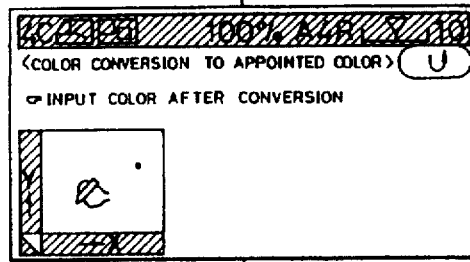
P380
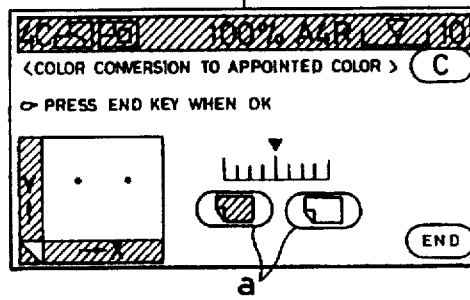
P381

FIG.44(c)
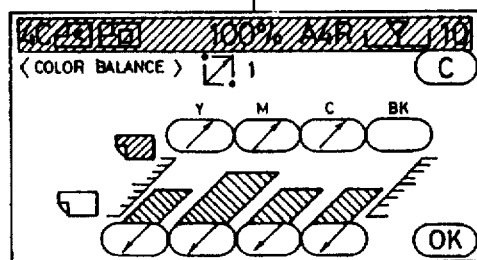
P350
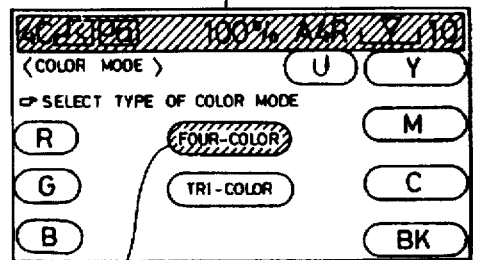
P360
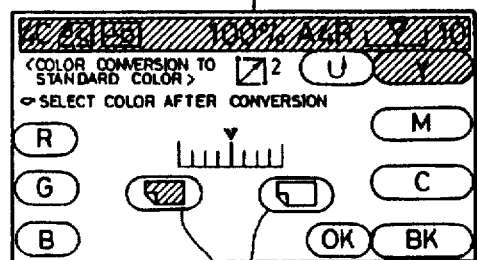
P390
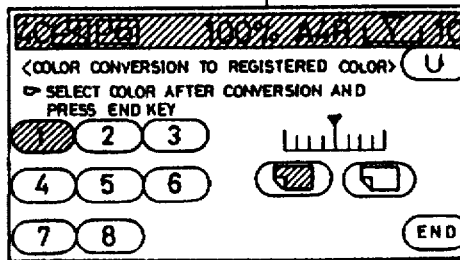
P391

FIG. 45(a)
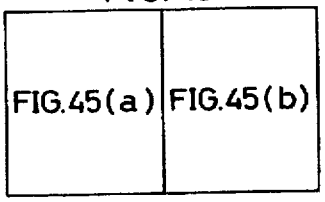
FIG. 45
| FIG.45(a) | FIG.45(b) |
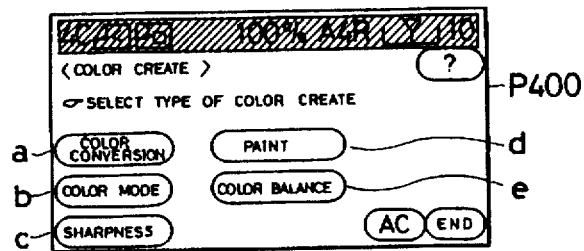
P400
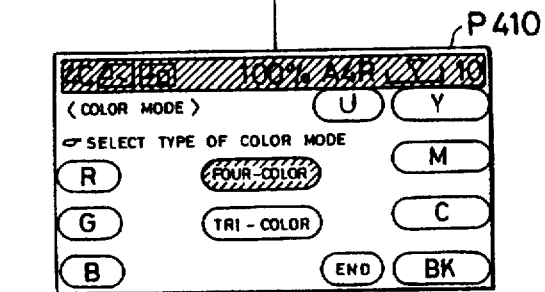
P410
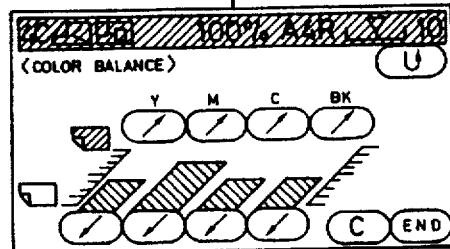
P420
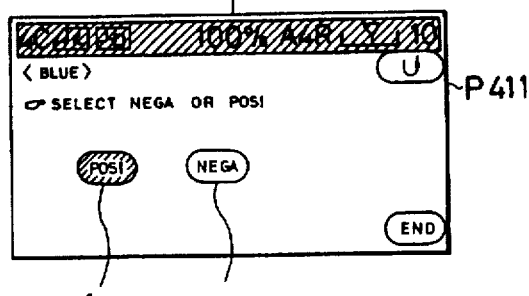
P411
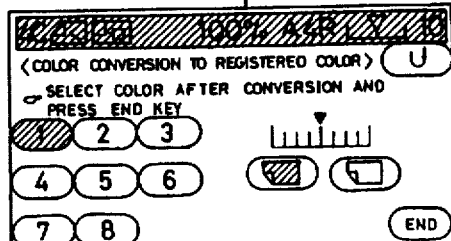
P451

FIG.53

| STANDARD COLOR | Y COMPONENT | M COMPONENT | C COMPONENT | Bk COMPONENT |
|---|---|---|---|---|
| Y | 80H | 00H | 00H | 00H |
| M | 00H | 80H | 00H | 00H |
| C | 00H | 00H | 80H | 00H |
| Bk | 00H | 00H | 00H | 80H |
| R | 80H | 80H | 00H | 00H |
| G | 80H | 00H | 80H | 00H |
| B | 00H | 80H | 80H | 00H |

COLOR IMAGE PROCESSING APPARATUS

This application is a continuation application of Ser. No. 07/977,787 filed Jan. 4, 1993, now abandoned, which is a division application of Ser. No. 07/230,741 filed Aug. 10, 1988 now U.S. Pat. No. 5,194,945.

BACKGROUND OF THE INVENTION

1. Field of the Invention

The present invention relates to a color image processing apparatus for processing color image data to alter characteristic of the color image into a different characteristic.

2. Description of the Prior Art

A digital color image processing apparatus has been known in which a specific color of a portion of an original is converted into a desired color in real time. In this known apparatus, colors are judged as being the same either on condition that the color component ratios of these colors are equal or that the color component densities of these colors are equal. This color conversion apparatus is disclosed, for example, in the specification of the U.S. Pat. No. 4,204,728 assigned to the present assignee. The present applicant also has proposed, in the specification of U.S. patent application Ser. No. 084,012, a device which enables a color to be converted into a variety of colors. An improvement in this device is disclosed in the specification of U.S. patent application Ser. No. 120,820.

In the known art in which the detection of a color is conducted on the basis of the color component density data, if the range of criteria for the density data is selected to be too narrow, there is a risk that two colors of the same hue are judged as being different colors due to the difference in the color component density data. In particular, in case of an image which is obtained through, for example, an image scanner, any edge portion between a region of a specific color and the white blank cannot be judged as being of this specific color, because in such an edge the density gradually changes though the hue is the same. On the other hand, if the range of criteria is selected to be too wide, colors of different hues may erroneously be judged as being the same color if the color judgment is conducted on the basis of the color component density data. Such an erroneous detection may occur particularly when a color component takes the maximum value in the range of criteria while another color takes the minimum value of the range.

The color judgment of the known art relying upon the color component ratio involves a problem in that the S/N ratio is so small that the color component ratio is seriously affected by noise to cause erroneous detection, particularly when the value of the input color image is small.

It is assumed here that a predetermined color has input values of R=200, G=100 and B=100, i.e., a color component ratio of R:G:B=2:1:1. In such a case, a color represented by R=2, G=1 and B=1 also is detected as being the predetermined color. Practically, however, an error on the order of ±2 inevitably occurs due to influence of noise. In consequence, the reliability of color detection is impaired particularly in the region where the density level is low.

In recent years, digital color copying machines have become popular. In a known digital color copying machine, a color original image is color-separated and digitally read. Image signals thus read are subjected to an image processing process which may include color correction and gradation correction, and the processed signals are delivered as image data to a color printer, whereby a color copy image is obtained. In this type of color copying machine, the gradation and density of the color image are determined by the values of color component data of the respective colors read from the original. On the other hand, in order to obtain a color copy image with a high degree of fidelity, it is necessary that the data concerning the color components constituting the color image, i.e., yellow, magenta, cyan and black, are processed in a well balanced condition so as to ensure a proper color balance. To comply with such a demand, correction is conducted by using, for example, a look-up table (LUT) such that appropriate balance of color components such as yellow, magneta, cyan and black is maintained over the entire density range, as illustrated in FIG. 61(a). When it is required to increase or decrease the image density over the whole area of the image, the characteristics of the LUTs of the respective colors are shifted. For instance, when it is required to increase the density, the characteristics of the LUTs are shifted in the direction A as shown in FIG. 61(b), whereas, when it is required to decrease the density, the LUT characteristics are shifted in the direction of the arrow B. Thus, conventional density control has relied upon simultaneous shift of characteristics of LUTs of all colors.

A discussion will be provided hereafter as to a case where a demand exists for a change in the density of a whole image having density characteristics as shown in FIG. 61(c). It is assumed here that a point on the original has color component data $(Y_1, M_1, C_1)$ and the inputs for the respective color components are changed by an equal amount. In response to such a change in the input, the image data is changed from $(Y_1, M_1, C_1)$ to $(Y_1+y, M_1+m, C_1+c)$.

The values y, m and c are different from one another as will be seen from FIG. 61(c) so that the balance between the color components such as yellow, magneta and cyan is undesirably changed as a result of the change in the density.

Thus, in the conventional system which makes use of independent conversion tables for the respective color components, a change in the density undesirably causes a change in the color, particularly when linear conversion characteristics are used. For instance, even in the case of an original of gray color, the color balance deviates from that of the original gray color, failing to reproduce the original gray color with a high degree of fidelity.

SUMMARY OF THE INVENTION

Accordingly, an object of the present invention is to provide a color image processing apparatus which is capable of overcoming each or all the problems of the prior art described above.

Another object of the present invention is to provide a color image processing apparatus which is suitable for use in a system for converting a color into a desired color, the apparatus being improved to ensure that the converted color is appointed with a high degree of accuracy.

To these ends, according to a preferred form of the present invention, there is provided a color image processing apparatus for converting a selected color in a color image data into a desired color, comprising extracting means for extracting density information and hue information with respect to said color image data; judging means for judging that a first difference which is the difference between the density information of said color image data and the density information concerning said selected color falls within a first predetermined range and that a second difference which is the difference between the hue information of said color image data and the hue information concerning said selected color falls within a second predetermined range; and a color conversion means for converting, into said desired color, such portion of said color image data that makes said first and second differences fall within said first and second ranges; whereby said color image date is converted into said desired color when the difference between the density information concerning said color image data and the density information concerning said selected color falls within said first range while the difference between the hue information of said color image data and the hue information of said selected color falls within said second range.

It is also an object of the present invention to provide a color image processing apparatus which can uniformly change the density of a whole color image without causing any change in the color balance.

It is still another object of the present invention to provide a color image processing apparatus for use in a system in which the hue of a selected color is appointed for the purpose of conversion of this color into a desired color, the apparatus being improved to eliminate such an error that a color of a hue different from that of the selected color is detected as being the same color as the selected color.

It is a further object of the present invention is to provide a color image processing apparatus in which a region of a predetermined hue can be detected without fail even when the density is low.

It is a still further object of the present invention is to provide a color image processing apparatus suitable for use in a color image reading system which is capable of reading and processing a color original image.

It is a still further object of the present invejtion to provide a color image processing apparatus suitable for use in a color image reproducing apparatus in which a color original image is read and converted into electrical signals and the thus obtained electrical signals are changed into a visible image.

It is a still further object of the present invention to provide a color image processing apparatus suitable for use in a color copying machine.

These and other objects, features and advantages of the present invention will become clear from the following description of the preferred embodiments when the same is read in conjunction with the accompanying drawings.

BRIEF DESCRIPTION OF THE DRAWINGS

FIG. 2 is a block diagram of a sum/ratio computing circuit in the embodiment shown in FIG. 1;

FIG. 11 is an illustration of a motor driver 15 and a CPU in FIG. 10;

FIG. 12(a) is a timing chart illustrating the timing of exchange of control signals between a reader section and a printer section;

FIG. 12(b) is a video signal delivery circuit connected between the reader section and the printer section;

FIG. 12(c) is a timing chart showing timings of various signals on a signal line SRCOM;

FIG. 13 shows how

FIG. 22 illustrates spectral characteristics of a reading sensor;

FIG. 23 illustrates spectral characteristics of developing color toners;

FIG. 24(a) is an illustration of a masking circuit, an inking circuit and a UCR circuit;

FIG. 24(b) is an illustration of the relationship between selection signals $C_0$, $C_1$ and $C_2$ and color signals;

FIG. 40 is a top plan view of a digitizer;

FIG. 41 is shows how FIGS. 41(a) and 41(b) are assembled to form illustration of a liquid crystal standard display frame;

FIG. 44 shows how FIGS. 44(a), 44(b) and 44(c) are assembled to form an illustration of manipulation in area appointing mode;

FIG. 45 shows how FIGS. 45(a), 45(b) are assembled to form an illustration of manipulation of the apparatus in color create mode;

FIG. 53 is an illustration of standard color components;

FIG. 57 shows how

DESCRIPTION OF THE PREFERRED EMBODIMENTS

Preferred embodiments of the present invention will be described hereinafter with reference to the accompanying drawings.

Although the following description is mainly focused on color image processing apparatus suitable for use in color copying machine, it is to be noted that the color image processing apparatus of the invention can be applied to various systems such as a system for forming a visual color image on a TV monitor.

Figure 1:
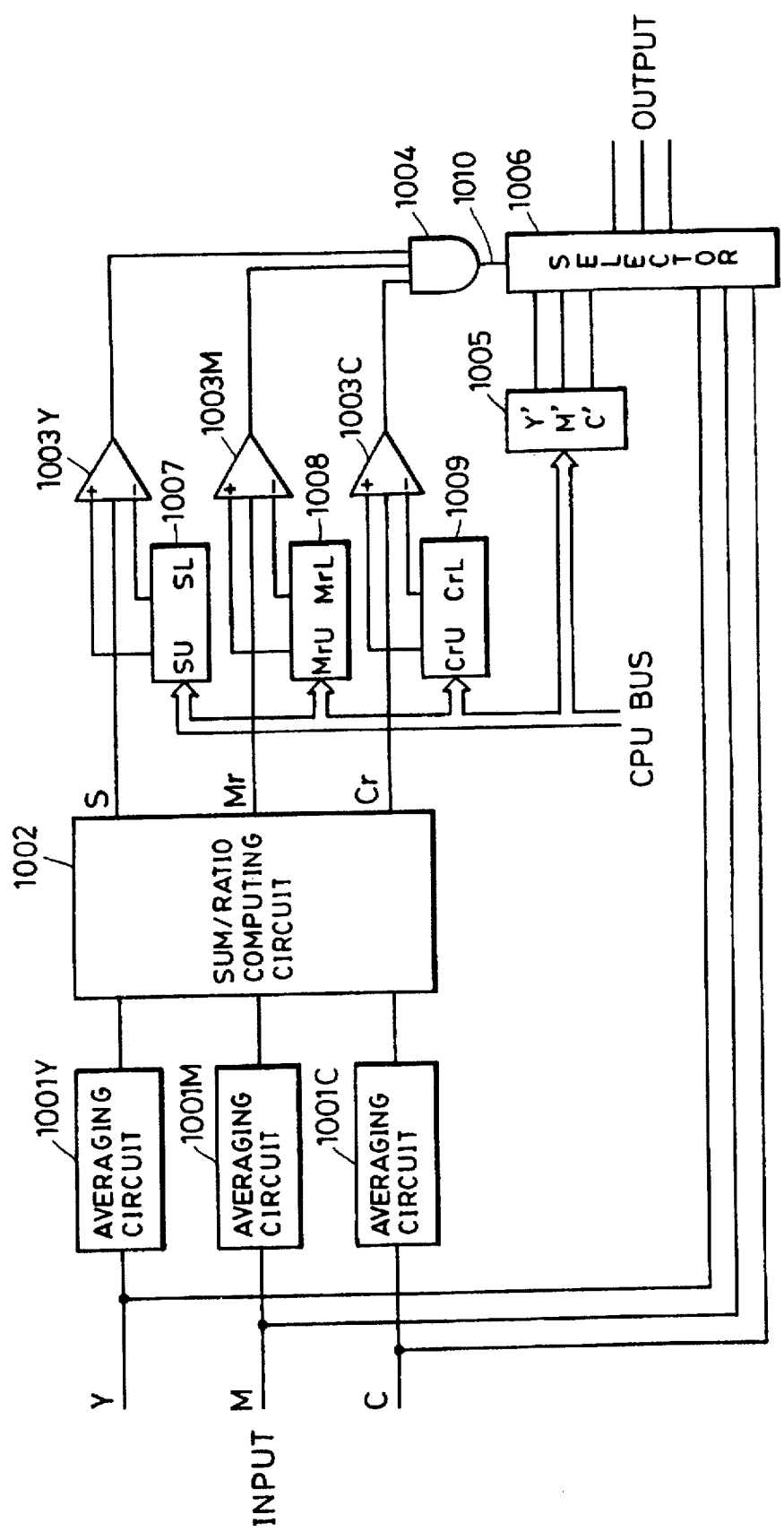
FIG. 1 is a block diagram of an embodiment of the present invention.

Referring to FIG. 1 which is a block diagram of a color conversion circuit embodying the present invention, Y, M and C density data as input data are signals which are formed by color-separating an original image into yellow, magenta and cyan components and digitizing these data. Averaging circuits 1001Y, 1001M and 1001C are designed to conduct averaging of density data for the respective color components over a plurality of pixels in a region which is centered on a specific pixel of interest. A sum/ratio computing circuit 1002 computes, on the basis of the averaged Y, M and C density data, the sum S of the Y, M and C density data, as well as magenta component ratio Mr and cyan component ratio Cr, in accordance with later-mentioned equations (1), (2) and (3). The sum/ratio computing circuit 1002 is an example of extracting means which extracts density information and hue information with respect to the color image data.

A window comparator 1003Y is a comparator which produces an output "1" when the sum S meets the following condition:

$$SL \ S \ SU$$

where, SU repesents the plus-side threshold, while SL represents the minus-side threshold. Comparators 1003M and 1003C have constructions similar to that of the comparator 1003Y.

The comparators 1003Y, 1003M and 1003C constitute an example of judging means which judges that a first difference which is the difference between density information of a color image data and the density information of a predetermined color falls within a first range and that a second difference which is the difference between the hue information of the color image data and the hue information of a predetermined color falls within a predetermined second range.

Registers 1007, 1008 and 1009 are registers for setting threshold values for the comparators 1003Y, 1003M and 1003C and are connected to a CPU (not shown) through CPUBUS. The registers 1007, 1008 and 1009 constitute an example of setting means for setting density information and color information.

An AND gate 1004 is a gate which forms a control signal 1010 from the logical product (AND) of the outputs from the comparators 1003Y, 1003M and 1003C. A register 1005 is designed to produce the data of desired color (color to be obtained after conversion) as Y', M' and C' density data. Thus, the register 1005 produces the Y', M' and C' density data as desired in accordance with the instruction given by the CPU mentioned above.

The selector 1006 is designed to select and output either the Y', M' and C' converted density data or the Y, M and C data before the conversion. The selector 1006 therefore is an example of a color conversion means which converts a color image data having the first and the second differences falling within the first and the second predetermined ranges into the above-mentioned desired color.

The Y, M and C density data which are input image data are averaged by the averaging circuits 1001Y, 1001M, and 1001C in order to produce an average value of the outputs from the pixels in a predetermined region around a pixel of interest, to eliminate any error which may be incurred when, for example, the input image data is half-tone image. It will be understood that the averaging operation eliminates any error in the color detection which may be caused by inputting of a half-tone image. Subsequently, the sum/ratio computing circuit 1002 outputs the sum S, ratio data Mr and the ratio data Cr for every unit number of pixels. The sum S and the ratio data Mr and Cr are determined in accordance with the following equations (1), (2) and (3).

$$S = Y + M + C \qquad (1)$$

$$Mr = M \times 256 / (Y + M + C) = M \times 256 / S \qquad (2)$$

$$Cr = C \times 256 / (Y + M + C) = C \times 256 / S \qquad (3)$$

As will be clearly understood from the equations (2) and (3), the ratio data Mr and Cr are never changed even if the density of the input color is changed, provided that the hue is unchanged, i.e., if the ratio of the megenta density data M and the ratio of the cyan density data C with respect to the sum S are unchanged.

The ratio data Yr concerning the ratio of the yellow component is given by the following equation.

$$Yr = Y \times 256 / (Y + M + C) = 256 - M \times 256 / (Y + M + C) - C \times 256 / (Y + M + C) = 256 - Mr - Cr$$

From this fact, it is derived that two colors having the same values of the magneta ratio data Mr and the cyan ratio data Cr are of the same hue. This means that detection of ratio data concerning two color components is enough for the purpose of identification of color. The sum S is the sum of the density levels of the respective color components. Thus, the sum S is "0" when the input color is white and takes the maximum value when the input color is black.

FIG. 2 is a block diagram showing the construction of an example of the sum/ratio computing circuit used in the embodiment shown in FIG. 1. This circuit includes an adder circuit 1012 and table conversion ROMs 1013 and 1014. The Y, M and C density data are added by the adder circuit 1012 in accordance with the equation (1) so that the sum S is output and is used as address data which is input to the ROMs 1013 and 1014.

On the other hand, the M and C density data are input as the addresses for the ROM 1013 and 1014 so that data corresponding to the values determined by the equations (2) and (3) are read from the tables set in these ROMs and are output as ratio data Mr and Cr.

The sum S and the ratio data Mr and Cr output from the computing circuit 1002 are input to the comparators 1003Y, 1003m and 1003C. The color corresponding to the input image data is judged as being the color to be converted, on condition that the outputs from all the comparators 1003Y, 1003m and 1003C are "1".

The sum S and the ratio data Mr and Cr concerning the desired color (color which the operator wishes to convert) are determined beforehand and ranges are set beforehand which contain these determined values and which provide crireria for identification of a color, i.e., such ranges that colors falling therein can be regarded as being the same color. These ranges will be referred to as "color judging criterion ranges". The setting of these ranges is conducted by setting the respective upper and lower limit values of these ranges in the registers 1007, 1008 and 1009 by means of the CPU. In case of the sum S, the upper and lower limit values are the threshold levels SU and SL. Similarly, threshold levels MrU and MrL are the upper and lower limit values for the ratio data Mr, and threshold values CrU and CrL are the upper and lower limit values for the ratio data Cr. Practical means for setting such limit values will be explained later.

If the color judging criterion range is selected to be too narrow, the range of a color which is to be converted into a desired color is restricted. Conversely, if the criterion range is wide, the range of the color for conversion is widened. For instance, if the lower limit value and the upper limit values of each threshold are set to be zero and maximum (255 in case of an 8-bit data), all the colors are converted into a desired color.

A detected color is judged as being the color of interest, i.e., the color to be converted into another color, when all the values, i.e., the sum S, ratio data Mr and the ratio data Cr, fall within their respective threshold levels. In such a case, all the comparators 1003Y, 1003M and 1003C deliver outputs "1" to the AND gate 1004. The AND gate computes the logical AND of these outputs so that a control signal 1010 of "1" level is input to a selector 1006. This control signal indicates that a color to be converted has been detected. In response to this control signal, the selector 1006 selects and outputs the Y', M' and C' density data (data concerning the desired color to be obtained after the color conversion) which have been stored beforehand in the register 1005. Conversely, when the level of the control signal 1010 is "0", the selector 1006 selects and outputs the Y, M and C density data. Namely, the input image data is directly output without any color conversion.

Figure 3:
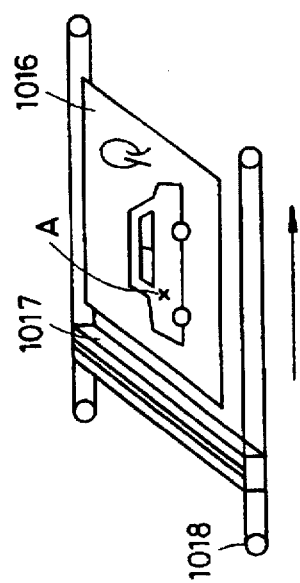
FIG. 3 is a schematic illustration of an image reading portion of the embodiment shown in FIG. 1.

FIG. 3 illustrates the construction of the image reading section in the embodiment described hereinbefore.

An original 1016 is adapted to be scanned and read by an original reading sensor 1017 which in turn is driven by a mechanical unit 1018 to scan the original 1016. The mechanical unit 1018 is controlled by a CPU which is not shown so as to drive the original reading sensor 1017 to enable the latter to scan the original 1016 as indicated by an arrow. A symbol A repesents the point, for sampling the color before the color conversion. This point A can be identified in terms of coordinate values which are appointed by a digitizer which will be described later in connection with FIG. 32. These coordinate values are stored in a memory.

Figure 4:
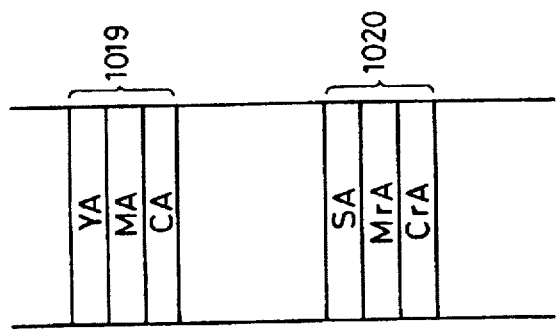
FIG. 4 is a schematic illustration of a memory map of a RAM used in the embodiment shown in FIG. 1.

FIG. 4 illustrates a memory map of a RAM which stores density data YA, MA and CA read from the color sampling point A as the Y, M and C density data.

The CPU computes the sum SA, ratio data MrA and the CrA data on the basis of the YA, MA and CA data read from the region 1019 of the RAM, and stores the results of the computation in the region 20.

Figure 5:
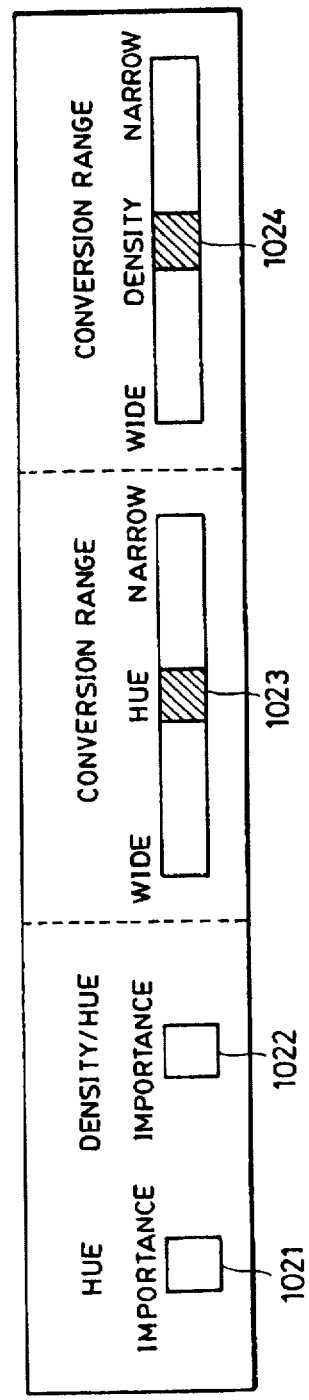
FIG. 5 is an illustration of a control panel for appointing a mode for a color converting operation of the embodiment shown in FIG. 1.

FIG. 5 is an illustration of a control panel for setting the mode of operation after color conversion. Referring to this Figure, a key 1021 is a push-type key which enables the operator to select a "hue importance mode" which effects conversion of all colors having the same hue. A push-type key 1022 is a key which enables the operator to select "hue/density importance mode" which effects conversion of all colors having the same hue and density. Operation of the keys 1021 and 1022 is mutually exclusive. Namely, when one of these keys has been set the other is reset and vice versa. A slide-type key 1023 is a range setting key which enables the user to set the size of the range of the color to be converted. More specifically, when this key is set for "wide" range, colors of hues or densities approximating those of the appointed color are also subjected to the color conversion, as well as the color having the same hue and density as the appointed color. Conversely, when this slide key is set for "narrow" range, only the color having the hue and density strictly the same as those of the appointed color is subjected to the color conversion.

Figure 6:
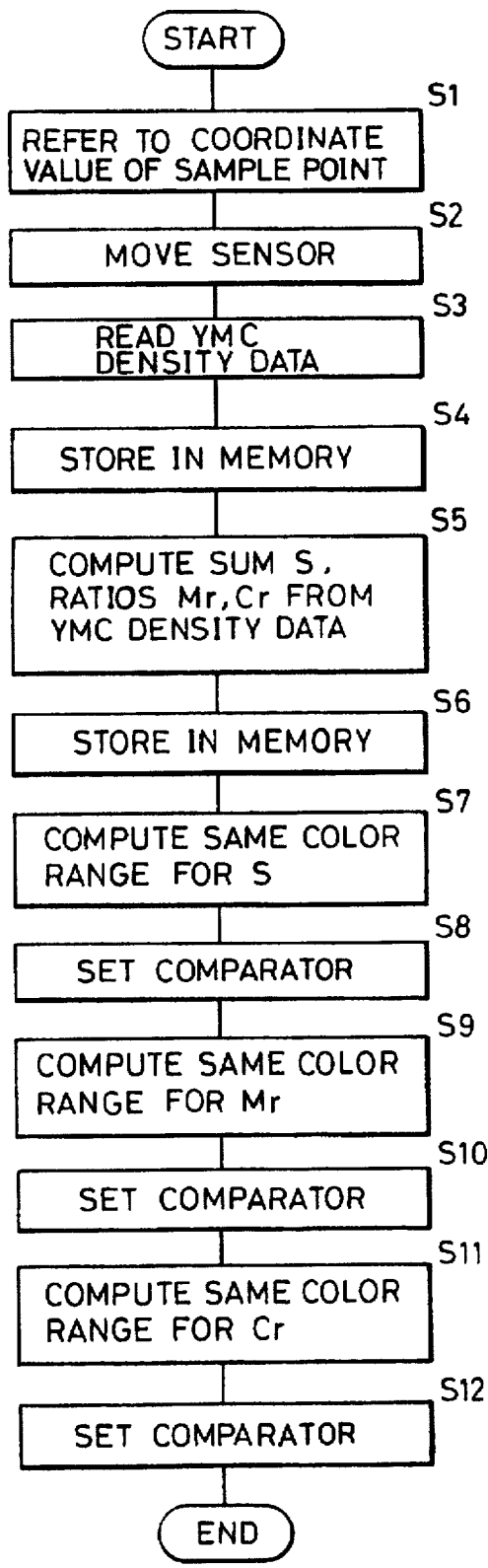
FIGS. 6, 7 and 8 are flow charts illustrating a threshold setting operation in the embodiment shown in FIG. 1.

FIG. 6 is a flow chart illustrating the operation for setting the threshold levels in the embodiment described above.

For the purpose of conducting the color conversion, the CPU refers to the coordinate values of the sampling point, e.g., the point A in FIG. 3, in Step S1 of the process. Then, in Step S2, the CPU controls the sensor driving mechanical unit so as to set the sensor S1 at a desired position. The sampling point is a point which is appointed by, for example, a digitizer which will be described later, though the sampling point may be appointed by other means than a digitizer. When the setting of the sensor 1017 has been finished, the Y, M and C density data, e.g., YA, MA and CA, are read from the output from the sensor 1017 which is now on the sampling point A. This reading operation is conducted in Step S3. The thus read data is stored in the region 1019 of the RAM in Step S4.

In Step S5, the sum S, ratio Mr and the ratio Cr are computed in accordance with the equations (1), (2) and (3) on the basis of the Y, M and C .density data derived from the sampling point A, and the thus computed data is stored in the region 1020 of the RAM in Step S6 1020 of the RAM.

In Step S7, the color judging criterion range is computed for the sum S and the upper limit value SU and the lower limit value SL are set in the register 1007 as the threshold levels of the comparator 1003Y in Step S8. Similar computation is executed in each of Steps S9 and S11 so as to compute the color judging criterion range for each of the ratios Mr and Cr. The thus computed upper limit value MrU and the lower limit value MrL for the ratio Mr and the upper limit value CrU and the lower limit value CrL for the ratios Mr and Cr are set in registers 1008 and 1009 in Steps S10 and S12.

Figure 7:
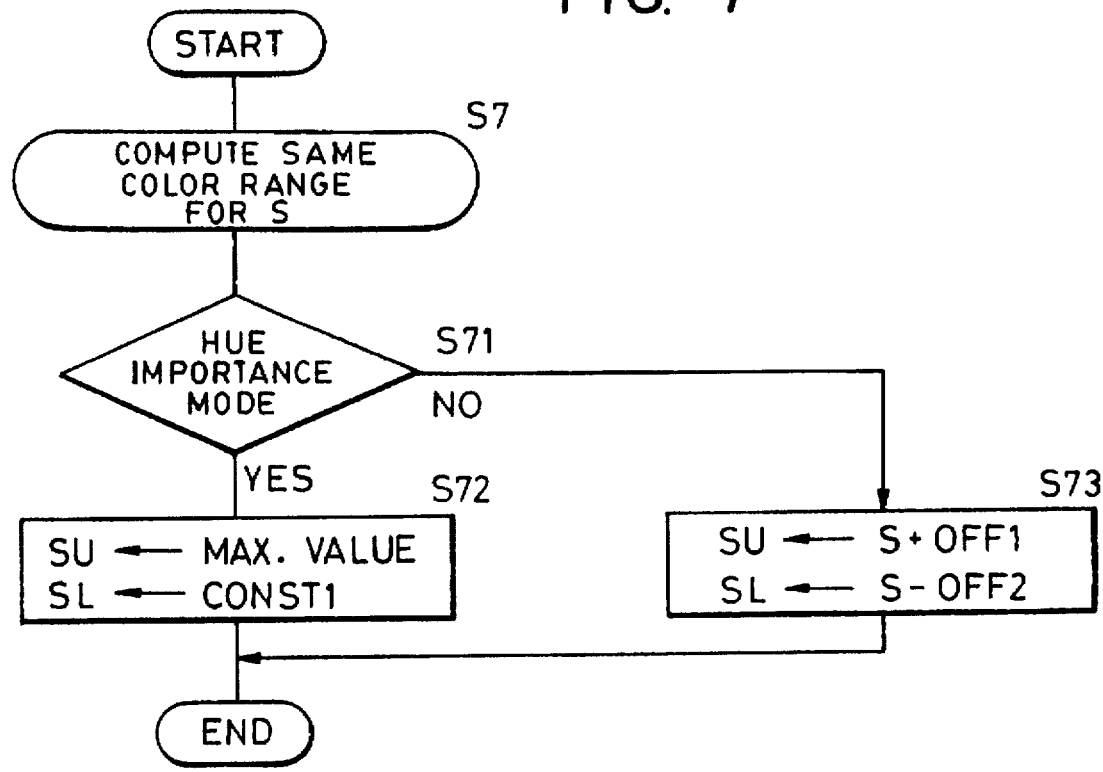

FIG. 7 is a flow chart illustrating the process for computing the color judging criterion range for the sum S. This process is commenced with Step S71 in which a judgment is conducted as to whether the present mode is the hue importance mode in which the judgment of the color is conducted solely on the basis of the hue or the hue/density importance mode in which the judgment of color is conducted on the basis of both the hue and the density. If the present mode is the hue importance mode, a value representing the highest density is set as the upper limit value SU, while a predetermined value (CONST1) approximating white is set as the lower limit value SL in Step S72. In this case, the judgment is impossible when the computation of the ratio is rendered unstable due to too low density of the ratio. However, the color can be judged without fail. Namely, if two other judging circuits have judged that a color is the same as the appointed color, these colors are judges as being the same color. Thus, the judgment of the color can be conducted solely on the basis of hue.

On the other hand, in the hue/density importance mode, a value which is obtained by adding to the sum S a positive offset value OFF1 is set as the upper limit value SU, whereas a value obtained by subtracting a negative offset value OFF 2 from the sum S is set as the lower limit value OFF 2 in Step S73. The offset values OFF 1 and OFF 2 are determined in accordance with the size of the conversion range which is set through the key 24. More specifically, these offset values are determined to be comparatively large when the conversion range has been selected to be comparatively "wide", whereas, when the conversion range has been selected to be comparatively "narrow", the absolute values of the offset values are determined to be comparatively small. Thus, when the hue/density importance mode has been selected, the judgment of a color is conducted on the basis of the hue and the density. The nature of the color judgment on the basis of the hue is not affected even when the conversion range is changed through the key 1024.

Figure 8:
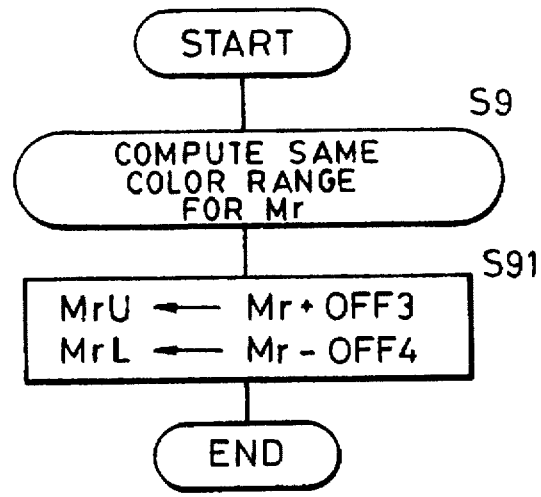

FIG. 8 is a flow chart showing the process for computing the color judging criterion for the ratio data Mr.

In this process, a value obtained by adding to the magneta ratio Mr of the sample data a positive offset value OFF 3 is set as the upper limit value MrU, while a value obtained by substracting, from the magneta ratio Mr, a negative offset value OFF 4 is set as the lower limit value MrL. The offset values OFF 3 and OFF 4 are the values which are determined to be large and small, respectively, when the conversion range set through the key 1023 of FIG. 5 is "wide" and "narrow".

After the setting of the upper and lower limit values as described, the image data is input as indicated by Y,M,C in FIG. 1 and the detection of the color is conducted in real time followed by conversion.

In this embodiment, the judgment of color is conducted by making use of the sum of the density values of the respective color components and the ratios of the respective color components, either in the hue importance mode in which the judgment replies solely upon the hue or in the hue/density importance mode in which the judgment replies both upon the hue and the density. The judging error is small and the conversion range is adjustable in each of these two modes. In the embodiment as described, the magenta ratio and cyan ratio are used as the data which represents hue, and the sum of the densities of the color components is used as the data representing the density. These data, however, are only illustrative and other data which represent the hue such as yellow ratio, ratio a concerning RGB and a and b values of Lab can be used equally as the data representing hue in the described embodiment. The data representing the density may be any data which relates to the density, e.g., the maximum value or the mean value of each color component, intensity data, and so forth.

The described embodiment of the color image processing apparatus for converting a selected color in a color image data into a desired color makes it possible to eliminate any erroneous detection of a color of a different hue as being the same color as the selected color.

The described embodiment utilizes a digitizer having characteristics as shown in FIG. 22 as the means for setting the color which the user wishes to convert. This, however, is not exclusive and the arrangement may be such that one of a plurality of colors which have been registered is selected and converted. It is also possible to appoint the color to be converted by other means.

Figure 32:
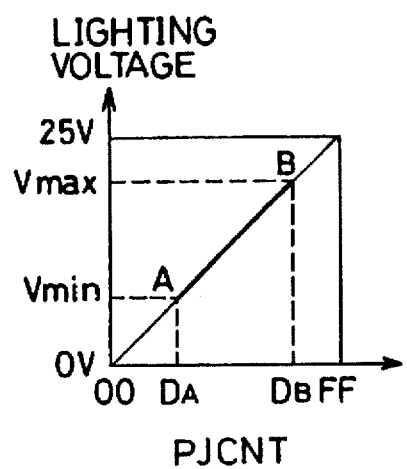
FIG. 32 is an illustration of the relationship between the control input of a film exposure lamp and lighting voltage.

The described embodiment also may be modified such as to make use of a digitizer shown in FIG. 32 which selects a plurality of points and compute the mean values of the color components at these points.

A description will be made hereinafter of a color image processing apparatus which makes use of the embodiment shown in FIGS. 1 to 8 which reads an original through color-separation and converts the read image into an electrical signal. The apparatus which will be described hereinafter is capable of changing the density levels of the pixels in such a manner as to change the ratio of the color components.

Figure 9:
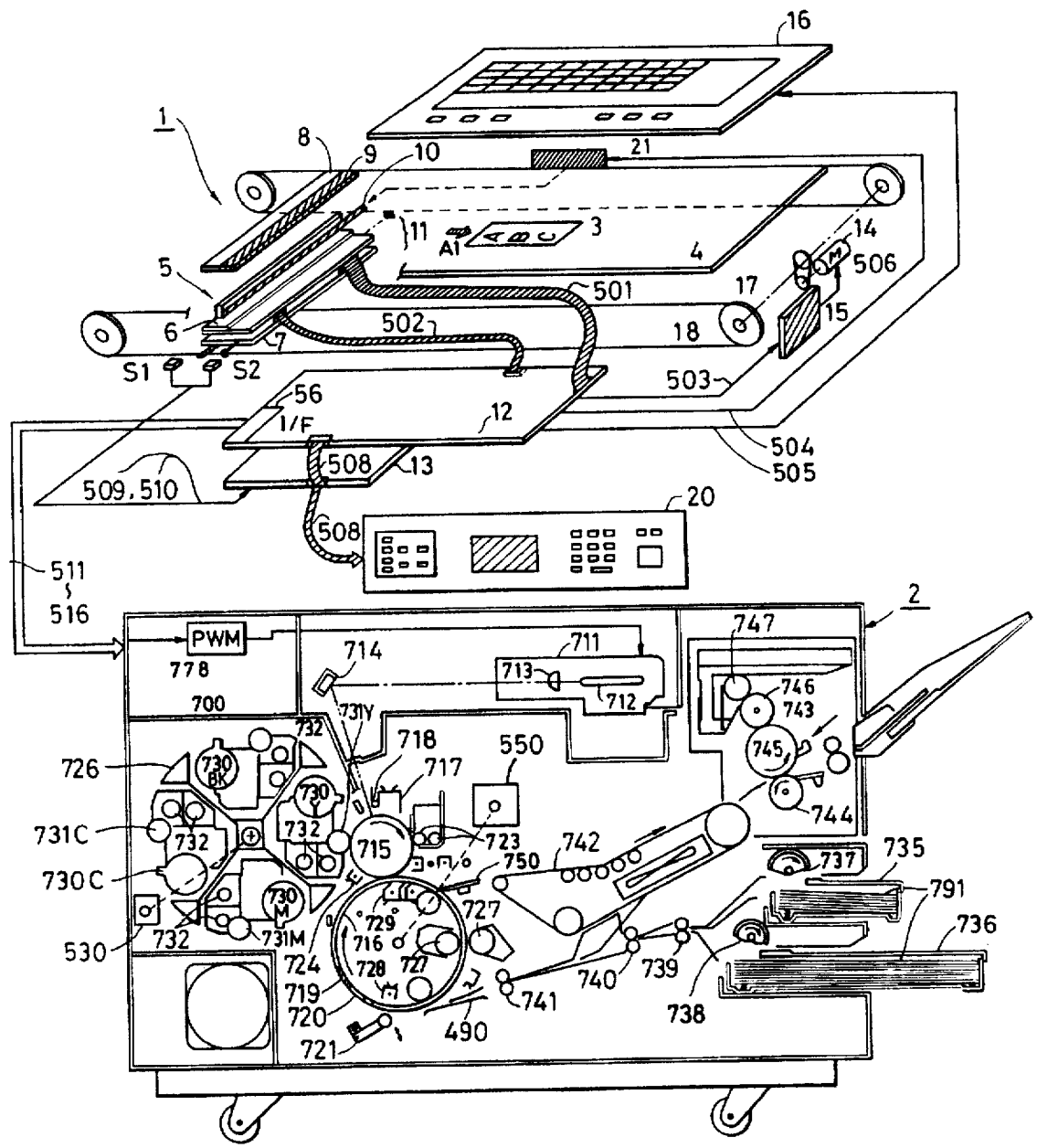
FIG. 9 is an illustration of a digital color copying machine embodying the present invention.

This embodiment will be described with reference to the accompanying drawings begining with FIG. 9. This system has a digital color image reading device (referred to as color reader, hereinafter) 1 and a lower color image print device (referred to as color printer, hereinafter) 2. The color reader 1 has a later-mentioned color separation means and photoelectric conversion elements such as CCDs which read the color image information of the original according to the colors and converts the read information into electrical digital picture signals. The color printer 2 is an electrophotographic laser beam color printer which operates in accordance with the digital picture signals and reproduces the color image of the respective colors. The color printer 2 then prints the color images in the form of digital dots through a plurality of transfer cycles in each of which one of the color images is printed. The outline of the color reader will be explained. Referring to FIG. 9, a reference numeral 3 denotes an original, 4 denotes a platen glass which carries an original, and 5 denotes a rod array lens which collects the light image reflected from an original exposed to and scanned by a halogen exposure lamp 10. The rod array lens 5 also operates to input the collected light images to a real-size full-color sensor 6. The constituent elements 5, 6, 7 and 10 constitute an original scanning unit 11 which conducts exposure and scanning of the original in the direction of an arrow A1. The color-separated image signal read through the exposure and scanning in a line-by-line fashion is amplified to a predetermined voltage by a sensor output signal amplifier 7 and is delivered through a signal line 501 to a later-mentioned video processing unit so as to be processed by this circuit. The details of this signal processing operation will be explained later. The reference numeral 501 designates a coaxial cable which ensures transmission of the signal with a high degree of fidelity. A reference numeral 502 denotes a signal line for supplying driving pulses for driving the real-size full-color sensor 6. All the necessary driving pulses are generated in the video processing unit 12. Numerals 8 and 9 denote a white board and a black board which are used in white- and black-level corrections of the image signal as will be explained later. These white and black boards provide, when illuminated with the halogen exposure lamp 10, density signals of predetermined levels which are used in white- and black-level correction of the video signal. A reference numeral 13 denotes a control unit which has a microcomputer. The control unit 13 performs all the types of control necessary for the color reader including control of display on a control panel 20 through a BUS 508, control of key input, control of operation of the video processing unit 12, detection of the position of the original scanning unit 11 by position sensors through signal lines 509, 510, control of a stepping motor driving circuit for controlling the driving circuit of a stepping motor 14 which drives the scanning unit 11, such control being done through a signal line 503, control of the exposure lamp driver which conducts on/off control of the exposure lamp 10, such control being done through a signal line 504, control of light quantity, and control of a digitizer 16, internal key and the display through the signal line 505, such control being done through a signal line 505. The color image signal read by the exposure scanning unit 11 during the exposure and scanning of the original are input into the video processing unit 12 through the amplifier circuit 7 and the signal line 501 so that various types of processing are conducted in the video processing unit 12. The thus processed signals are delivered to the color printer 2 through an interface circuit 56. The outline of the color printer 2 will be explained hereinafter. A reference numeral 711 denotes a scanner which has a laser output section for converting the image signals derived from the color reader 1 into light signals, a polygonal mirror 712 which is, for exmple, an octagonal mirror, a motor (not shown) for rotating the mirror 712, and an f/0 lens (image-forming lens) 713. A reference numeral 714 designates a reflection mirror for altering the passage of light, while a numeral 715 denotes a photosensitive drum. The laser beam emitted from the laser output section is reflected by the polygon mirror 712 and is made to impinge, through the lens 713 and the mirror 714, upon the surface of the photosensitive drum 15 thereby performing a raster scan of the surface of the same, thus forming a latent image Corresponding to the original image.

A reference numeral 717 denotes a primary charger, 718 denotes a whole exposure lamp, 723 denotes a cleaner portion for collecting residual toner which did not contribute to the image transfer, and denotes a pre-transfer charger 724. These members are arranged around the photosensitive drum 715.

A reference numeral 726 designates a developing unit for developing the latent image formed on the photosensitive drum 715. The developing unit 726 has developing sleeves 731Y, 731M, 731C and 731Bk which conduct development in direct contact with the potosensitive drum 715, toner hoppers 730Y, 730M, 730C and 730Bk for holding spare toners, and screws 732 for transferring the toner. These members constituting the developing unit 726 are arranged around the axis P of rotation of the developing unit. For instance, when an yellow toner image is to be formed, the development with the yellow toner is conducted with the developing unit set in the illustrated position, whereas, when the magenta toner image is to be formed, the developing Unit 726 is rotated around the axis P so as to bring the developing sleeve 731M in the magenta developer to a .position where it contacts with the photosensitive drum 715. Development of each of the cyan and black images can be conducted in the same manner.

A reference numeral 716 denotes a transfer drum for transferring a toner image formed on the photosensitive drum 715 onto a copy paper. A numeral 719 denotes an actuator plate for detecting the position of the transfer drum 716. A position sensor 720 is capable of sensing, upon approaching the actuator plate 719, that the transfer drum 716 has been moved to the home position. A numeral 725 designates a transfer drum cleaner, 727 denotes a paper pressing roller, 728 denotes a charge eliminator and 729 denotes a transfer charger. These constituent members 719, 720, 725, 727 and 729 are arranged around the roller 716.

On the other hand, numerals 735 and 736 denote paper cassettes from which sheets of copy Raper are fed, 737, 738 denote paper feed rollers by which the sheets of copy paper are fed from the cassettes 735 and 736, and 739, 740, 741 denote timing rollers which determine the timing of feed and convey of the copy paper. The copy paper thus fed and conveyed is introduced until its leading end is gripped by a later-mentioned gripper and is wound around the transfer drum 716 so as to be subjected to an image forming process.

A reference numeral 550 denotes a drum rotating motor which effects simultaneous rotation of the photosensitive drum 715 and the transfer drum 716. A separation claw 750 is adapted for separating the copy paper from the transfer drum 716 after the completion of the image forming process. A numeral 742 designates a conveyor belt for conveying the paper which has been separated from the transfer drum 716 to an image fixing section 743 where the image on the copy paper is fixed to the paper. The image fixing section includes a pair of heat-pressing rollers 744 and 745.

A description will be made hereinafter as to the control section 13 of the color reader in this embodiment, with reference to FIG. 10.

<CONTROL SECTION OF COLOR READER>

The control section includes a CPU 22 which is a microcomputer. The control section is capable of conducting various types of control necesary for obtaining desired copy such as control of processing of video signals, control of the lamp driver 21 and the stepping motor driver 15 for the exposure and scanning, control of the digitizer 16 and the control of operation of the control panel 20, through signal lines 508 (BUS), 504, 503 and 505, in accordance with programs stored in the ROM 23 and RAMs 24 and 25. The RAM 25 is backed-up by a battery 31 so that it is volatile. The signal line 505 is intended for ordinary serial communication and carries various signals formed in accordance with the protocols of the CPU 22 and the digitizer 16 in response to the input through the digitizer 16. Thus, signals for appointing the coordinate values or region for an editing operation,-e.g., movement or synthesis of an image, signals for appointing a copy mode, signals for appointing the zooming ratio and so forth are input through the line 505. The signal line 503 is used for transmitting signals delivered by a CPU 22 for the purpose of appointing the scanning speed, scanning stroke and the scanning direction. The motor driver 15 is adapted for inputting predetermined pulses to the stepping motor 14 from the CPU 22 thereby rotationally activating the motor.

Serial interfaces I/F 29 and 30 are ordinary ones which may be realized by, for example, a serial I/F LSI such as Model 8251 sold by INTEL Company Limited. Although not shown, a similar interface circuit is provided in each of the digitizer 16 and the motor driver 15. The protocol between the CPU 22 and the motor driver 15 is shown in FIG. 11.

The sensors S1 and S2 (also shown in FIG. 9) are capable of detecting the position of .an original exposure scanning unit which is denoted by 11 in FIG. 9. The sensor S1 operates when the original exposure scanning unit 11 is in the home position where a white-level correction of the image signal is conducted, while the sensor S2 is adapted to detect that the 10 unit 11 is at an end of the image. This end position is used as a reference position with respect to the original.

<PRINTER INTERFACE>

Figure 10:
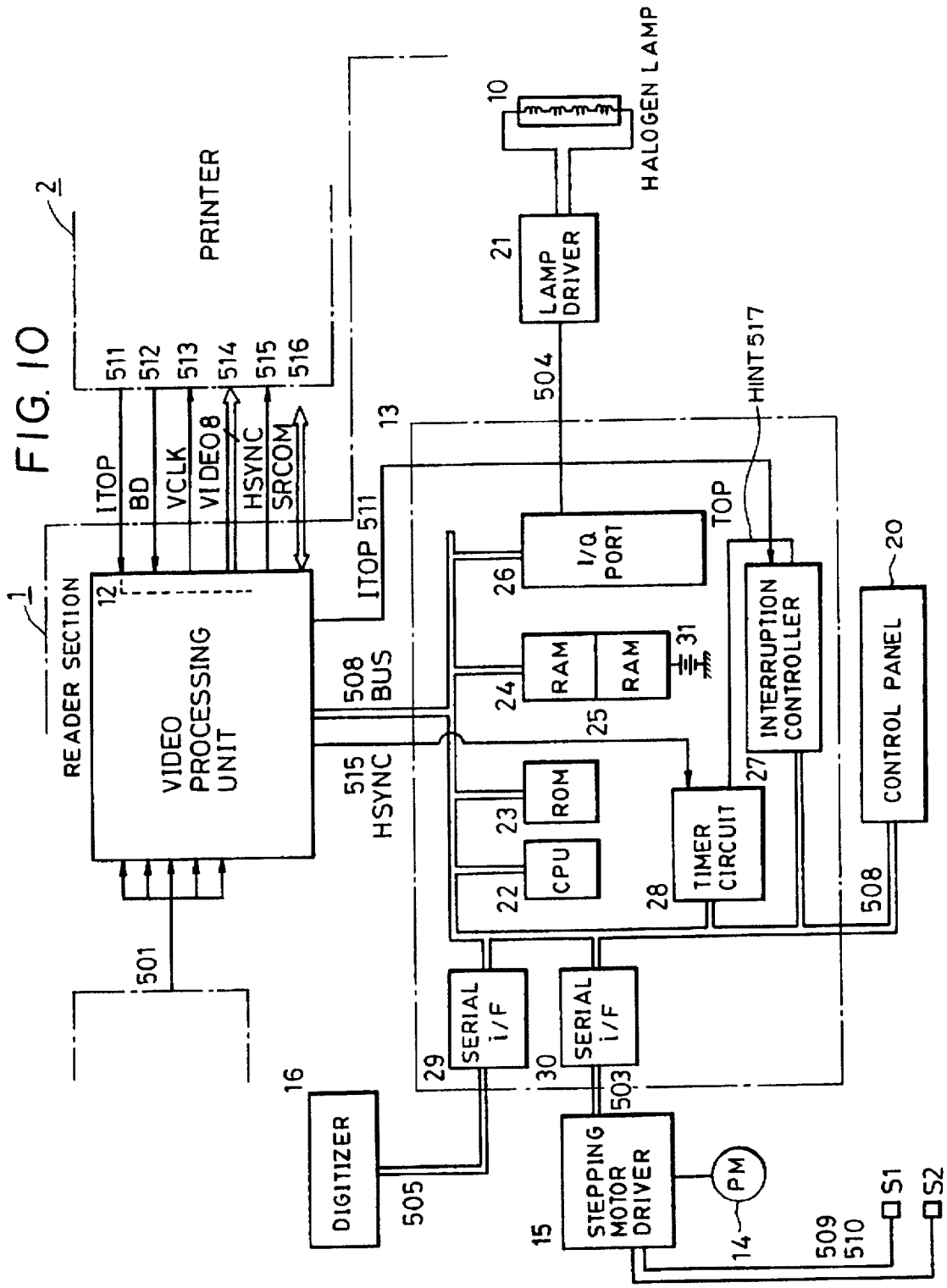
FIG. 10 is a control block diagram of a controller in a reader section of the embodiment shown in FIG. 9.

Referring to FIG. 10, signals ITOP, BD, VCLK, VIDEO, HSYNC and SRCOM (511 to 516) are signals for the interface between the color printer 2 and the color reader 1 in FIG. 9. The video signals VIDEO 514 read by the reader 1 are all delivered to the color printer 2. The signal ITOP is a synchronizing signal for attaining synchronism in the direction of feed of the image (referred to as sub-scanning direction). This signal is output once for the delivery of one picture frame, i.e., for the image of each color, such as yellow, magenta, cyan and black images. In consequence, the synchronizing signals ITOP is produced four times for the transmission of a color image composed of four colors. These signals are synchronized with the rotation of the transfer drum 716 and the photosensitive drum 715 so that the leading end of the copy paper wound on the transfer drum 716 of the color printer 2 is aligned with the leading end of the image on the original so that the image is correctly transferred to the paper at the point where the paper contacts with the photosensitive drum 716. These signals are delivered to the video processing unit in the reader 1 and are further input as the interruption of the CPU 22 in the controller 13 (signal 511). The CPU 22 conducts a control of the image in the direction of the sub-scan for the purpose of edition such as edition on the basis of the interruption by the ITOP signal. A signal BD 512 is a synchronizing signal which is generated in the direction of raster scan (referred to as main-scan direction hereinafter) which is generated once per each rotation of the polygonal mirror 712, i.e., once per each raster scan. The image signal read by the reader 1 is delivered to the printer 2 in a line-by-line fashion in synchronism with the signal BD 512. A symbol VCLK 513 represents synchronizing clocks for delivering 8-bit digital video signals 514 to the color printer 2. For instance, the video data 514 is delivered in accordance with the synchronizing clock through flip-flops 32 and 35 as shown in FIG. 12(b). A signal HSYNC is a synchronizing signal in the direction of main scan in synchronization with the vertical clock VCLK in response to the BD signal 512. Thus, the signal HSYNC has a period which is the same as the signal BD. In a strict sense, the video signal VIDEO 514 is produced in synchronism with the signal HSYNC for the following reason. Namely, the BD signal 515 is generated in synchronism with the rotation of the polygonal mirror so that the zitter (jitter) of the motor for driving the polygonal mirror 712 is contained in the BD signal. In consequence, if the synchronism signal HSYNC is generated in direct synchronization with the BD signal, the synchronizing signal HSYNC inevitably includes zitter. In this embodiment, therefore, the signal HSYNC is generated in synchronism with the VCLK having no zitter in response to the BD signal, whereby the zitter component is excluded from the signal HSYNC 515. A signal line SRCOM is a signal line for semi-double bi-directional serial communication. As shown in FIG. 12(c), a command CM is generated in synchronism with the 8-bit serial clock SCLK between synchronizing signals CBUSY (command busy) transmitted from the reader. In response to the command CM, the printer sends back a status signal ST in synchronism with the 8-bit serial clock between signals SBUSY (status busy). The timing chart of FIG. 12(c) shows that status 3CH is generated in response to the command 8EH. Exchange of various signals between the reader and the printer, e.g., the instruction from the reader to the printer such as appointment of color mode, selection of the paper cassette and so forth, as well as the transmission of data from the printer such as the state of the printer, e.g., jamming, absence of paper, waiting state and so forth, can be conducted through the communication line SRCOM.

FIG. 12(a) shows a timing chart of operation for delivering a single 4-color image in accordance with the signals ITOP and HSYNC. The ITOP 511 is generated once per each rotation of the transfer drum 716 or every two rotations of the same. Image data of yellow, magenta, cyan and black are delivered from the reader 1 to the printer 2 at timings (1), (2), (3) and (4), whereby a full-color image composed of superposed four color images is formed on the transfer paper. Assuming here that the paper is an A3 size paper having a length of 420 mm and that the image is formed at a density of 10 pel/mm, 6720 (420×16=6720) signals HSYNC are transmitted during transfer of the image to the paper. These signals HSYNC are also delivered to the clock input of the timer circuit 28 in the controller circuit 13 (FIG. 10). The arrangement is such that an interruption HINT 517 is delivered to the CPU 22 during counting of a predetermined number of the signals HSYNC, thus enabling the CPU to conduct a control of the image in the direction of feed, e.g., extraction or movement of the image.

<VIDEO PROCESSING UNIT>

Figure 13A:
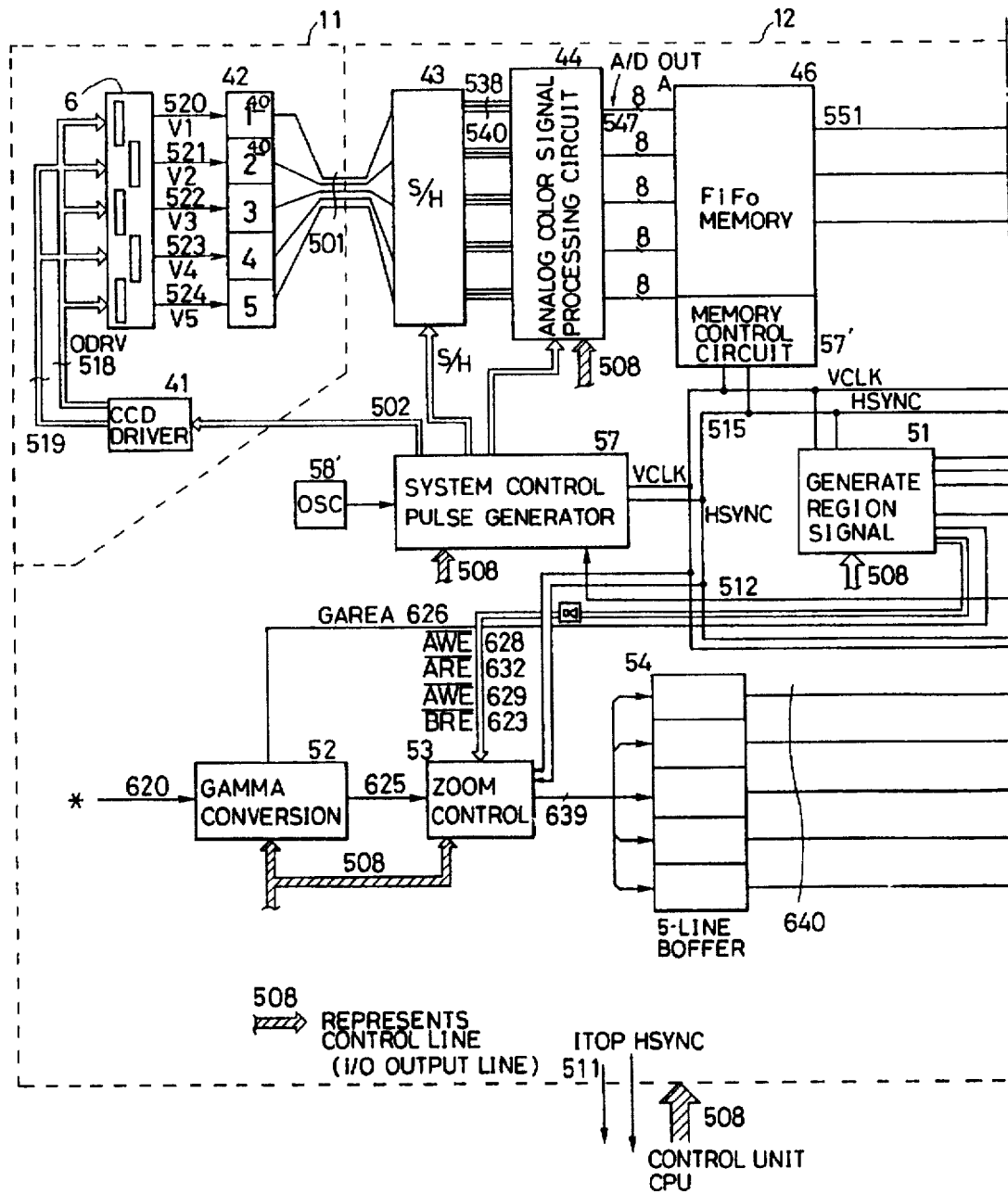
FIGS. 13(a) and 13(b) are asembled to form a circuit diagram showing the detail of the video processing unit of FIG. 10.
Figure 14A:
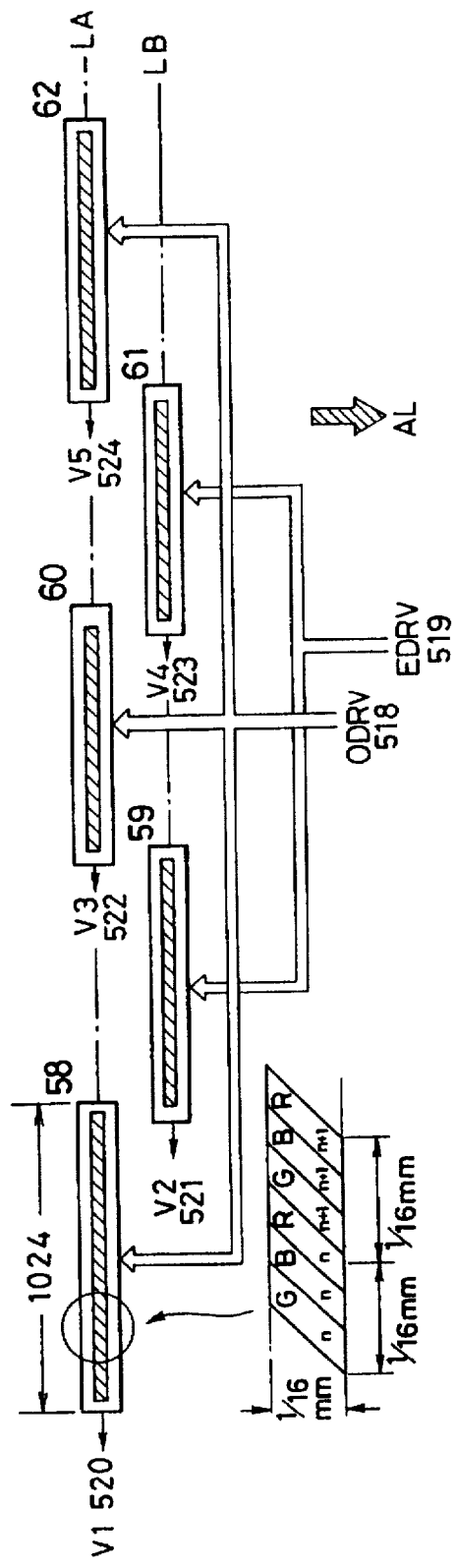
FIG. 14(a) is an illustration of an arrangement of a color CCD sensor.

A description will be given hereinafter as to the detail of the video processing unit 12 with reference to FIGS. 13(a)

and 13(b). The original is illuminated by the exposure lamp 10 (see FIGS. 9 and 10) and the reflected light is color-separated and read by a color reading sensor 6 in the scanning unit 11. The-thus read image is amplified to a predetermined level by the amplifier circuit 42. A reference numeral 41 designates a CCD driver which deliviers pulse signals for driving the color reading sensor. The necessary pulse sources are generated by system control pulse generator 57. FIG. 14(a) illustrates a color reading sensor which is used in this embodiment. The sensor is adapted for reading the original by dividing the latter into five sections in the direction of the main scan. Each pixel has a length of 62.5 μm (1/16 mm) and each sensor chip has a length corresponding to 1024 pixels. Since each pixel is divided into three sections of G, B and R in the direction of the main scan, there are 3072 effective pixels (1024×3=3072). The sensor chips 58 to 62 are formed on the same ceramic substrate. The first, third and fifth sensor chips (58, 60, 62) are on the same line LA, while the second and fourth sensor chips are provided on a line LB which is spaced from the line LA by a distance corresponding to four lines (62.5 μm×4=250 m). The scanning is conducted in the direction of an arrow AL.

Figure 15A:
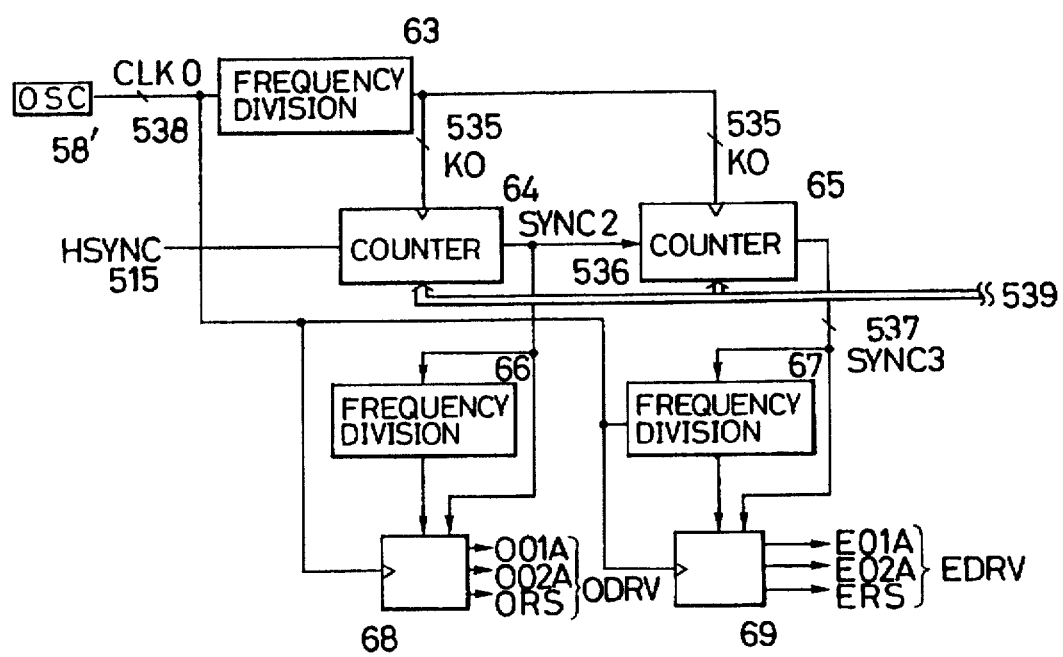
FIG. 15(a) is an illustration of a CCD driving signal generating circuit in a system control pulse generator 57.
Figure 15B:
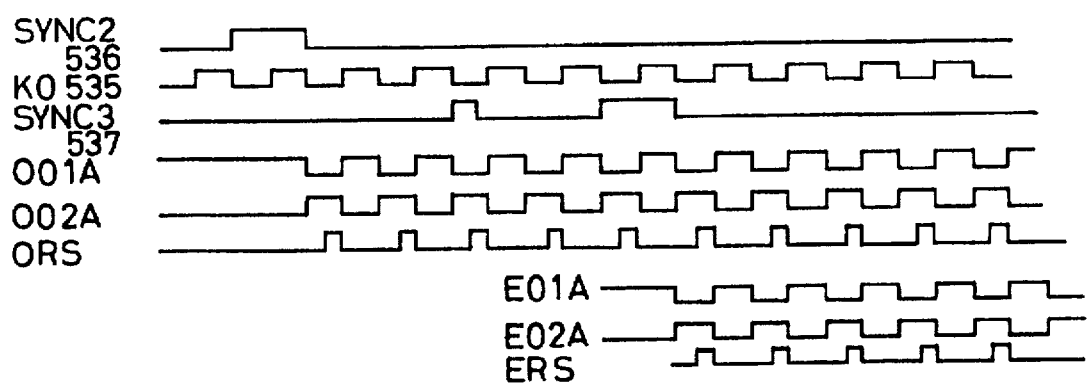
FIG. 15(b) is a timing chart illustrating the timings of signals available at various portions of the circuit shown in FIG. 15(a)

The first, third and fifth CCD chips are driven by a group of driving pulses ODRV 518, while the second and fourth sensor chips are driven by another group of driving pulses EDRV 519 independently and in synchronism. The driving pulse group ODRV 518 includes charge transfer clocks 0ø1A, 0ø2A and a charge reset pule ORS, while the driving pulse group EDRV 519 includes charge clock pulses Eø1A, Eø2A and a reset pulse ERS. These signals are generated in a perfect synchronism so as to prevent generation of any zitter, thereby to avoid any mutual interference between the first, third and fifth sensor chips and the second and fourth sensor chips. To these ends, these pulses are oscillated from a common reference oscillation source OSC 58' (see FIG. 13a). FIG. 15(a) shows a circuit block for generating the driving pulse groups ODRV 518 and EDRV 519, while FIG. 15(b) is a timing chart showing the timing of operation of the circuit shown in FIG. 15(a). This circuit is included in the system control pulse generator 57 shown in FIG. 13a. The timing of generation of the driving pulses ODRV and EDRV is determined by reference signals SYNC 2 and SYNC 3 which are formed in accordance with a clock K0 535 obtained by demultiplying the original clock OLK0 generated from a single oscillator OSC 58'. The timings of the signals SYNC 2 and SYNC 3 are determined in accordance with values which are set in the presettable counters 64, 65 set by the signal line 539 connected to the CPU BUS. These signals SYNC 2 and SYNC 3 serve to initialize the demultipliers (or frequency division circuits) 66 and 67 and the-driving pulse generating sections 68 and 69. Thus, the pulse groups ODRV 518 and EDRV 519 are obtained in synchronism without any zitter, because they are formed in accordance with the clock CLK0 output from a single oscillation source OSC and clock which is formed by demultiplying the original clock CLK0. In consequence, the pulses of the sensor driving pulse group ODRV 518 and the pulses of the sensor driving pulse group EDRV, which are generated in synchrionism, are delivered to the first, third and the fifth sensor chips and to the second and fourth sensor chips, respectively, so that the sensor chips 58, 59, 60, 61 and 62 produce video signals V1 to V5 independently in synchronism with the driving pulses. These video signals are amplified by amplifier circuits 42 for the respective channels of an amplifier 40 up to a predetermined voltage level.

Figure 14B:
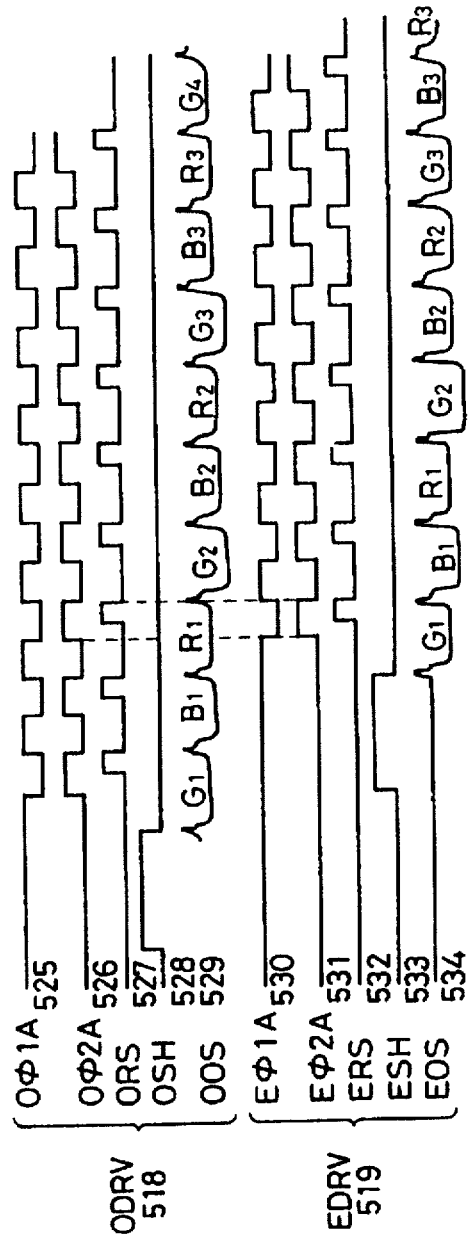
FIG. 14(b) is a timing chart of signals available at various portions of the CCD sensor shown in FIG. 14(a)
Figure 16B:
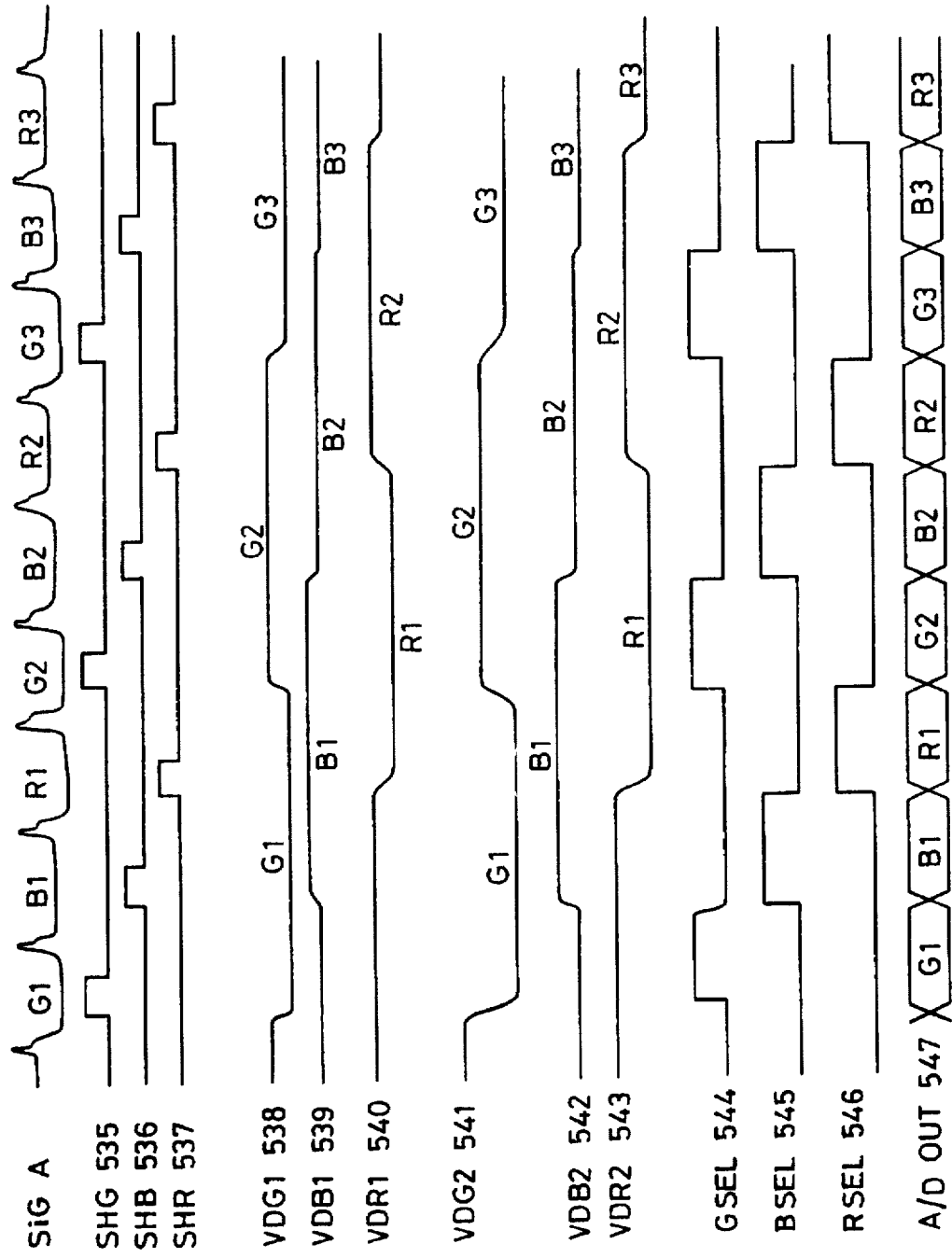
FIG. 16(b) is a signal timing chart illustrating timings of signals available at various portions of the circuit shown in FIG. 16(a)
Figure 16:
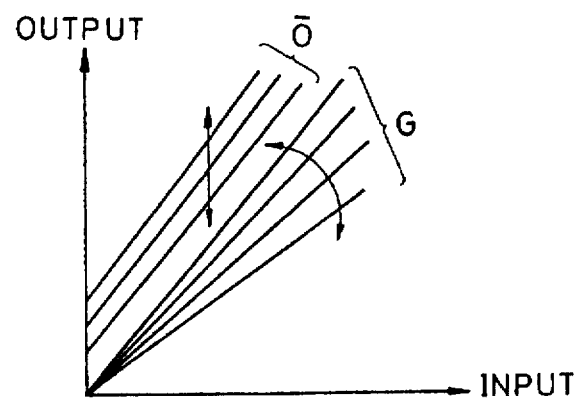
FIG. 16(a) shows the detail of the analog color signal processing circuit 44 in the circuit of FIG. 13.
FIG. 16(c) is an input/output conversion characteristic diagram.

The amplified signals V1, V3 and V5 are delivered to the video processing unit at a timing OOS 529 of FIG. 14(b) through a coaxial cable 501 (see FIG. 9), while the amplified signals V2 and V4 are delivered at a timing EOS 534 of the same Figure through the coaxial cable 501. The color image signals obtained by reading the five sections of the original are thus input to the video processing unit 12 and are then color-separated into three colors of green (G), blue (B) and red (R) by the sample hold circuit S/H 43. Thus, 15 signal processing systems (3×5=15) are used after the sample holding S/H. FIG. 16(b) shows the timing of a process in which a digital data A/D OUT is obtained through the sample holding, amplification, A/D conversion through an A/D converter and multiplexing. FIG. 16(a) shows this process in block diagram form.

Figure 17:
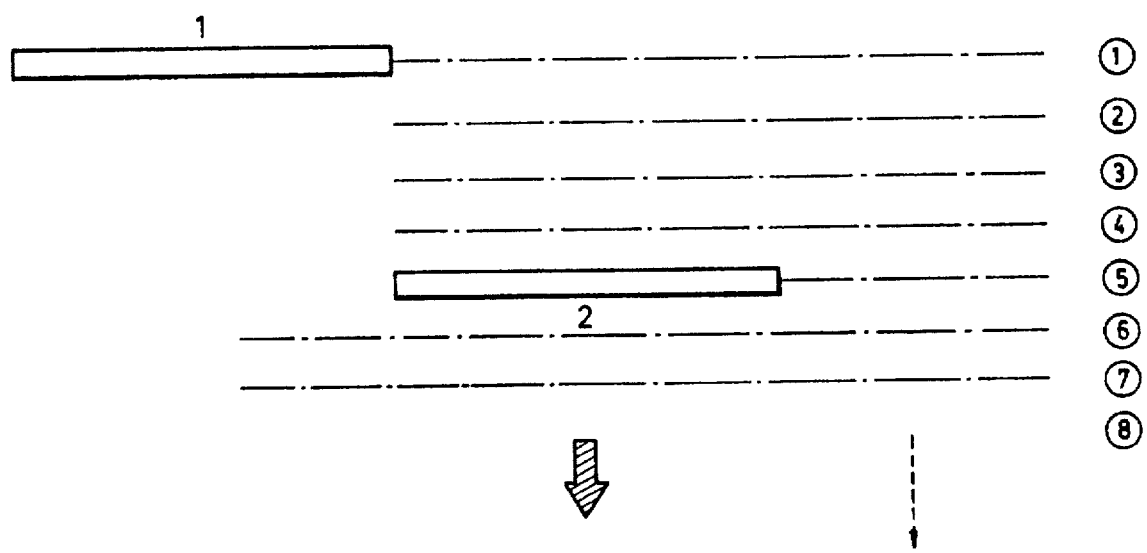
FIGS. 17(a), 17(b), 17(c) and 17(d) are illustrations of the manner in which line signals are derived from staggered sensors.
Figure 17B:
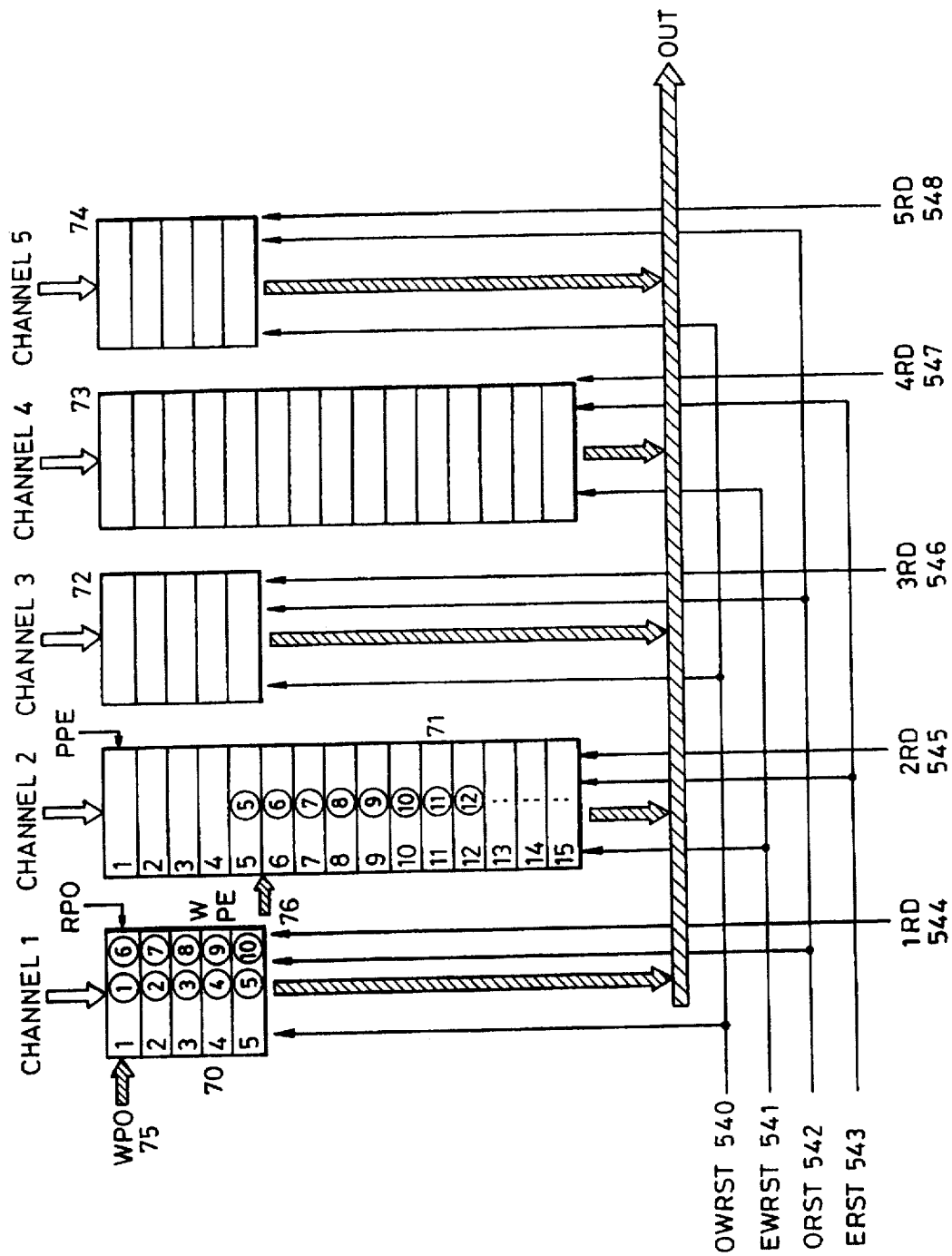

The 5-channel analog color image signals read by the 5-chip real-size color sensor are introduced into an analog color signal processing circuit of FIG. 16(a). This circuit has circuits A to E for the first to fifth channels. Since these circuits A to E have an identical construction, the description will be made on the circuit A by way of representative, with reference to FIG. 16(b) illustrating the signal timing. As indicated by SiGA in FIG. 16(b), the analog color signal input to the analog color signal processing circuit has such an order that the signal G comes first, followed by B and then by R. This signal is converted in the sample hold circuit (S/H) 250 in accordance with the sample hold pulses SHG 535, SHB 536 and SHR 537 such that the color component signals are processed in parallel so that color separated signals VDG1, VDB1 and VDR1 (538 to 540) are obtained as shown in FIG. 16(b). The color-separated signals 538 to 540 are subjected to an offset adjustment (characteristic O in FIG. 16(c)) by amplifiers 251 to 253 and, after cutting of the bands other than the signal component band by low-pass filters (LPF) 254 to 256, subjected to gain control performed by amplifiers 257 to 259 (characteristic G in FIG. 16(c)). The signals are then multiplexed by a multiplexer MPX 260 into a single channel signal in accordance with pulses GSEL, BSEL and RSEL (544 to 546) and is subjected to A/D conversion so that a single channel digital signal is obtained (ADout 547). According to the described arrangement, since the A/D conversion is conducted after multiplexing, the color signals of 15 systems, including G, B and R component signals for each of five channels, are processed by five A/D converters. The arrangement and operation of other circuits B to E are the same as those described in regard to the circuit A. According to the described embodiment, the original is read by five sensor chips arranged in a staggered manner so as to cover five sections of the original in the direction of the main scan and offset by a distance corresponding to four lines (62.5 μm×4=250 m) in the direction of the sub-scan. Therefore, the leading channels 2, 4 and the trailing channels 1,3,5 read different portions of the original. In order to connect the signals read by these sensor chips in a correct sequence, therefore, memories capable of storing data of a plurality of lines are used. FIG. 17(b) illustrates the construction of memories used in this embodiment. As will be seen from this Figure, a plurality of memories 70 to 74 are used, each being capable of storing data of a plurality of lines, and are arranged in a FiFo-type arrangement. More specifically, each of the memories 70, 72 and 74 can store data correspnding to 5 lines, each line including 1024 pixels, while each of the memories 71 and 73 can store data of 15 lines. Writing of data is effected in a line-by-line fashion from points indicated by last pointers WPO 75 and WPE 76. When the writing of data corresponding to one line is finished, pointer WPO or WPE is incremented by +1. WPO is commonly used for the channels 1, 3 and 5, while WPE 76 is used commonly for the channels 2, 4. Signals OWRST 540 and EWRST 541 are used for initializing the values of the line pointers WPO 75 and WPE 76 so as to return the writing of data to the initial positions. Signals ORST 542 and ERST 543 are used for resetting the value of the read pointers RPO and RPE (pointers during reading) to the initial positions. A description will be given hereinunder by making referende to channels 1 and 2. As will be seen from FIG. 17(a), the channel 2 is ahead of the channel 1 in amount corresponding to four lines. Therefore, the operation is such that a line, e.g., a line (5) is read first by the chanel 2 and is written in the FiFo memory 71 and, after elapse of a time corresponding to four lines, the same line (5) is read by the channel 1. If the writing pointer WPO for writing to the memory is set shead of that of WQPE by amont corresponding to 4 lines, and if the written data are read from the respective FiFo memories with the same read point value, data of the same scanning lines are read from the channels 1.3.5 and the channels 2, 4, whereby the offset in the direction of the sub-scan is eliminated.

For instance, referring to FIG. 17(b), the WPO is on the beginning line 1 of the memory, whereas, in the channel 1, the WPE is on the fifth line 5 as counted from the beginning line. If the operation is started from this state, the WPE points to the ninth line 9 when the WPO points the fifth line 5. In consequence, the data from the line (5) of the original is written in the region where the pointer points 5 in both channels. Thereafter, the RPO and RPE (read pointers) advances simultaneously to read the data cyclically.

Figure 17C:
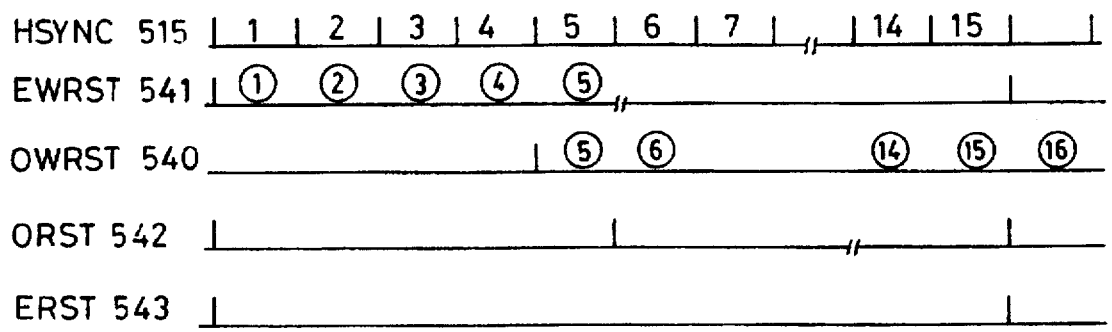
Figure 17D:
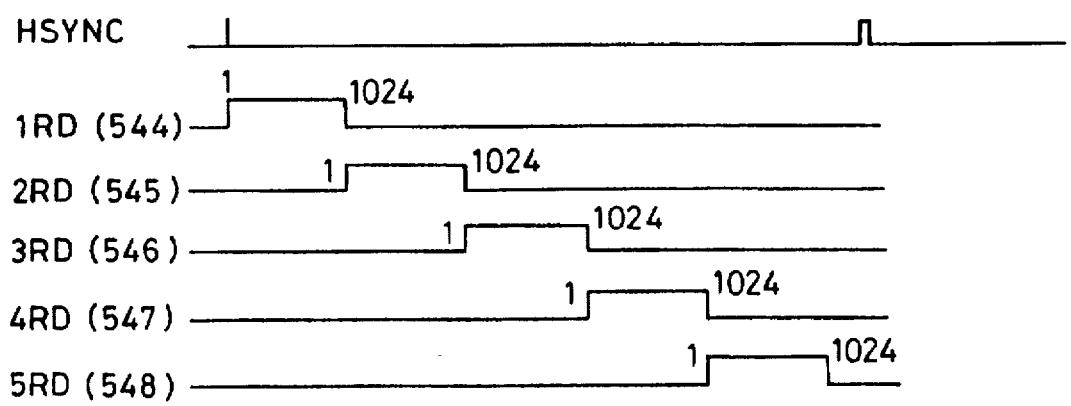

FIG. 17(c) is a timing chart illustrating the operation for conducting the control described above. The image data are fed in a line-by-line fashion in synchronization with the synchronism signal HSYNC 515. Signals EWRST 541 and OWRST 540 are generated with an offset corresponding to four lines as illustrated. The signal ORST 542 is generated with an interval, corresponding to the capacity of the FiFo memories 70, 72 and 74, i.e., for every 5 lines, while the signal ERST 543 is generated for every 15 lines. In reading, one-line data is read at a speed which is 5 times as high from the channel 1, followed by reading of one-line channel from the second, third, fourth and fifth channels, whereby a continuous and complete one-line data signal is obtained in the period of the synchronizing signal HSYNC. In FIG. 17(d), signals 1RD to 5RD (544 to 548) represent the effective periods for reading in the respective channels. The control signal for connecting the image data of the successive channels by means of FiFo memories is generated by a memory control circuit 57' which is shown in FIG. 13(a). The circuit 57' is constituted by a discrete circuit such as TTL. This circuit, however, is not described in detail because it does not constitute any essential portion of the invention. Three sets of FiFo memories having an identical construction are provided for blue, green and red components, although one of them has been described.

Figure 18A:
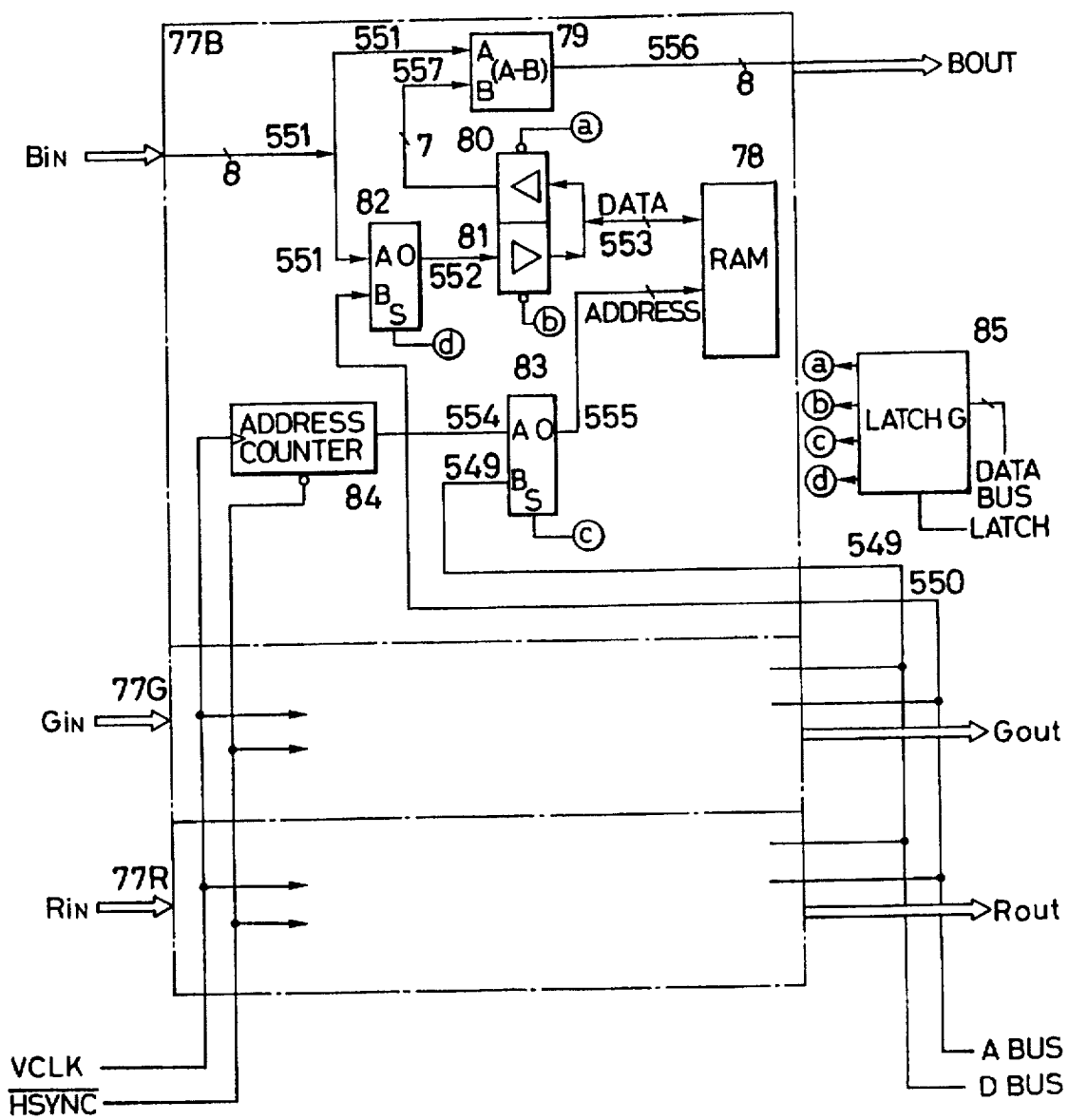
FIG. 18(a) is a circuit diagram of a black correction circuit.
Figure 18:
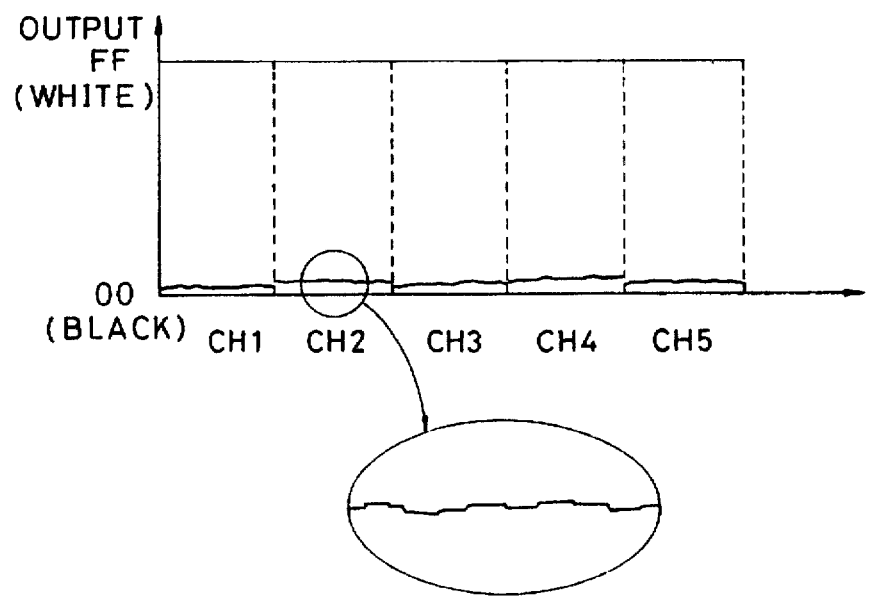
FIG. 18(b) is an illustration of the black correction.

FIG. 18(a) illustrates a black correction circuit. As will be seen from FIG. 18(b), the black level outputs from different channels 1 to 5 largely vary when the quantity of light input to the sensor is small. If such outputs are directly used in the formation of image, scores or unevenness is inevitably formed in the data portion of the image. It is therefore necessary to conduct correction for eliminating any difference in the black level output between different channels. This correction is conducted by the circuit as shown in FIG. 18(a). Before the copying operation is commenced, the original scanning unit is moved to the position of a black board 9 (FIG. 9) which is provided in a non-image region on one end of the original table and has a uniform black color density. Then, the halogen lamp 10 is turned on to illuminate the black board and the black level image signal is input to the correction circuit shown in FIG. 18(a). A selector 82 selects A (d) so that a gate 80 is opened (a) while a gate 81 is closed, whereby a one-line black image data is stored in a black level RAM 78. Thus, the data lines are connected from 551 to 552 and then to 553. Meanwhile, an output (c) is delivered so that the address input of the RAM receives the output of the address counter 84 which is initialized by a signal HSYNC, whereby the one-line black level signal is stored in the RAM 78 (black reference level pickup mode). During reading of the image, the RAM 78 is switched to a data reading mode so that the black level signal is read for each pixel of each line and input to the B input of the subtractor 79 through the data lines 553 and 557. In this state, the gate 81 is closed (b) while the gate 80 is opened, (a). Therefore, in case of the blue color for example, the output 556 of the black correction circuit is obtained as Bin(i)−DK(i)=Bout(i) (black correction mode), representing the black level data by DK(i). Similar black level correction is effected for the green and red signals Gin and Rin, respectively, by the black level correction circuits 77G and 77R. The control of the control lines (a), (b), (c) and (d) of the respective selector gates are conducted by a latch 85 which serves as the I/O of the CPU 22 (see FIG. 2).

Figure 19:
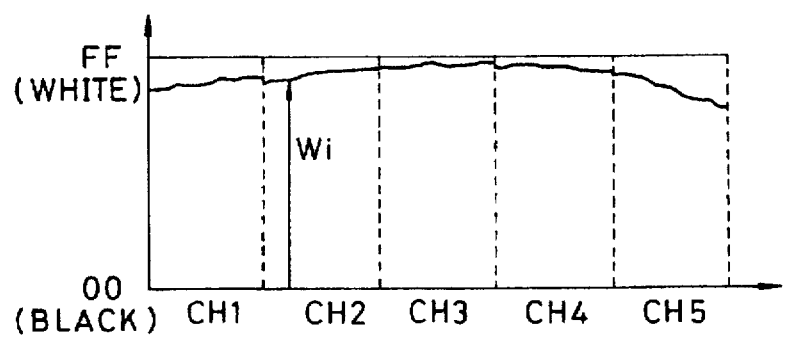
FIG. 19(a) is a circuit diagram of a white correction circuit.
FIGS. 19(b), 19(c) and 19(d) are illustrations of white level correction.
Figure 19:
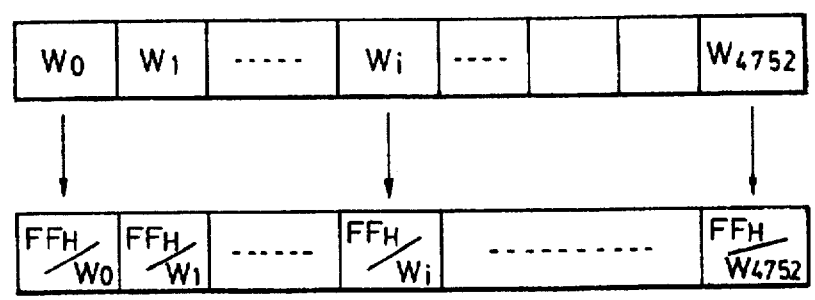
Figure 19A:
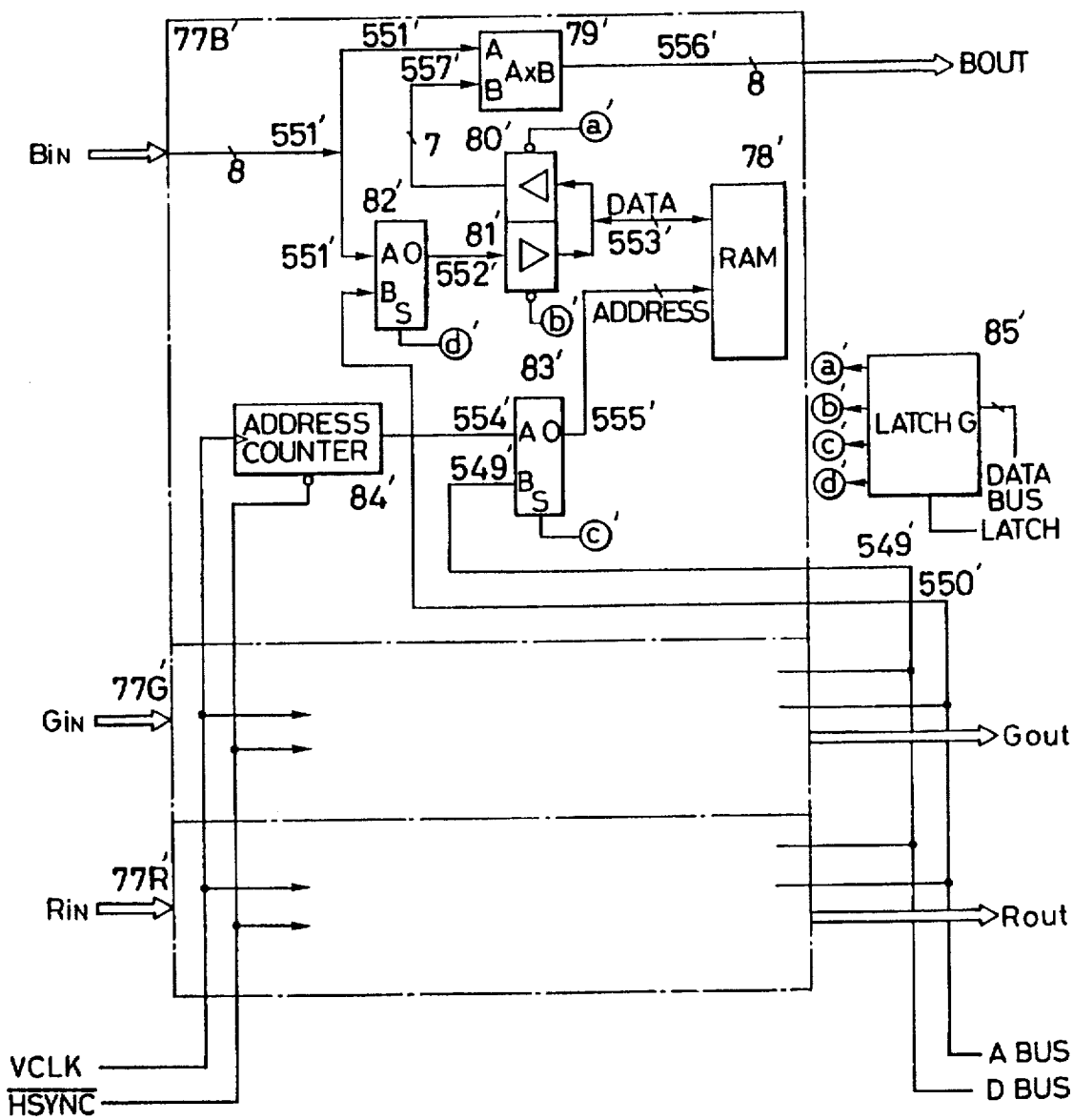
Figure 19:
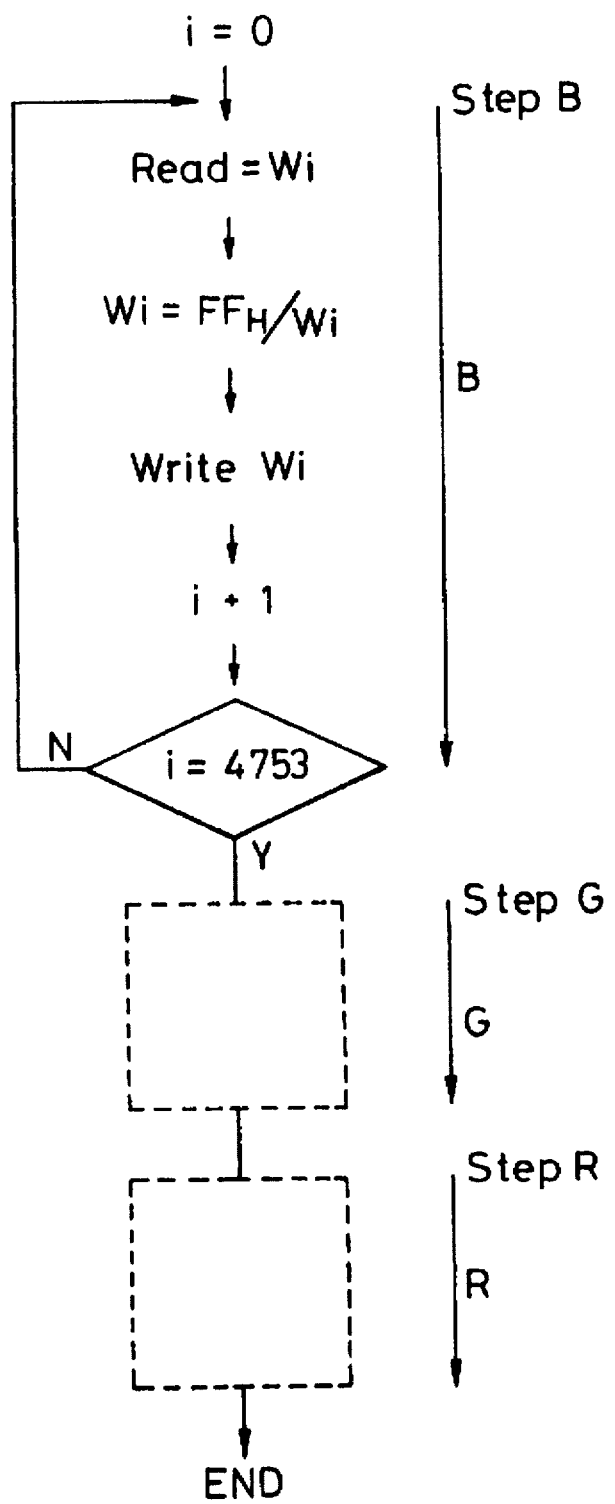
Figure 20:
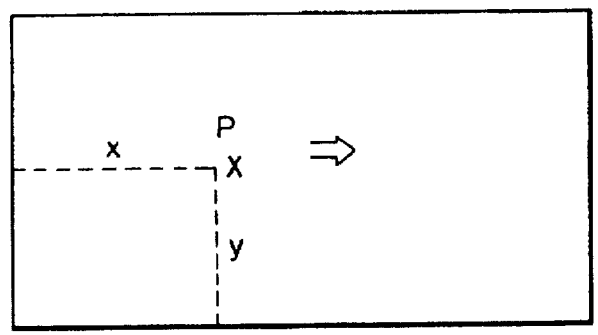
FIG. 20 is an illustration of a line data pick-up mode.

A description will be made hereinafter as to the white level correction (shading correction) with reference to FIGS. 19(a), 19(b) and 19(c). The white level correction is conducted by moving the original scanning unit to the position of a uniform white board 8 (FIG. 9), for the purpose of correcting any fluctuation or variation in the illumination system, optical system and sensor sensitivities, by making use of white color data which is obtained when the white board is illuminated and scanned by the scanning unit. A basic arrangement of this circuit will be described with reference to FIG. 19(a). The white level correction circuit is basically the same as the black level correction circuit shown in FIG. 18(a) except that the white level correction makes use of a multiplier 79' in place of the subtractor 79 used in the black level correction. The portions of the white level correction circuit that are the same as those in the black level correction circuit therefore are not described. Before the copying or reading operation, the original scanning unit is placed at a position corresponding to the uniform white board (home position). In this state, the exposure lamp is turned on and the image data derived from the uniform white level is stored in a correction RAM 78'. Assuming here that the length of the main scan line has a length corresponding to the length of an A4 size paper and that the pixels are arranged at a pitch of 16 pel/mm, there are 4752 pixels (16×297=4752), i.e., the RAM has a capacity of at least 4752 bytes. In consequence, the RAM 78' stores data derived from the white board for each pixel, representing the data carried by the i-th pixel by Wi (i=1 to 4752), as shown in FIG. 19(c). Representing the data read from the ordinary image by the i-th pixel by Di, the data Do after the white-level correction should be represented by Do=Di×FFH/Wi. Therefore, the CPU 22 (see FIG. 2) in the controller operates to close the gate 80' while opening the gate 81' with respect to the latch 85' (a)', (b)', (c)' and (d)'. The CPU also operates to enable the selectors 82' and 83' to select B, thereby enabling the CPU to provide access to the RAM 78'. Then, a series of computations and substitution of data is conducted to substitute FFH/Wo for the pixel Wo, FF/W$_1$ for w$_1$ and so forth. After the completion of this operation for the blue component of the color image in Step B of FIG. 19(d), the same operation is conducted for each of the green component (Step G) and red component (Step R). Then, in order that an output D0=Di×FFH/Wi is obtained in response to successive original image data Di, the gate 80' is opened (a)' while the gate 81' is closed (b)' and the selector 83' selects A, so that the coefficient data FFH/Wi read from the RAM 78' is transmitted through signal lines 553 and 557 so as to be multiplied with the original image data 551 input from the other end.

By virtue of the described arrangement and operation, high processing speed is obtained and correction on the pixel basis becomes possible.

In addition, the described embodiment permits a high-speed input of one-line image data and enables the CPU to conduct RD and WR accesses. Therefore, detection of the component ratios B, G and R of a desired point on the original, e.g., a point P having coordinates (Xmm, Ymm), can be conducted quickly by moving the scanning unit in the x-direction by an amount (16 x x), picking up the data of this line into the RAM 78' in the same manner as that described before, and reading the data carried by the (16 x y)th pixels. This operation will be referred to as line-data pickup mode, hereinafter. The described arrangement also affords computation of mean of the data of a plurality of lines (referred to as mean computing mode, hereinafter), as well as formation of a density histogram (referred to as histogram mode, hereinafter), as will be obvious to those skilled in the art.

Figure 13B:
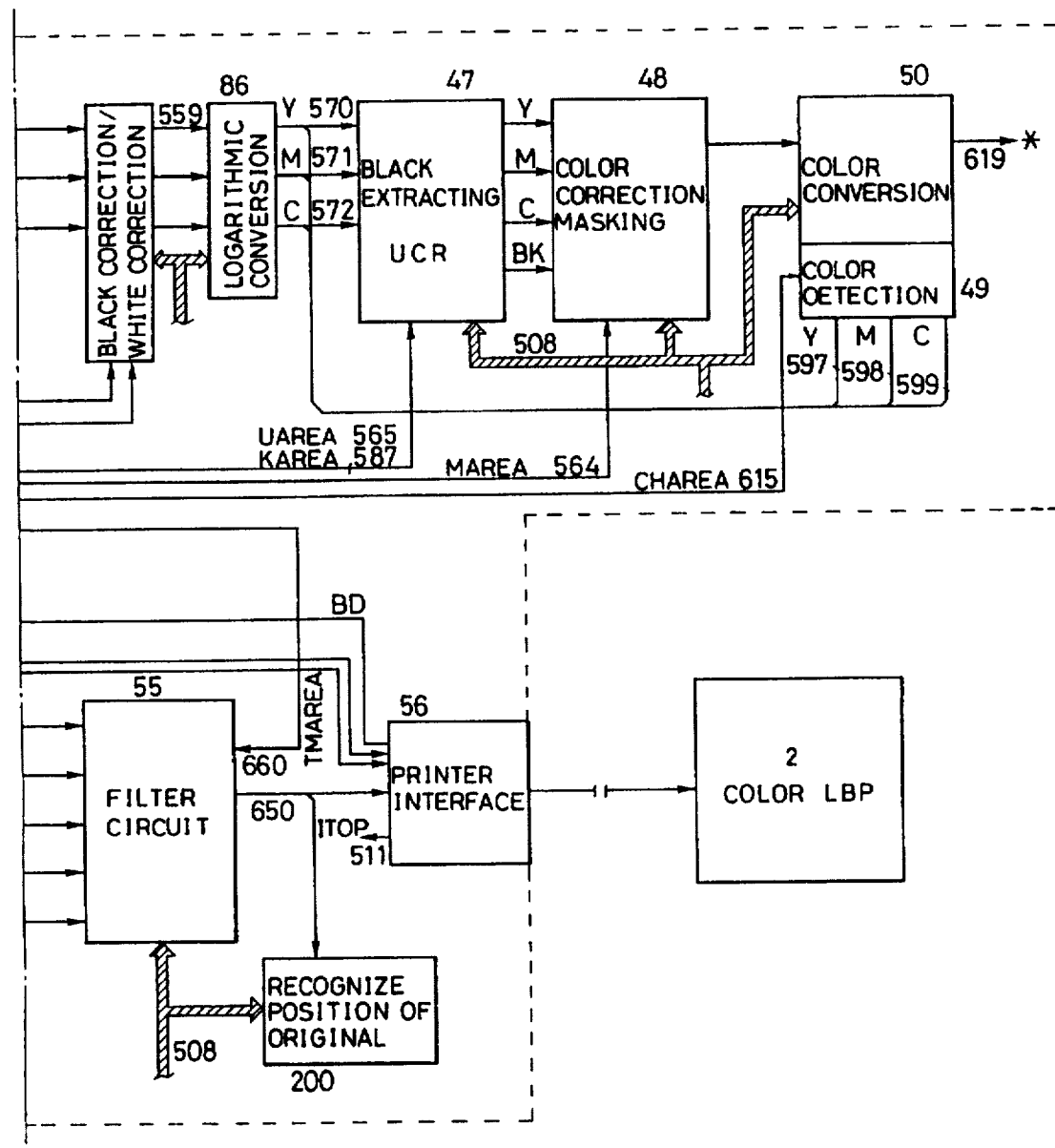

As will be understood from the foregoing description, black-level and white-level corrections are executed to eliminate any adverse effects produced by various causes such as variation in the black-level sensitivity in the image input system, variation in the dark current level, variation of the sensor sensitivity, variation in the light quantity in the optical system, and variation in the white level sensitivity, whereby color image data proportional to the input light quantity and made uniform along the line of the main scan is obtained. This color image data are input to a logarithmic conversion circuit 86 (see FIGS. 13(b) and 21(a) in accordance with the relative luminosity characteristic of human eyes. The logarithmic circuit 86 conducts a conversion such as to meet the conditions of White=OOH and black=FFH. In this embodiment, various types of image source from which the image is input to the image reading sensor are usable, such as an ordinary reflection-type original and a transparent original such as a transparency for an overhead projector, including negative and positive films of various film sensitivities and exposure states. These image sources have different gamma characteristics so that the described embodiment employs a plurality of LUTs (look-up tables) for the logarithmic conversion and selectively uses these tables in accordance with the type of the image source. The selection or change-over of the LUTs is executed through signal lines lg0, lg1, lg2 (560–562) in accordance with the instruction given from, for example, the operating panel through the I/O port of the CPU 22. The data output for the B, G and R colors correspond to the density value of the output image. Namely, the output for the B (blue) color corresponds to the amount of the yellow toner, the output for the G (green) color correpsonds to the amount of the magenta color and the output for the R (red) color corresponds to the amount of cyan toner. The following description concerning the color image data, therefore, will be made on the basis of the toner colors, i.e., Y, M and C. The following color correcting operation is conducted on each of the color component data of the original image obtained from the logrithmic conversion, i.e., the yellow component, magenta component and cyan component. The spectral characteristic of the color-separation filter arranged for each pixel on the color reader has an unnecessary transmission region as hatched in FIG. 22. On the other hand, it is well known that the color toners (Y, M, C) transferred to the transfer paper have unnecessary absorption components as shown in FIG. 23. It is therefore necessary to effect a suitable color correction on the respective color component image data Yi, Mi and Ci. It is known to conduct the correction by so-called masking correction by computing the following equations of the first degree.

$$\begin{pmatrix} Yo \\ Mo \\ Co \end{pmatrix} = \begin{pmatrix} aY1 & -bM1 & -Cc1 \\ aY2 & bM2 & Cc2 \\ -aY3 & -bM3 & Cc3 \end{pmatrix} \begin{pmatrix} Yi \\ Mi \\ Ci \end{pmatrix}$$

An operation called "inking" also is known in which minimum values Min(Yi, Mi, Ci) of the data Yi, Mi and Ci and black toner is added in accordance with the amount of the "ink" which are the values Min (Yi, Mi, Ci). It is also well known to conduct under-color removal (UCR) in which the amount of each toner is decreased in accordance with the black component added by inking.

FIG. 24(a) shows a circuit for effecting various operations such as masking, inking and UCR.

This circuit has the following features.

(1) There are two matrix systems which are switchable from one to the other at a high speed by "1/0" of a single signal line.

(2) Whether UCR is to be conducted or not can be selected at a high speed by "1/0" of a single signal line.

(3) There are two circuits for determining the amount of inking which are switchable from one to the other at a high speed in accordance with "1/0" of a single signal line.

In advance of the reading of the image, desired first matrix coefficient $M_1$ and second matrix coefficient $M_2$ are set through a BUS connected to the CPU.

In this embodiment, the following coefficients $M_1$ and $M_2$ are set in registers 87 to 95 and 96 to 104, respectively.

$$M_1 = \begin{pmatrix} aY1 & -bM1 & -Cc1 \\ -aY2 & bM2 & Cc2 \\ -aY3 & -bM3 & Cc3 \end{pmatrix} \quad M_2 = \begin{pmatrix} \alpha Y1 & -\beta M1 & -\gamma C1 \\ -\alpha Y2 & \beta M_2 & \gamma C2 \\ -\alpha Y3 & -\beta M3 & \gamma C3 \end{pmatrix}$$

Numerals 111 to 122, 135, 131 denote selectors, each of which is adapted to select A when "1" is set on the S terminal thereof and B when "0" is on the S terminal. For selecting the matrix $M_1$, therefore, a change-over signal MAREA 564 is set as MAREA 564="1" whereas, when the matrix $M_2$ is to be selected, the same signal is set as "0". A reference numeral 123 denotes a selector which operates in response to selection signals $C_0$, $C_1$ (566, 567) to selectively output a, b or c in accordance with the truth table shown in FIG. 24(b). The selection signals $C_0$, $C_1$ and $C_2$ are set to correspond to the color signals to be output. More specifially, these selection signals are set as ($C_2$, $C_1$, $C_0$)=(0,0,0), (0,0,1), (0,1,0) and (1,0,0) for the Y, M,C and Bk colors. In addition, these signals are set as (0,1,1) as a monochromatic signal. It is therefore possible to obtain desired corrected color signals.

It is assumed here that the selection signals and the change-over signals are set as ($C_0$, $C_1$, $C_2$)=(0,0,0) and MAREA="1". In such a case, the contents of the registers 87, 88 and 89, i.e., (aY1, -bM1, -Cc1) are obtained as the outputs (a, b, c) of the selector 123. On the other hand, the black component signal 574 which is computed as Min(Yi, Mi, Ci) in circuit 132 from the input signals Yi, Mi, Ci is subjected to a primary conversion of Y=ax - b (a,b are constants) in 134 and, then, delivered to the inputs of the B input of the subtractors 124,125 and 126 through the selector 135. The subtractors 124 to 126 conduct the under-color removal by executing the computation of Y=Yi−(ak−b), M=Mi−(ak−b) and C=Ci−(ak−b), the results of which are delivered through the signal lines 577, 578 and 579 to the multipliers 127, 128 and 129 which are designed to conduct masking computation. The selector 135 is controlled in accordance with a signal UAREA 565 the "1/0" state of which is switchable at a high speed to represent whether the UCR operation is to be conducted or not. Each of the multipliers 127, 128 and 129 receive at its A input the signal (aY1, −bM1, −Ccl) and at its B input the aforementioned [Yi−(ak−b), Mi−)ak−b), Ci−)ak b)] =[Yi, Ni, Ci]. Therefore, as will be seen from this Figure, the following output Yout is obtained as the output Dout on condition of $C_2=0$ (Selection of Y or M or C).

$$Yout=Yi\times(ay1)+Mi\times(-bM1)+Ci\times(-Ccl1)$$

It is thus possible to obtain an yellow image data which has been subjected to masking correction and under-color removal.

Similarly, the following magenta and cyan image data Mout and Cout signals are obtained.

$$Mout=Yi\times(-ay2)+Mi\times(-bM2)+Ci\times(-Cc2)$$

$$Cout=Yi\times(-ay3)+Mi\times(-bM3)+Ci\times(-Cc3)$$

The selection of the color is controled by the CPU 22 in accordance with the values ($C_0$, $C_1$, $C_2$) of the table in FIG. 24(b) and in accordance with the sequence of development to be conducted by the color printer. The registers 105 to 107 and 108 to 110 are registers for forming monochromatic images. The monochromatic image is formed by putting weights to the respective color components in accordance with the formula MONO=$k_1$Yi+$l_1$Mi+$m_1$Ci. The change-over signal MAREA 564 is used for high-speed switching between the masking color correction coefficients $M_1$ and $M_2$, while the change-over signal UAREA is used for appointing the UCR. A change-over signal KAREA 587 is used for the purpose of conducting primary conversion switching of the black component signal which is delivered to the Dout through the signal line 569 and the selector 131. Namely, a high speed change-over is executed between Y=ck−d and Y=ek−f (c, d, e, f being parameters), when a black component of K=Min(Yi, Mi, Ci) is given. Numerals 133A and 134A denote circuits for outputting inking amount, while 135A denotes a selector for selecting output from one of the circuits 133A and 134A. It is thus possible to vary the masking coefficient, UCR amount and inking amount according to areas of the same copy image. This arrangement, therefore can be used in a synthesis of an image from a plurality of images derived from different image input sources of different color separation character-istics or from a plurality of images having different black tones. These area signals MAREA, UAREA, KAREA (564, 565, 587) are generated by a later-mentioned area gerating circuit denoted by 51 in FIG. 13.

FIGS. 25(a) to 25(d) illustrates an operation for generat-ing the area signals MAREA, UAREA, KAREA (564, 565, 587) mentioned above. The term "area" is used to mean, for example, a region as hatched in FIG. 25(e). This area is demarcated by a signal AREA appearing in the timing chart of FIG. 25(e) and generated for each line in the region defined between A and B in the direction of the sub-scan.

Figure 25A:
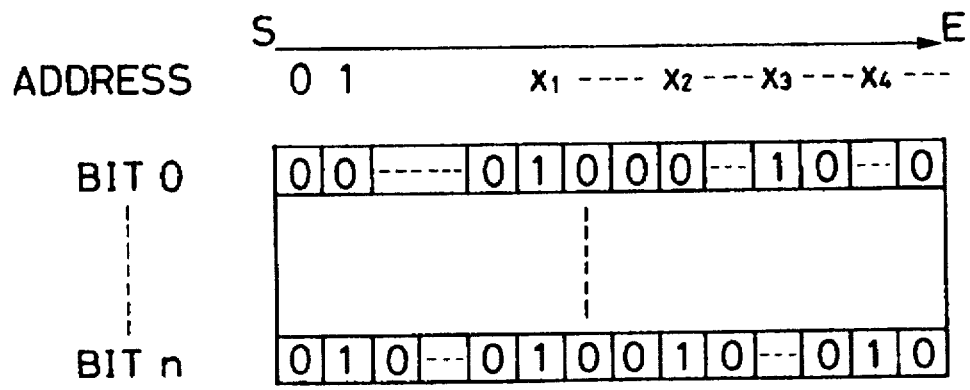
FIGS. 25(a), 25(b), 25(c), 25(d), 25(e), 25(f) and 25(g) are illustrations of region signal generating operation characteristics and circuits.
Figure 25B:
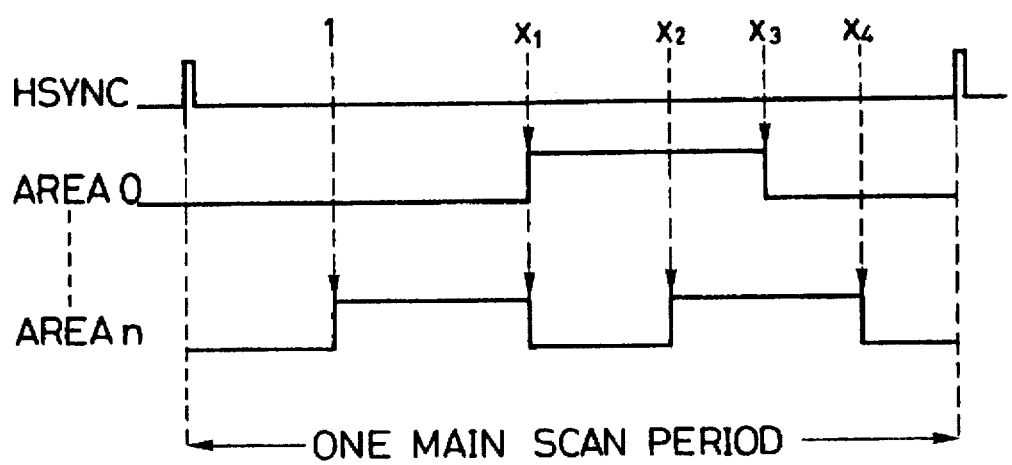
Figure 25C:
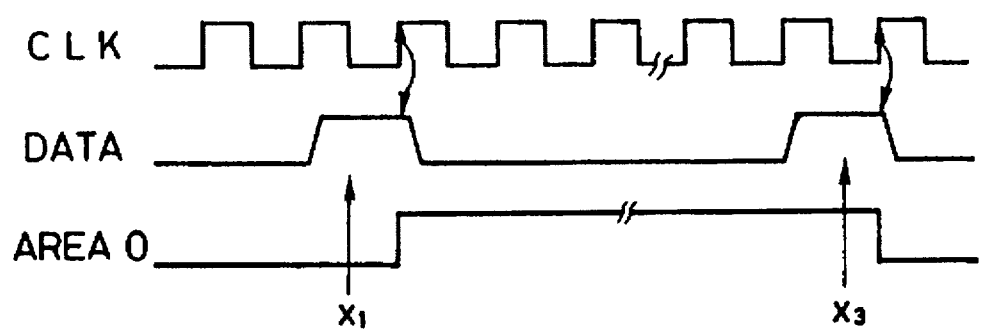
Figure 25D:
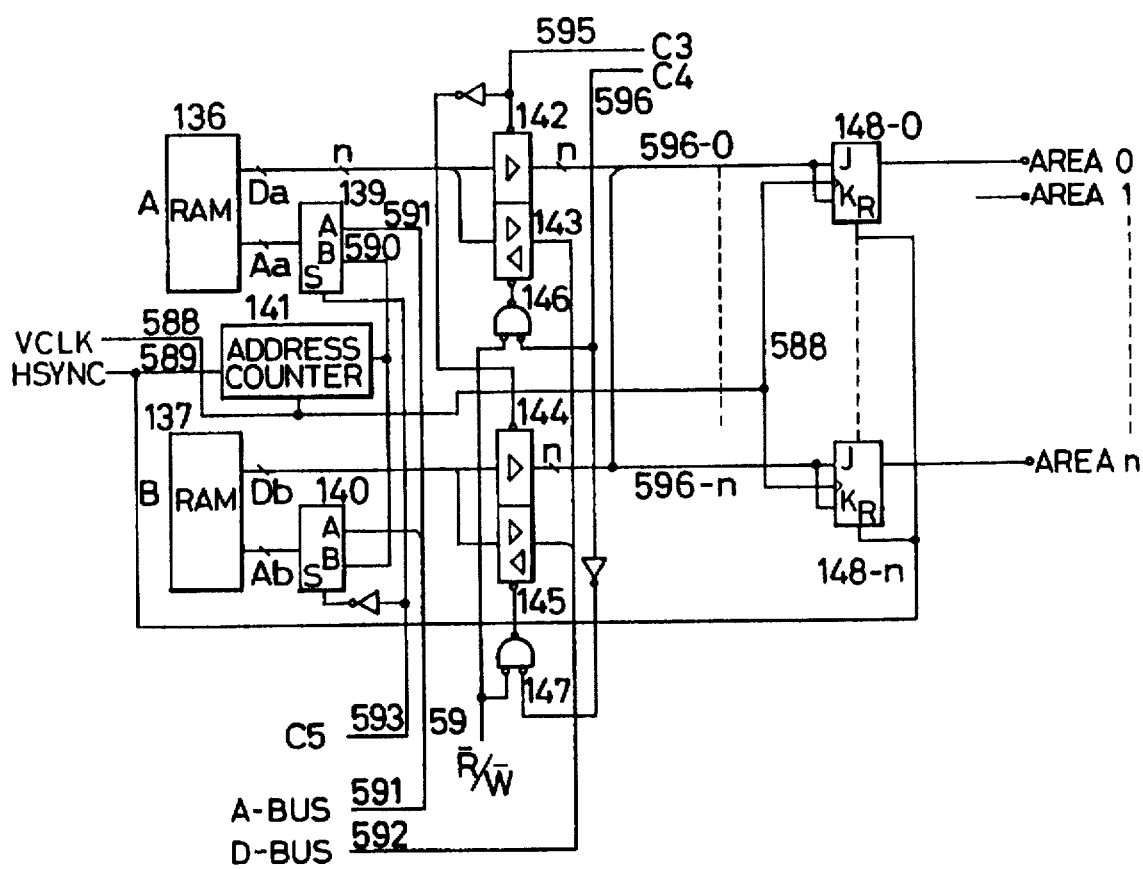
Figure 25E:
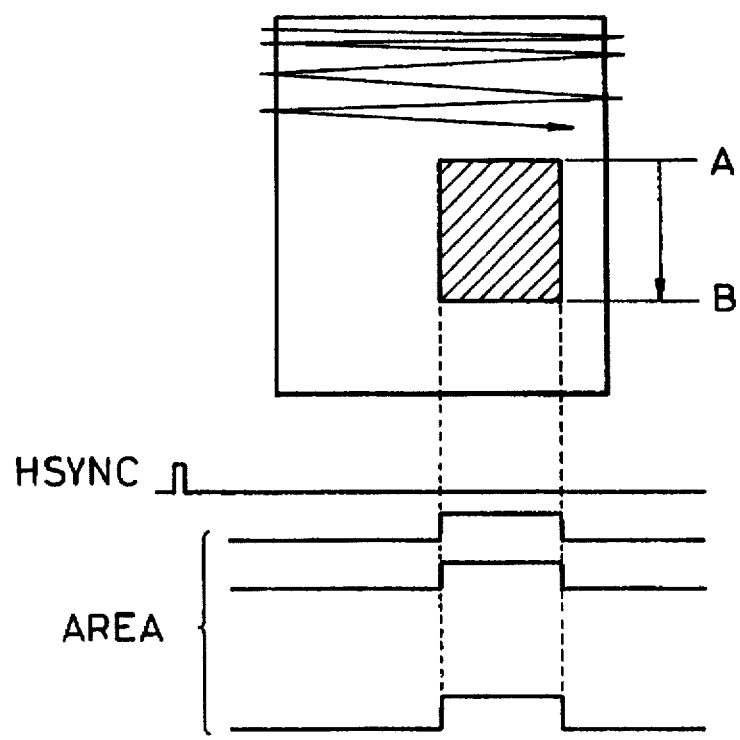
Figure 25F:
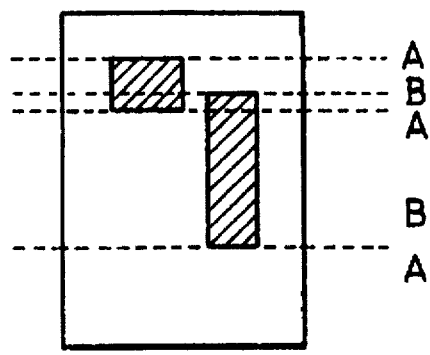
Figures 25G, 26B, 26C:
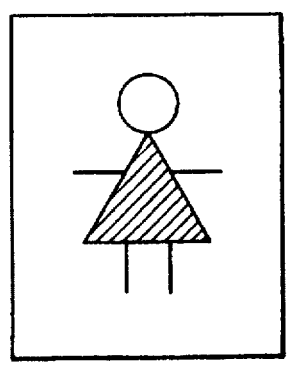
FIGS. 26(a), 26(b), 26(c), 26(d) and 26(e) are illustrations of color conversion and a circuit therefor.

Each area can be appointed by means of a digitizer 16 which is shown in FIG. 9. FIGS. 25(a) to 25(d) illustrate an arrangement which enables the positions of generation of the area signal, length of the area and the number of areas in a multiplicity of combinations and in a programmable manner by the CPU 22. According to this arrangement, one area signal is generated by one bit of a RAM which is accessible by the CPU. There are two RAMs 136 and 137 in FIG. 25(d), each having n bits so that n pieces of area signals AREA0 to AREAn are obtained. It is assumed here that area signals AREA0 and AREA have been obtained as shown in FIG. 25(b). In such a case, the bit 0 of each of the addresses $x_1$ and $x_3$ of the RAM are set as "1" while the bits 0 of other addresses are all set as "0". On the other hand, "1" is set on the addresses 1, $x_1$, $x_2$ and $x_4$ of the RAM, while the bits n of all other addresses are set as "0". Then, the data in the RAM is sequentially read in synchronization with a prede-termined clock in accordance with the synchronism signal HSYNC. As a result, "1" is read at each of the addresses $x_1$ and $x_3$ as will be seen from FIG. 25(b). The thus read data are input to the J and K terminals of the J-K flip-flops 148-0 to 148-n of FIG. 25(d). The outputs therefore are changed from "0" to "1" and vice versa by the toggle operation, i.e., when "1" is read from the RAM while CLK is input, whereby a section signal such as AREA0, i.e., a region signal is generated. When data="0" is the condition over the all of the addresses, there is no area nor section so that no area is appointed. FIG. 25(d) illustrates the arrangement of this circuit. The RAMs mentioned before are denoted by 136 and 137 in this Figure. In order to conduct a high-speed change-over of the area section, CPU 22 (see FIG. 10) conducts an operation for writing for setting a different area while the line data are successively read from the RAM 136, so that generation of area and writing of data from the CPU into the memory are conducted and switched alternately. It is assumed here that a hatched area shown in FIG. 25(f) has been appointed. In such a case, the RAMs are switched such that the RAM A is used first and then the RAM B is used which is then switched again to the RAM A. More specifically, referring to FIG. 25(d), the values are set such as to meet the condition of ($C_3$, $C_4$, $C_5$)=(0,1,0) so that the counter 141 output counted in accordance with the VCLK is delivered to the RAM 136 through the selector 139 (Aa), with the result that the gate 142 is opened while the gate 144 is closed, whereby n-bits are input to the J-K flip-flops 148-0 to 148-n. In consequence, the section signals AREA0 to AREAn generated in accordance with the set values. Meanwhile, writing of data from the CPU to RAM executed in accordance with an access signal R/W through an address BUS A-BUS 591 and a data BUS D-BUS 592. Conversely, when it is desired to generate a section signal on the basis of data set in the RAM B 137, values are set as ($C_3$, $C_4$, $C_5$)=(1,0,1) so that the data is written into the RAM A 136 in the same manner as that explained above. These two RAMs will be referred to as A-RAM and B-RAM hereinafter, while $C_3$, $C_4$ and $C_5$ will be referred to as the AREA control signal (ARCNT). The AREA control signals are output from the I/O port of the CPU. The relationships between the bits and names of the signals are shown in FIG. 25(g). The circuit arrangement for color conversion will be explained with reference to FIG. 25(a). The term "color conversion" is used to mean to convert or alter a specific color input to this circuit and having color component data (Yi, Mi, Ci) of a specific color density or a specific color component ratio into another color. For instance, the color conversion is an operation for converting only the read (hatched) area of the original in FIG. 26(c) into blue color.

The respective color data (Yi, Mi, Ci) input to this circuit is averaged by averaging circuits 149, 150, 151 which computes the mean of data carried by eight pixels. The averages are on the one hand delivered to an adder 155 which computes (Yi+Mi+Ci) which is delivered to B inputs of the dividers 152, 153, 154 and on the other hand to the A inputs of the same dividers. The thus input color component ratios are obtained through signal lines 604, 605 and 606, respectively, as the yellow ratio ray=Yi/Yi+Mi+Ci, magenta ratio ram=Mi/Yi+Mi+Ci and the cyan ratio rac=Ci/Yi+Mi+Ci. These ratios are then input to window comparators 156 to 158, respectively. The window comparators 156 to 158 compare the above-mentioned ratios with the upper and lower limits of the respective color components, i.e., whether the computed ratios fall between the upper limit values (yu, mu, cu) and the lower limit values (yl, ml, cl). Namely, the window comparator 156 produces an output "1" when the condition of yl ray yu is met. Similarly, the window comparators 157 and 158 produce outputs of "1" when the conditions of ml ram mu and cl rac cu are met, respectively. When all these three conditions are met, i.e., when "1" is output from all the window comparators, the input color is judged as being the color which has been desired, so that an AND circuit 165 having three inputs produces an output "1" which is then input to the $S_0$ input of the selector 175. The adder 155 has an output 603 which is given as 603=Ai when the signal line CHGCNT 607 connected to the I/O port of the CPU 22 carries "1". Conversely, when this signal line carries "0", the adder 155 outputs 603=1. Thus, when the signal line CHGCNT 607 carries "0", the dividers 152 and 153 directly deliver the A input. Namely, in such a case, color density data is set in the registers 159 to 164 rather than the desired color component ratio. A reference numeral 175 designates a selector having four inputs and one output. Inputs 1, 2 and 3 receive Y, M and C components as the color data of the color which is to be obtained after the conversion. The remaining input 4 receives data Vin which has been obtained by conducting masking correction and UCR on the original image which has been read. The selector 175 is connected to the output Dout shown in FIG. 16(a). The change-over input $S_0$ takes a value "1" when the color detection is "true", i.e., when the predetermined color has been detected, otherwise the change-over input $S_0$ takes the level "0". A symbol $S_1$ represents an area signal CHAREA 615 which is generated by the region generating circuit shown in FIG. 25(d). This signal takes "1" and "0" level when a designated point is within an appointed area and out of the appointed area, respectively. Color conversion is conducted when this signal takes "1" level, whereas, when this signal takes "0" level, the conversion is not conducted. The $S_2$ and $S_3$ inputs $C_0$, $C_1$ (616,617) are the same as the signals $C_0$, $C_1$ shown in FIG. 24(a). Thus, the color printer operates to form yellow, magneta and cyan images on conditions of ($C_0$, $C_1$)=(0,0), (0,1) and (1,0), respectively. FIG. 26(b) shows the truth table for the selector 175. Color component ratios or the color component density data of the color to be obtained after the conversion are set in the registers 166 to 168 by means of the CPU. In case of a color having a color component ratios of y', m' and c', the signal CHGCNT 607 is set as CHGCNT 607="1" so that the output 603 of the adder 155 is obtained as (Yi+Mi+Ci) which is input to the B inputs of the multipliers 169 to 171. In consequence, the following data are input to the selector inputs 1, 2 and 3, respectively.

Yi+Mi+Ci)×y', (Yi+Mi+Ci)×m'(Yi+Mi+Ci)×c'

These inputs are color-converted in accordance with the truth table of FIG. 26(b). In the case of a color having a color component density data y', m', c', the signal CHGCNT is set as CHGCNT="0", so that a signal of 603="1" is obtained As a result, the data (y', m', c') are input directly from the outputs of the multipliers 169 to 171, i.e., to the inputs, 1, 2, 3 of the selector 175, whereby a color conversion is effected by the substitution of the color component density data. The area signal CHAREA 615 enables the area length and the area number to be set freely. It is therefore possible to effect the color conversion only on a plurality of selected areas $r_1$, $r_2$, $r_3$ as shown in FIG. 26(d) or to effect such a conversion that the red colors in the areas $r_1$, $r_2$ and $r_3$ are converted, respectively, into blue, yellow and white, by arranging a plurality of circuits of the type shown in FIG. 18(a). In any case, the color conversion can be effected at a high speed in real time. More specifically, the color detection circuit and the conversion circuit, the same as those described, before are arranged in plural and the required data is selected in accordance with signals CHSEL0 and CHSEL1 from the outputs A, B, C and D of these circuits, by means of the selector 230, and the selected data is output from the output 619. The area signals CHAREA0 to CHAREA3, as well as the selection signals CHSEL0 and CHSEL1, are generated by the area generating circuit 51 as shown in FIG. 25(d).

Figure 60A:
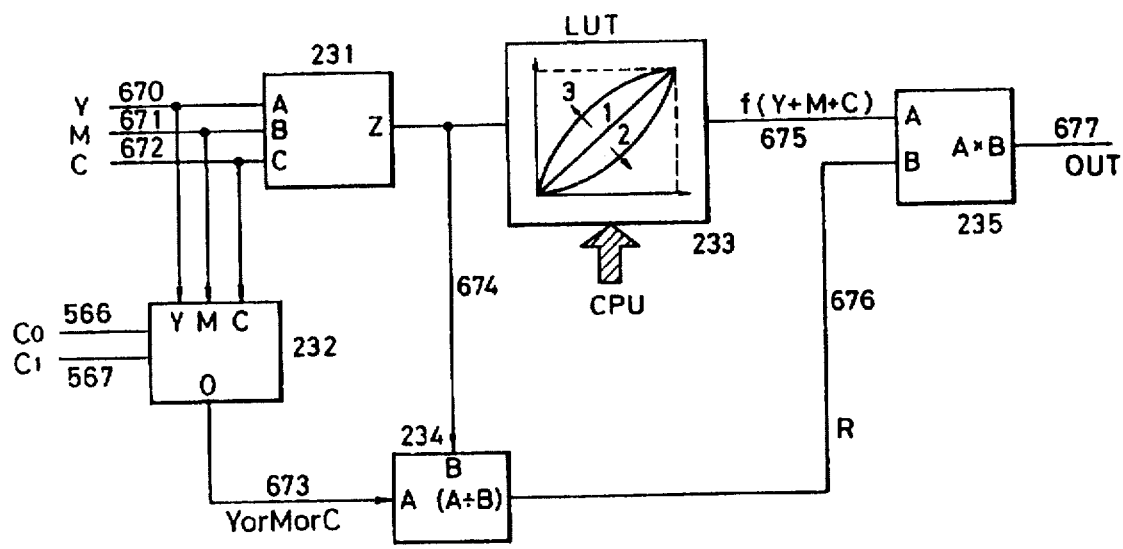
FIGS. 60(a), 60(b) and 60(c) are illustrations of operation for density correction conducted in the embodiment of the invention.
Figure 60B:
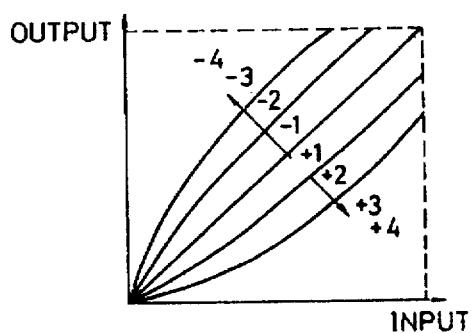
Figure 60C:
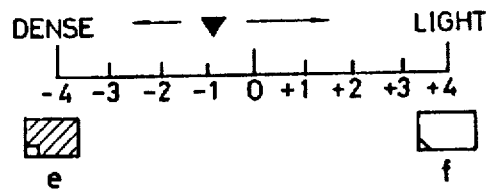
Figure 61A:
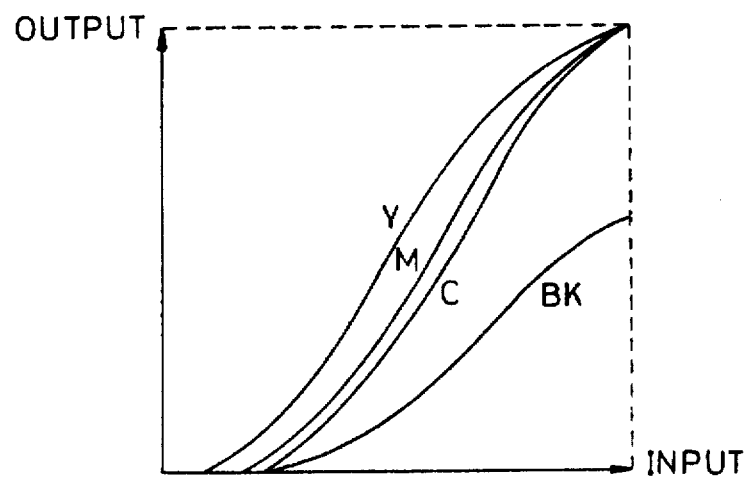
FIGS. 61(a), 61(b) and 61(c) are illustrations of a conventional method of effecting density correction.
Figure 61B:
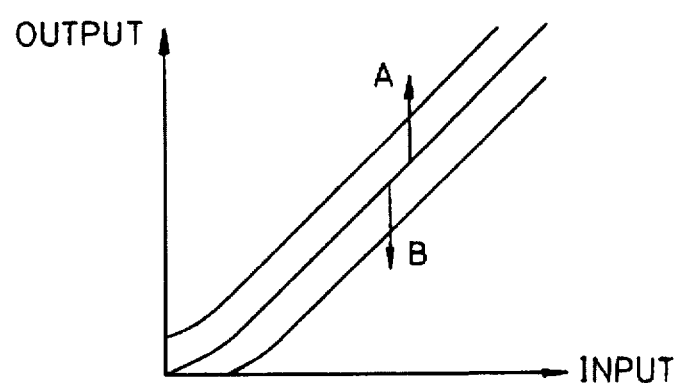
Figure 61C:
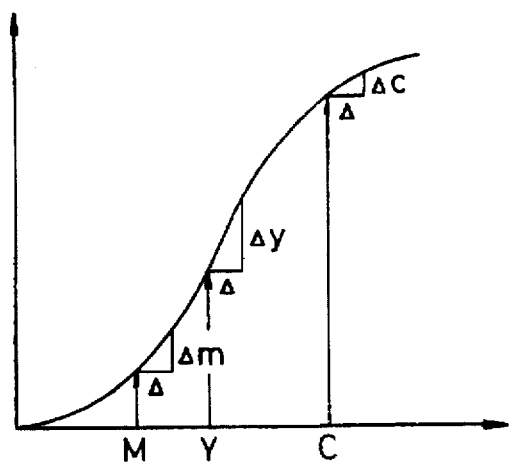

FIG. 60(a) shows a density control circuit which constitutes an essential portion of the present invention. When a density control key e or f on a panel 000 (standard display frame) shown in FIG. 60(b) is pressed by a finger of an operator, the density characteristic is changed from −1 to −2, −2 to −3, −3 to −4 and so forth or from +1 to 2, +2 to +_3, +3 to +4 and so forth. Thus, the operation of the circuit corresponds to the manipulation. Referring to FIG. 60(a), a reference numeral 231 denotes an adder having three inputs A, B and C which receive, respectively, digital data Y(670), M(671) and C(672). Upon receipt of these inputs, the adder 231 produces an output which is expressed by Σ=Y+M+C (674). This output is delivered on the one hand to the LUT 233 and on the other hand to a divider circuit 234. A reference numeral 232 designates an input selector. As shown in FIG. 24(b), the selector selects one of the inputs Y, M and C and is connected to the other input of the divider 234. Thus, the divider 234 delivers an output R which is given as RY=Y/Y+M+C($C_0$, $C_1$=0,0), RM=M/Y+M+C ($C_0$, $C_1$=1, 0) and RC=C/Y+M+C($C_0$, $C_1$=1,0), respectively, when yellow, magenta and cyan are selected. Thus, the outputs R are component ratios of the color component image data input to this circuit block. A reference numeral 233 denotes a look-up table LUT for data conversion. This LUT has the same construction as the table shown in FIG. 27(b) and is constituted by a RAM accessible by the CPU. The table is formed by loading the data group stored in the ROM 23 of FIG. 10 in this RAM. The characteristics of the LUT are switchable between a plurality of combinations in response to the touch of the touch panel key on the control section. The output f (Y+M+C) after a desired data conversion is delivered to one of the inputs of the multiplier circuit 235 while the other input receives the component ratios of the respective colors, whereby outputs $Y_{OUT}$=f(Y+M+C)× $R_y$, $M_{OUT}$=f (Y+M+Ca×$R_M$ and $C_{OUT}$=f(Y+M+C) are obtained for the yellow, magenta and cyan colors. Although the image data of the yellow, magneta and cyan colors undergo the desired density conversion, the color component ratios are maintained unchanged as will be seen from the following formula.

$Y_{OUT}$: $M_{OUT}$: $C_{OUT}$=Y/Y+M+C: M/Y+M+C: C/Y+M+C=Y:M:C

Thus, the color balance is never changed regardless of the conversion characteristic f (Y+M+C).

Figure 27A:
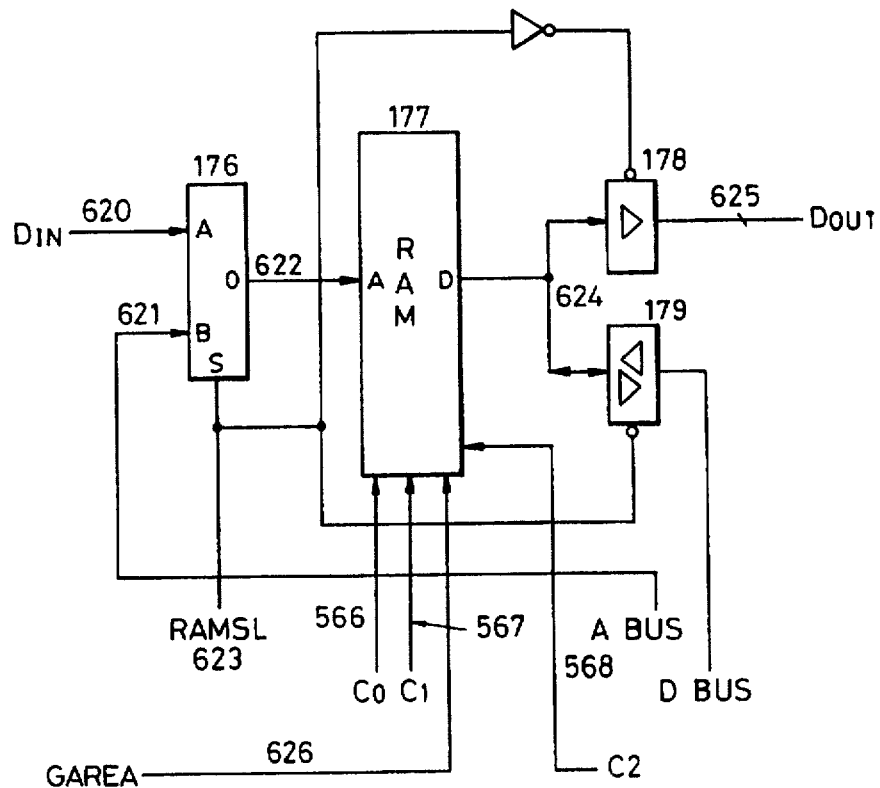
FIGS. 27(a), 27(b), 27(c), 27(d), 27(e) and 27(f) are illustrations of gamma correction for color balancing and color density control and a circuit therefor.
Figure 27B:
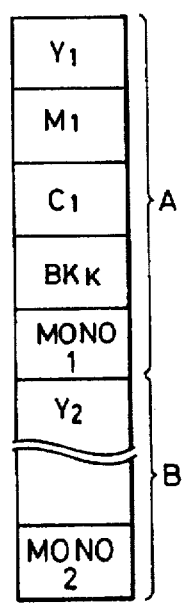
Figure 27C:
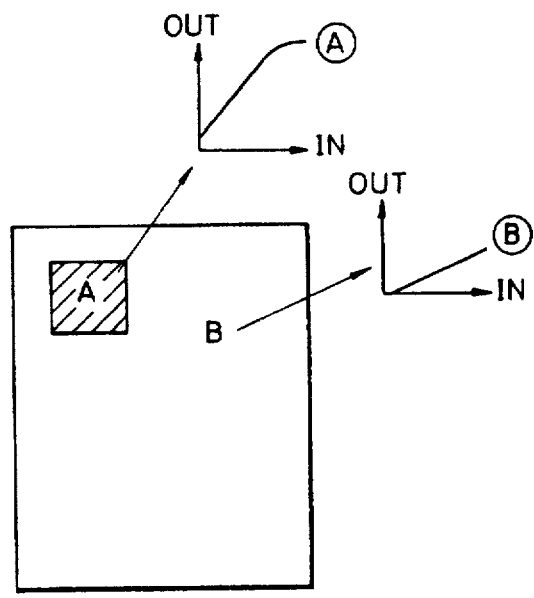
Figure 27D:
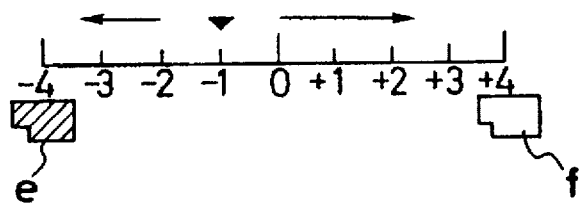
Figure 27E:
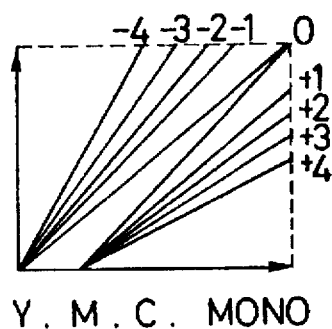

FIG. 27(a) shows a color balance control circuit for controlling the color balance of the output image in this system. Basically, this circuit is a data conversion circuit which makes use of an LUT (look-up table) and the data in the LUT is rewritten in response to the input from the operating section. When the selection signal line RAMSL 623 is set at "0", the selector 176 selects the B input so that the gate 178 is opened while the gate 179 is closed, whereby the address BUS from the CPU 22 and the data BUS DBUS are connected to the RAM 177, thus enabling the writing or reading of the data in and from the RAM 177. Once the conversion table is formed, the condition of RAMSL 623= "1" is established so that the video input from the Din 620 is input to the address input of the RAM 177 and is addressed by the video data whereby the desired data is output from the RAM and input to the zooming control circuit of the next stage through the gate 178 which is now open. This RAM has at least five tables, for yellow, magenta, cyan, black and MONO, and at least two types (A and B shown in FIG. 27(b)) of conversion characteristics are available. As in the case of the arrangement shown in FIG. 24, the change-over of the color is conducted in accordance with the signals $C_0$, $C_1$, $C_2$ (566, 567, 568). In addition, this arrangement enables a single print to be obtained with different conversion characteristics applied to different areas, e.g., characteristic A to the area A and characteristic B to the area B, as shown in FIG. 27(c) by a signal GAREA 626 generated by the aforementioned area generating circuit shown in FIG. 25(d).

In this embodiment, the RAM has two types of conversion characteristics A and B which are switchable at different areas. This, however, is only illustrative and the RAM may have a greater number of types of conversion characteristics which can be switched at high speed. The Dout 625 shown in FIG. 27(a) is input to the input Din 626 of the zooming control circuit shown in FIG. 28(a).

As will be clearly understood from the drawings, this conversion RAM is capable of changing the characteristic for each of the colors independently of other colors. The changing of the characteristic is effected by the CPU 22 in accordance with the operation of the liquid crystal touch panel key on the operating panel.

Figure 27F:
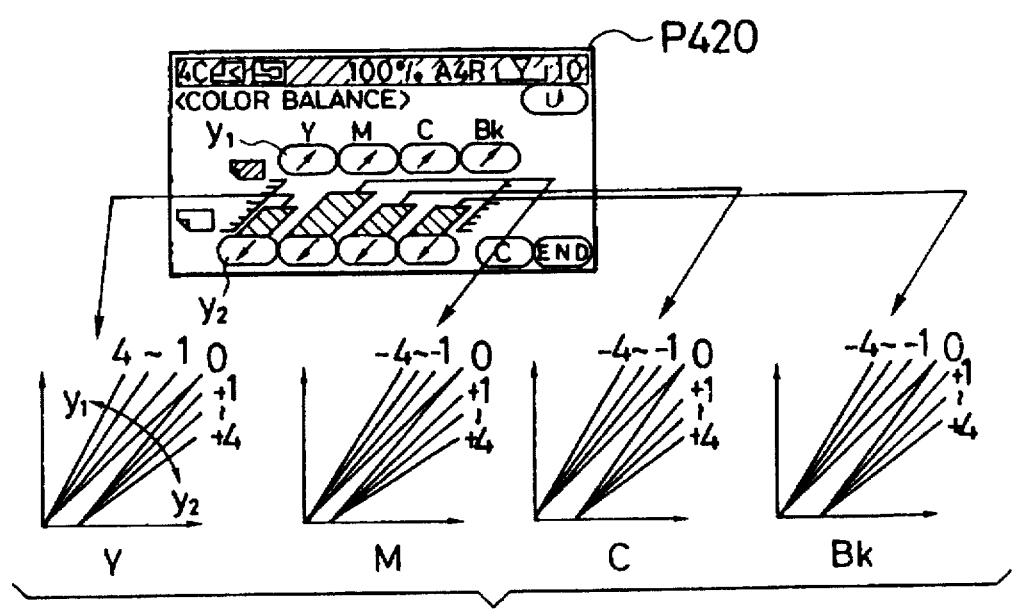

For instance, the picture frame P 420 of FIGS. 27(f) and 45(a), which displays the color balance operation in <Color Create Mode> enables the rewriting of the area in the RAM 177 for each of the Y, M, C and Bk colors independently of other colors. For instance, when it is desired to change the color tone of the yellow component, the user presses a touch key $Y_1$ in the picture frame P 420 so that the indication of a black level extends upward with the result that the conversion characteristic is changed in the direction of $Y_1$, i.e., in such a direction as to increase the yellow component, as shown by Y in FIG. 27(f). Conversely, if another touch key $Y_2$ is touched, the characteristic is changed in the direction of $Y_2$ so that the yellow color becomes light gradually. Thus, this operation causes a change in the density of only one color component, so that the color tone of the color image is changed. The same operation can be effected on M,C and Bk, respectively.

Figure 28:
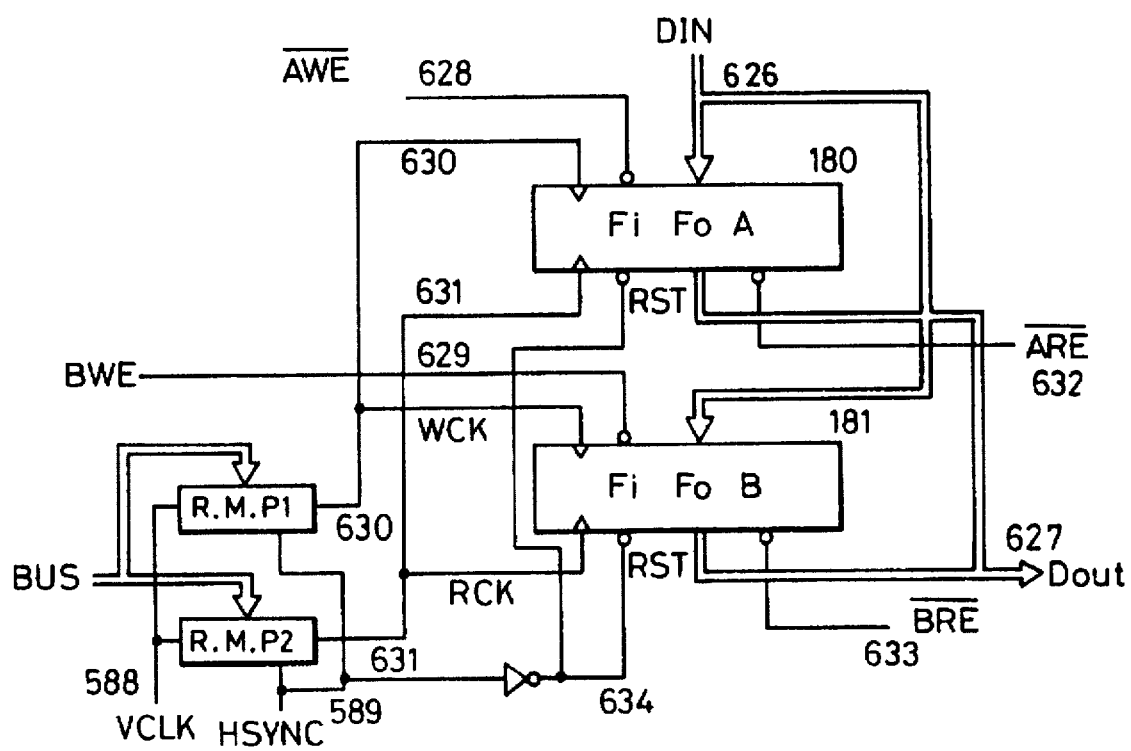
FIGS. 28(a), 28(b), 28(c), 28(d), 28(e), 28(f) and 28(g) are illustrations of zooming control and a circuit therefor.
Figure 28:
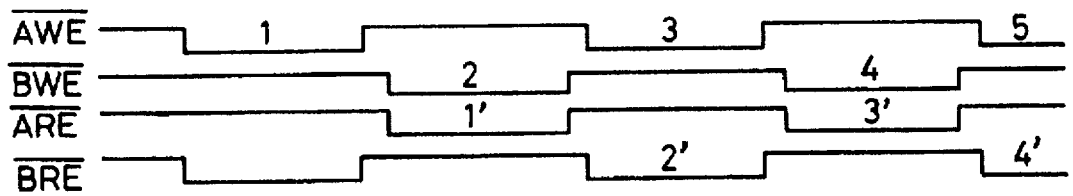
Figure 28C:
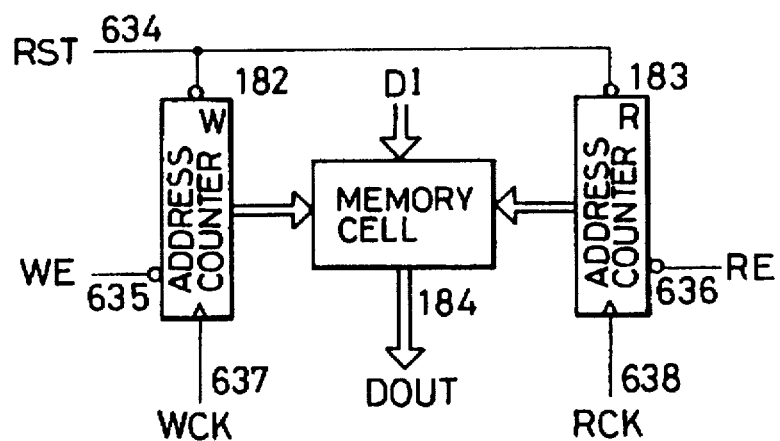
Figure 28D:
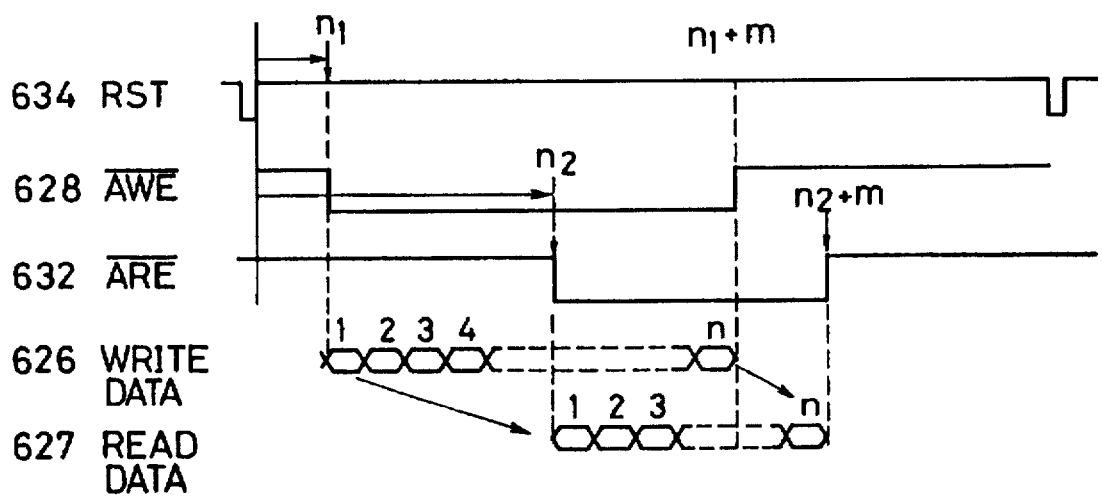
Figure 28:
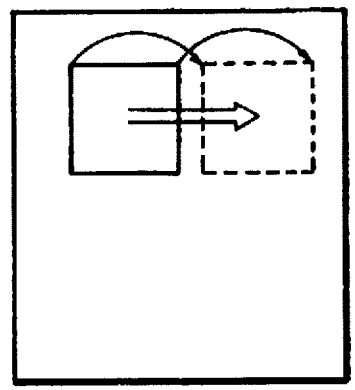
Figure 28:
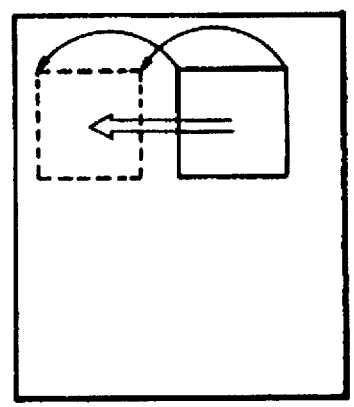
Figure 28:
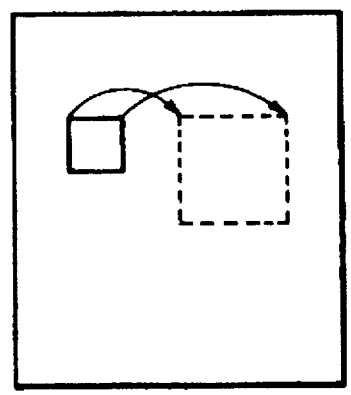

Referring to FIGS. 28(a), reference numerals 180 and 181 denote FiFo memories each of which has a capacity corresponding to 4752 pixels in the direction of the main scan, assuming that each line of main scan has pixels arranged at a pitch of 16 pel/mm and has a length of 297 mm which is the same as the length of an A4 size paper. As will be seen from FIG. 28(b), writing of data into the memory is conducted during a period of $\overline{AWE}$, $\overline{BWE}$="Lo", while reading is conducted during a period of $\overline{ARE}$, $\overline{BRE}$="Lo". The output of FiFo A 180 and the output of FiFo B 181 become a state of high impedance in the periods of $\overline{ARE}$="Hi" and $\overline{BRE}$="Hi", respectively. The wired OR of these outputs are computed and output as the Dout 627. FiFo A and FiFo B 180 and 181 have, respectively, internal pointers which advance by means of write address counters and read address counters (see FIG. 28(c)) which in turn operate in accordance with clocks WCK and RCK, respectively. As is well known, if a clock formed by demultiplying the video transfer clock VCLK 588 in the system by a rate multiplier 1 630 is used as the clock WCK while the video transfer clock VCLK without demultiplication is used as the clock RCK, the data input to this circuit is contracted during outputting. If the clocks are reversed, the input data is enlarged when output. FiFo A and FiFo B conduct the read and write operations alternatingly. Furthermore, the W address counter 182 and the R address counter 183 in the FiFo memories 180 and 181 count up only when the enable signal (WE, RE . . . 635, 636) is "Lo", and are reset to the initial states by a reset signal RST (634)="Lo". An operation for moving an image by making use of this characteristic will be explained with reference to FIG. 28(d). After the resetting by RST (synchronizing signal $\overline{HSYNC}$ in the direction of main scan is used in this embodiment), condition of $\overline{AWE}$="Lo", as well as $\overline{BWE}$="Lo" is maintained for a period of scanning over m pixels as counted from the $n_1$-th pixel so as to write the image data, while a condition of $\overline{ARE}$="Lo", as well as $\overline{BRE}$="Lo", is maintained for a period of scan over m pixels as counted from the $n_2$-th pixel, so that the image data is moved from WRITE data to READ data as shown in FIG. 28(d). Thus, by varying the positions and durations of generation of $\overline{AWE}$ (and $\overline{BWE}$) and $\overline{ARE}$ (and $\overline{BRE}$), it is possible to move the image in the direction of the main scan as desired, as shown in FIGS. 28(e), 28(f) and 28(g). This operation can be combined with the zoom-out zoom-in operation which is conducted by selecting the combination of the demultiplied or non-demultiplied clocks WCK and RCK. It is therefore possible to easily carry out the operation for moving an image with or without zooming operation. The signals AWE, ARE, BWE and BRE are generated as described before by the area generating circuit shown in FIG. 25(d).

A zooming operation for zooming in or out the image in the direction of the main scan is conducted as required as shown in FIG. 28(g). The signals AWE, ARE, BWE and BRE input to the circuit of FIG. 28(a) are generated by the area generating circuit shown in FIG. 25(d), in a manner which will be explained later.

Figure 29:
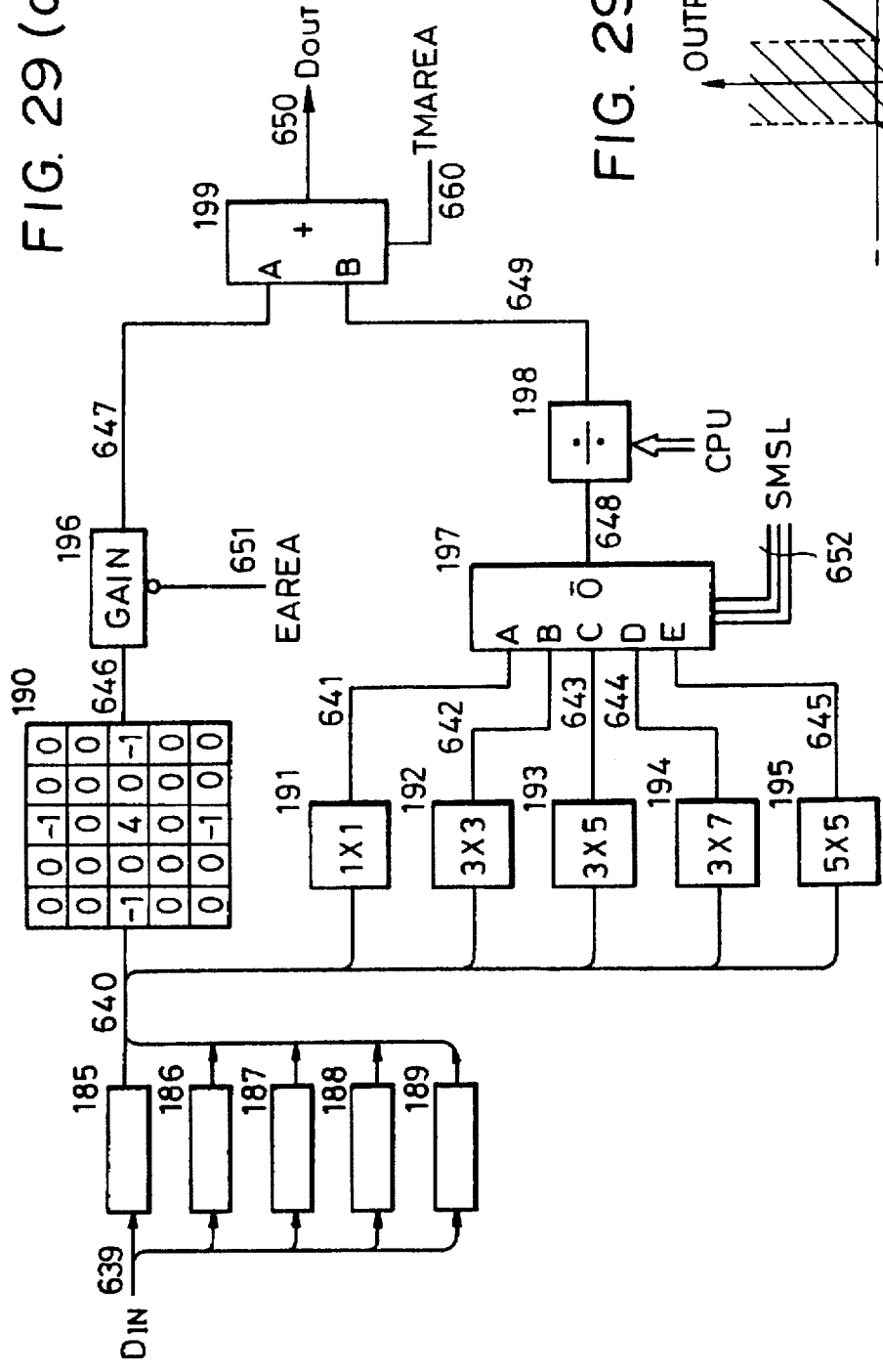
FIGS. 29(a), 29(b), 29(c), 29(d), 29(e), 29(f) and 29(g) are illustrations of edge stressing and smoothing processes and a circuit therefor.
Figure 29:
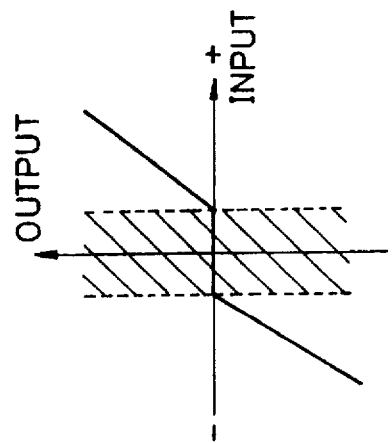

After a zoom-out or zoom-in operation conducted as required in the manner explained in connection with FIGS. 28(a) to 28(g), edge stressing operation and smoothing operation are executed as required in a manner which will be explained hereinafter with reference to FIGS. 29(a) to 29(g). FIG. 29(a) is a block diagram of a circuit for conducting such operations. Each of memories 185 to 189 has a capacity corresponding to one line of main scan and has a FiFo type construction which cyclically stores data of 5 main scan lines and outputs these data in a parallel fashion. A reference numeral 190 denotes a second-order differentiation spatial filter which is ordinarily used in this field of technology and is capable of detecting edge component. The output 646 is subjected to a gain control of a characteristic as shown in FIG. 29(b) by a gain circuit 196. The hatched area in FIG. 29(b) has been clamped at "0" in order to exclude smaller ones of the edge-stressed outputs, i.e., noises. The buffer memory output corresponding to five main scan lines is input to the smoothing circuits 191 to 195 which are designed to conduct averaging of data within five types of pixel blocks from 1×1 up to 5×5 so that averaged outputs 641 to 645 are obtained from these smoothing circuits. A desired smoothing signal is selected from these outputs 641 to 645. An SMSL signal 652 is output from the I/O port of the CPU 22 and is controlled in relation to the appointment through the operating panel as will be described later. A reference numeral 198 designates a divider in which "15" is set by the CPU when a smoothing size of 3×5, for example, has been selected. Thus, if the selected smoothing size is 3×7, the CPU sets "21" in the divider 198.

Figure 29C:
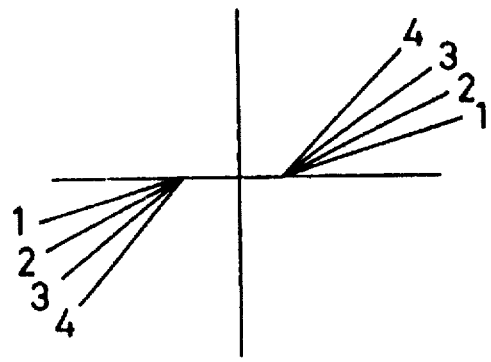
Figure 29D:
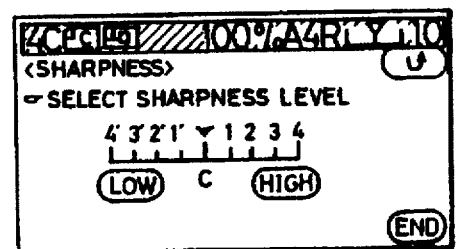

The gain circuit 196 has a look-up table type structure (LUT) and is constituted by a RAM into which data is written by the CPU 22 as is the case of the gamma circuit shown in FIG. 27(a). The gain circuit 196 outputs "0" when the input EAREA 65.1 thereto is "Lo". The edge stressing control and the smoothing control correspond to the liquid crystal touch panel picture frame on the operating panel. More specifically, the user can control the display of an edge by manipulating sharpness control keys on the picture frame shown in FIG. 29(d) (P 430). As the user operates the key for higher sharpness from 1 to 2, 2 to 3 and 3 to 4, the conversion characteristic of the gain circuit is rewritten by the CPU 22 as shown in FIG. 29(c). Conversely, if the key is operated for a lower sharpness from 1' to 2', 2' to 3' and 3' to 4', the smoothing block size is changed from 3×3 to 3×5, 3×5 to 3×7 and 3×7 to 5×5 by the change-over signal SMSL 652 delivered to the selector 197. When the center C has been selected by the sharpness control keys, the smoothing block size 1×1 is selected so that the gain circuit input EAREA 651 takes the "Lo" level. In such a case, neither the smoothing nor the edge stressing is conducted so that the input Din is directly output as Dout. According to this arrangement, any moire attributable to reading of half-tone image is suppressed by virtue of the smoothing, while the sharpness of character or line image can be improved by the edge stressing. However, in the case where a half-tone image and a letters and line image are included by the same original, there is a problem that the smoothing for eliminating moire causes the letters and lines to be obscure, while edge stressing for attaining higher sharpness causes the moire to become more serious. This problem, however, is overcome by this embodiment as will be understood from the following description.

Figure 29E:
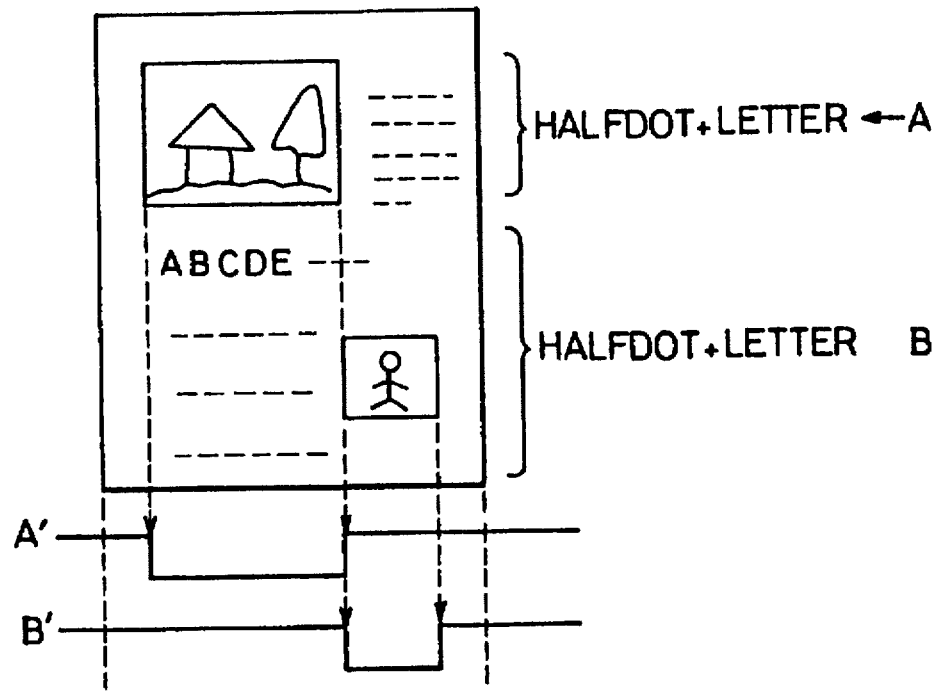
Figures 29F, 29G:
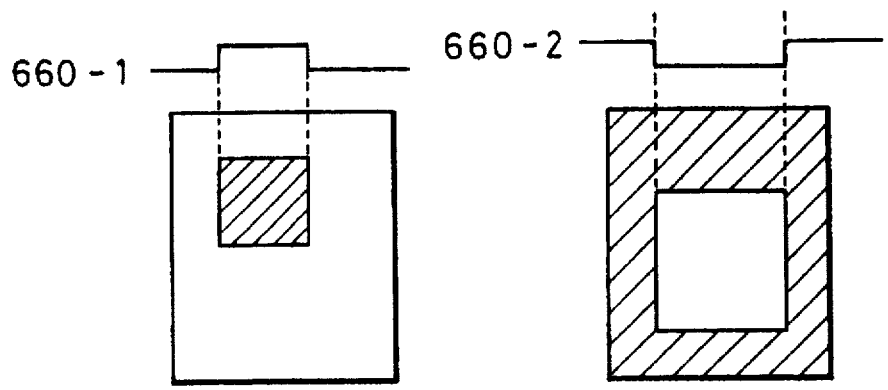
Figure 36A:
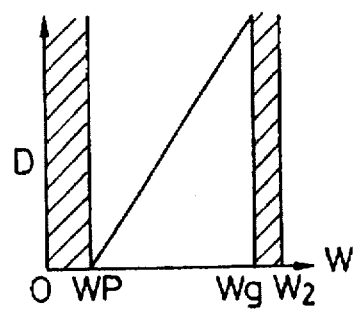
FIGS. 36(A) and 36(B) are illustrations of the relationship between a triangular wave and the laser lighting time.
Figure 36B:
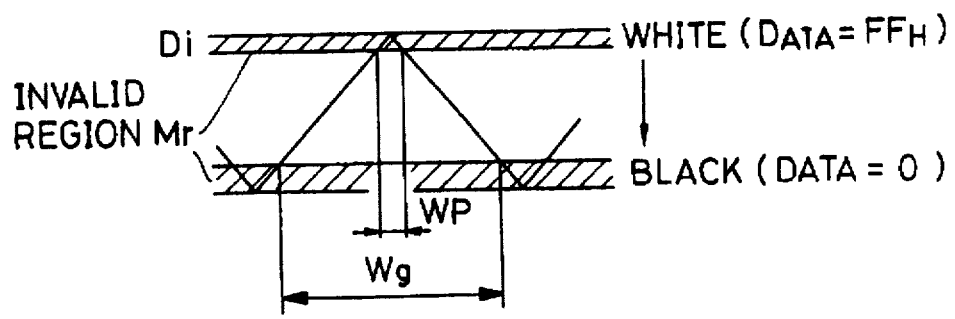

Namely, in the described embodiment, it is possible to suitably control EAREA 651 and SMSL 652 generated in the area generating circuit (FIG. 25(d)) such as to select the 3×5 zooming size by the SMSL 652, while generating the EAREA 651 as indicated by A' and B' as shown in FIG. 29(e), during reading of an original including half-tone images and letter images. In such a case, moire is suppressed in the reproduction of the half-tone images, while the sharpness is improved for the letter images. The signal TMAREA 660 is generated by the area generating circuit 51 (FIG. 13(a)) as is the case of the EAREA 651 so that an output Dout="A+B" is obtained on condition of TMAREA="1", while an output Dout="0" is obtained on condition of TMAREA="0". Therefore, when a signal such as, for example, 660-1 shown in FIG. 29(f) is generated, it is possible to extract the hatched area (inside the rectangle). Similarly, a generation of a signal such as 660-2 (FIG. 29(g)) enables the hatched area (outside of rectangle) to be extracted (white blanking).

Figure 30:
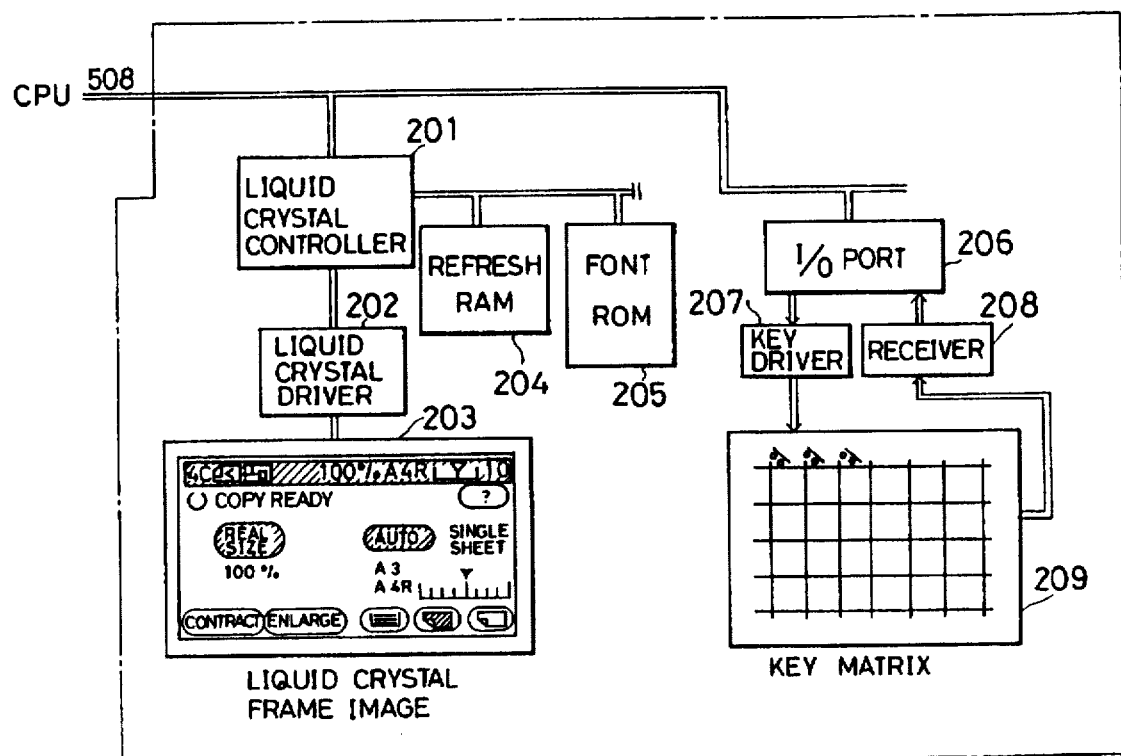
FIG. 30 is a control circuit diagram of the control panel portion.

Referring to FIG. 13, a reference numeral 200 designates an original coordinate recognition circuit capable of recognizing four corners of an original. The recognized coordinates data are held in an internal register (not shown) and are read by the CPU after a pre-scan conducted for the purpose of recognition of the original position. This circuit is not described in detail because it is fully disclosed in Japanese Patent Unexamined Publication No. 59-74774. The pre-scan for the purpose of recognizing the original position is conducted as follows. After the black-level correction and the white-level correction as explained before in connection with FIGS. 18(a) and 19(a), masking coefficients $k_1$, $l_1$ and $m_1$ shown in FIG. 24(a) for generating monochromatic image data are selected, while the values $C_0$, $C_1$ and $C_2$ of the same Figure are selected to be (0, 1, 1). In addition, UAREA 565 is set as UAREA 565="Lo" so as not to conduct under-color removal. Thus, the original image is recognized in the form of monochromatic data and input to the original position recognizing section 200. FIG. 30 illustrates the operating panel portion, in particular the control section for controlling the liquid crystal, as well as a key matrix. This operating panel is controlled by means of instructions given to a liquid crystal controller 201 of FIG. 30 through the CPU BUS 508 of FIG. 13 and the instructions given to an I/O prt 206 for controlling the key matrix 209 which enables key-input and touch-key input. The fonts which are to be displayed on the liquid crystal display frame are stored in FONT ROM 205 and are sequentially transferred to the refresh RAM 204 in accordance with the program given by the CPU 22. The liquid crystal controller delivers an image data for the display to the liquid crystal display unit 203 through a liquid crystal driver 202, thereby displaying the desired image. On the other hand, all the key inputs are controlled by the I/O ports 206 so that the pressed key is detected through an ordinary key scan. The data concerning the detected key is input to the CPU 22 through a receiver 208 and then through the I/O port.

Figure 31:
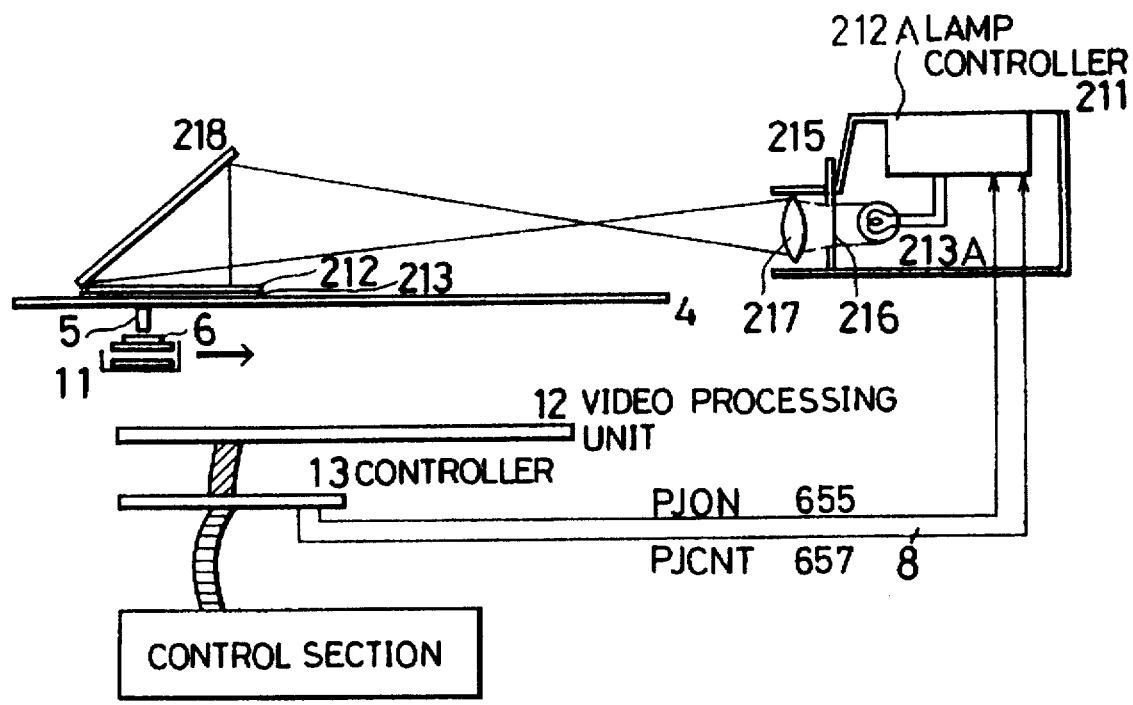
FIG. 31 is an illustration of construction of a film projector.
Figure 33A:
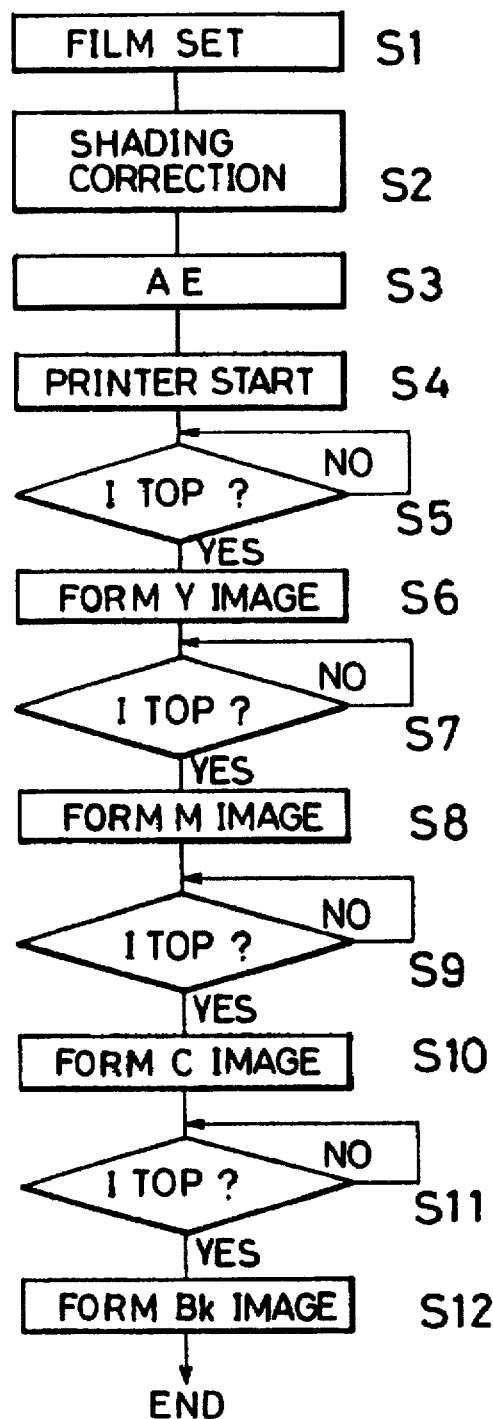
FIGS. 33(a), 33(b), and 33(c) are illustrations of operation of the apparatus in a mode which employs a film projector.
Figure 33B:
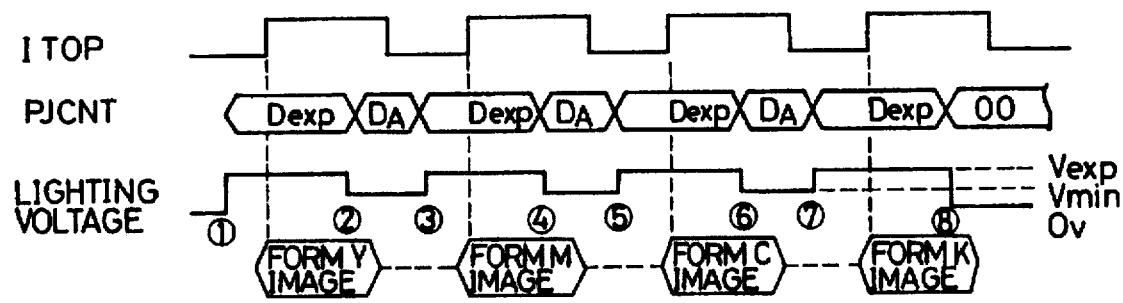
Figure 37A:
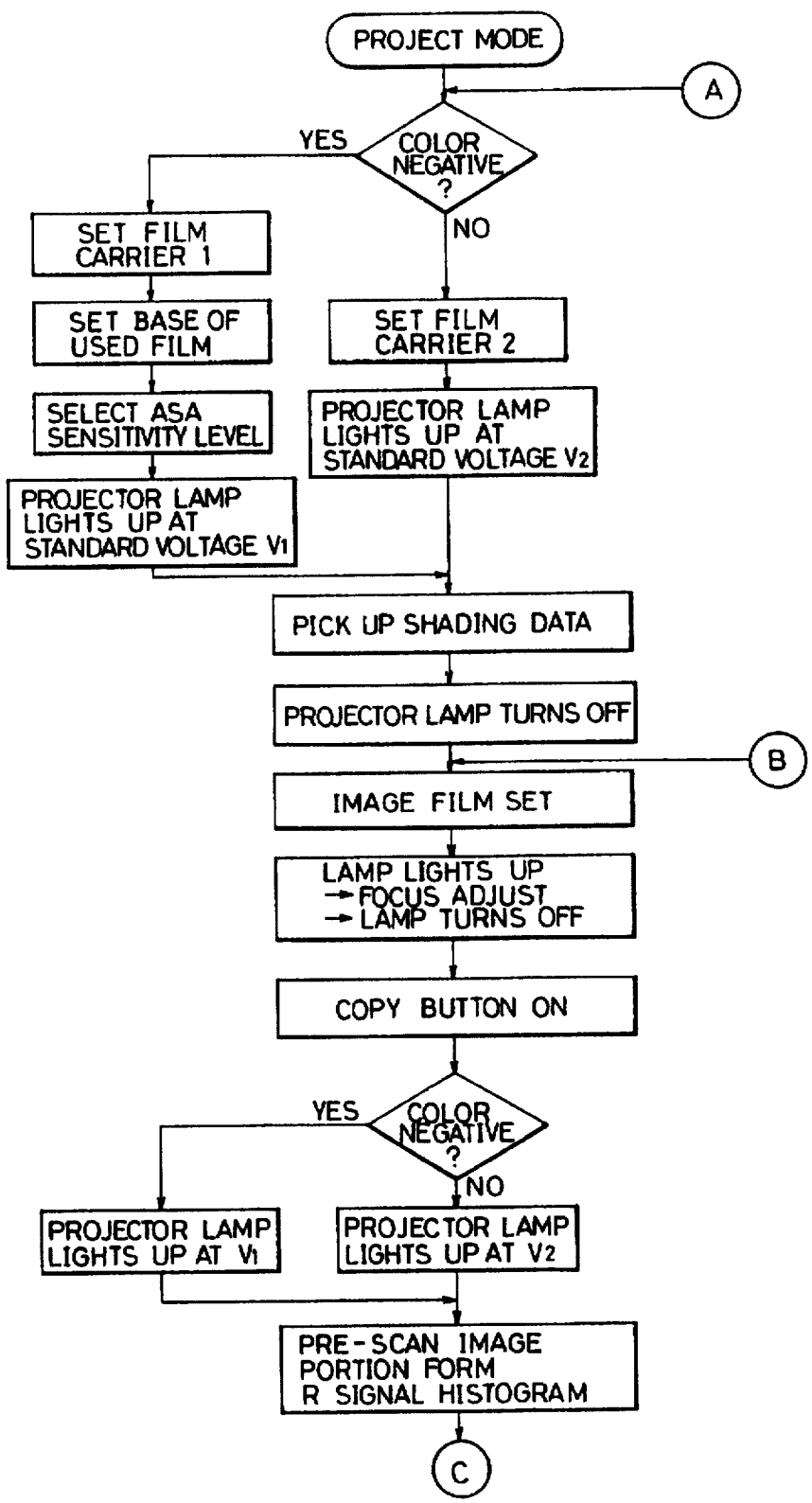
FIGS. 37(a) and 37(b) are control flow charts showing the manner of control conducted in the mode which employs the film projector.
Figure 37B:
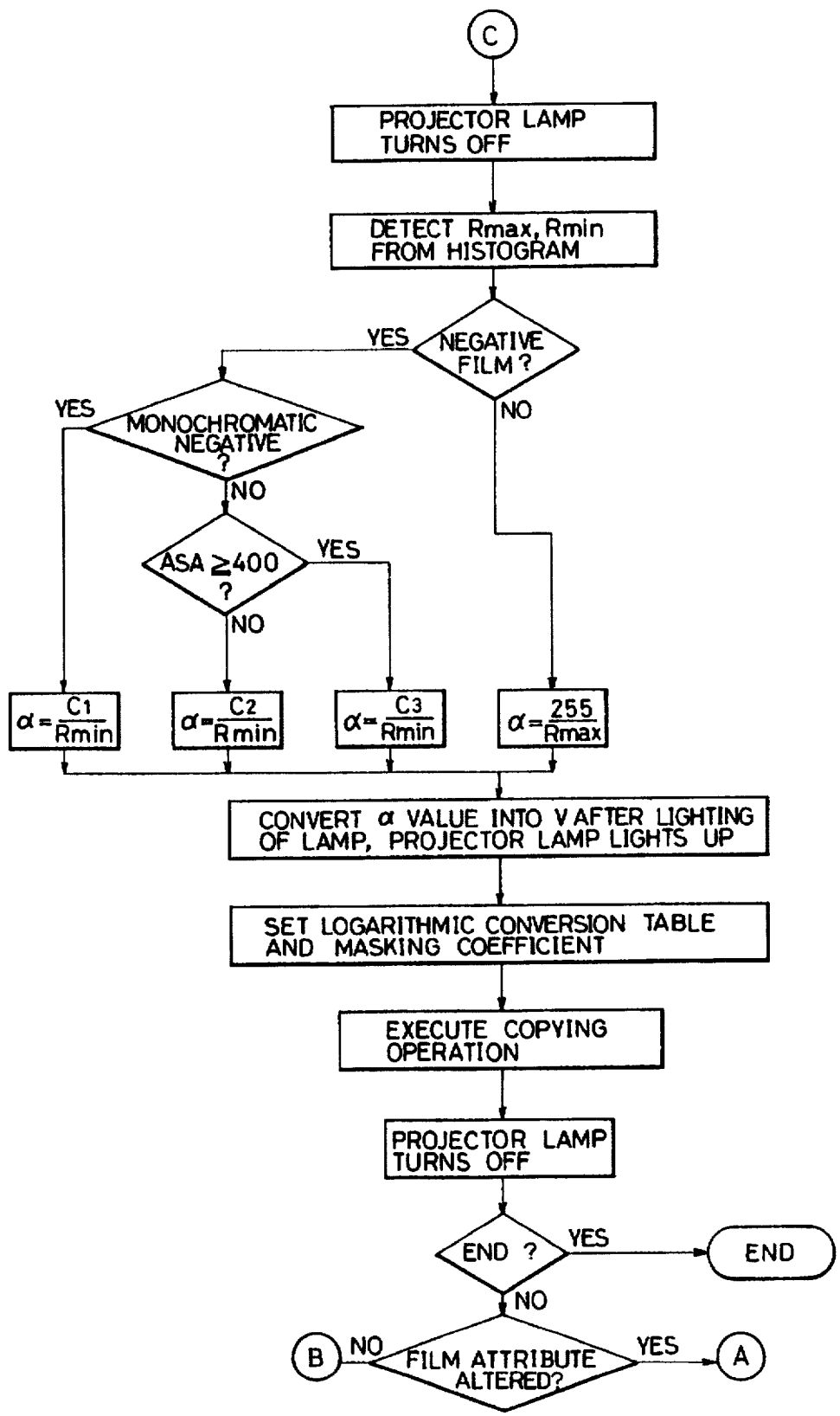

FIG. 31 shows an arrangement of the apparatus of this embodiment (FIG. 9) with a film projector 211 combined therewith. In this Figure, the same reference numerals are used to denote the same parts or members as those appearing in FIG. 9. A mirror unit composed of a reflecting mirror 218, Fresnel lens 212 and a diffusion plate 213 is mounted on the original table 4. The image formed by the light transmitted through a film 216 and projected by a film projector 211 is scanned by the aforementioned original scanning unit in the direction of the arrow, so that the image is read in the same manner as the reflection-type original. The film 216 is fixed by a film holder 215 and the turning on and off of the lamp 213A and the lighting voltage are controlled by signals PJON 655 and PJCNT 657 output from the I/O port of the CPU 22 (see FIG. 10). The lamp controller 212A determines the lamp lighting voltage in accordance with an 8-bit input as shown in FIG. 32. Usually, the lighting voltage is set between Vmin and Vmax. In such a case, the digital data falls between $D_A$ and $D_B$. FIG. 33(a) illustrates the flow of operation for reading the image projected by the film projector and copying the read image, while FIG. 33(b) schematically illustrates the timing of signals. In Step S1, the operator sets the film 216 on the film projector 211 and determines the lamp lighting voltage Vexp through later-mentioned shading correction (Step S2) and pre-scanning AE (Step S3) in accordance with an operation procedure given by the operating panel. The operator then starts the printer 2 in Step S4. In advance of the ITOP (image end synchronizing signal) from the printer, a condition of PJCNT=Dexp (corresponds to optimum exposure voltage) is established so that a stable light quantity is obtained during formation of the image. A Y image is formed in response to the ITOP signal (Step S6) and then the lamp is maintained at the minimum intensity level by a signal DA (corresponds to minimum exposure voltage) until the time of the next exposure, whereby any degradation in the filament due to surge of current at the time of start-up of the lamp is avoided to ensure a longer life of the lamp. Subsequently, a similar process is executed to form M, C and black images in Steps S7 to S12 and then a signal PJCNT="00" is input so as to turn the lamp off. A description will be given in the following as to the AE operation and the shading correction conducted in the operation of the apparatus in the projector mode, with reference to FIGS. 37(a) and 37(b). When the operator selects the projector mode through the operating panel, the CPU operates to enable the operator to select the type of the film, i.e., a color negative film, a color positive film, a monochromatic negative film or a monochromatic positive film. When the film is a color negative film, a film carrier 1 mounting a cyan color correction filter is set on the projector and the non-exposed portion (film base) of the film is set on a film holder. The operator then presses a shading start button by selecting the ASA sensitivity, i.e., whether the film has an ASA sensitivity level which is less than 400 but not smaller than 100, or not smaller than 400. In consequence, the projector lamp lights up at reference lighting voltage $V_1$. Then, the cyan filter cuts off the orange base of the color negative film and trims the color balance of the color sensor. In addition, by picking up the shading data from the non-exposed portion, it is possible to obtain a large dynamic range even when the film is a negative film. When a film other than a color negative film is used, the operator sets a film carrier 2 mounting an ND filter or without any filter and presses a shading start key on the liquid crystal touch panel. In consequence, the projector lamp lights up at a lighting voltage $V_2$. The arrangement, however, may be such that the change-over of the reference lighting voltage between $V_1$ and $V_2$ is executed automatically upon recognition of the type of the film carrier, after the selection by the operator as to whether the film is a positive film or a negative film. Subsequently, the scanner unit is moved to the central portion of the image projecting area and mean values of R, G and B data over a single CCD line or a plurality of CCD lines are picked up and stored in the RAM 78' shown in FIG. 19(a). The projector lamp is then turned off.

Subsequently, the image film 216 which is to be actually copied is set on the film holder 215 and, if any focusing is necesary, the operator presses a lamp start/stop button on the panel to start the projector -lamp and conducts focusing operation through a visual check. The operator then turns the projector lamp off by pressing the lamp start/stop button again.

Figure 33C:
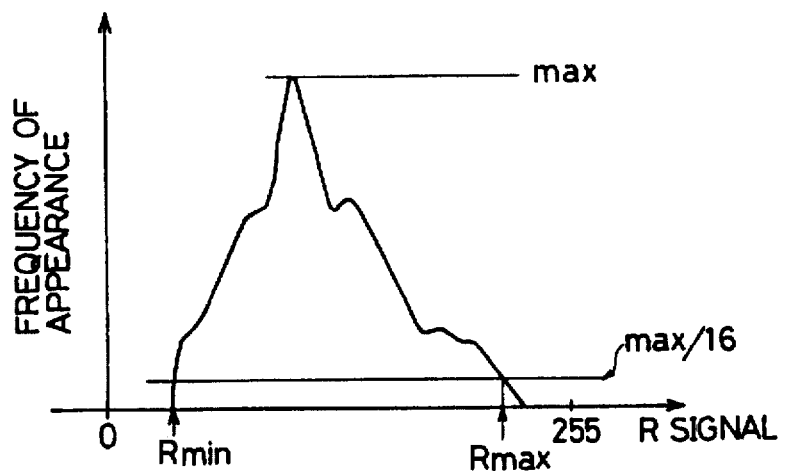

As the copy button is turned on, the projector lamp is turned on at the voltage $V_1$ or $V_2$ in accordance with the result of the selection as to whether the film is a color negative film or a color positive film, and a pre-scan (AE) of the image projection area is conducted. The pre-scan is executed for the purpose of judging the level of the exposure at which the image on the film was formed by photographing. The process for executing the pre-scan will be explained hereinafter. R signals derived from a predetermined plurality of lines in the image projection area are input through the CCD and the correlation between the R signals and frequency of appearance thereof is accumulated to form a histogram as shown in FIG. 33(c) (refer to "histogram mode" explained in connection with FIG. 19). The illustrated max value is determined from this histogram and the maximum and minimum R signal values Rmax and Rmin are determined as the values of the points where a level which is 1/16 of the above-mentioned maximum value is intersected by the histogram. Then, the lamp light quantity multiplication factor $\alpha$ is computed according to the type of the film as selected initially by the operator. In case of a color film or a monochromatic positive film, the factor $\alpha$ is computed as $\alpha=255/Rmax$, whereas, in case of a monochromatic negative film, the factor $\alpha$ is computed as $\alpha=C_1/Rmin$. In case of a color negative film having an ASA sensitivity of not smaller than 400, the factor $\alpha$ is computed as $\alpha=C_2/Rmin$. The values $C_1$, $C_2$ and $C_3$ are the values which are determined beforehand in accordance with the gamma characteristic of the film and usually range between 40 and 50 out of 255 levels. The value of the factor is converted by a predetermined look-up table into an output data for a variable voltage source of a projector lamp. Subsequently, the projector lamp is turned on at the lamp lighting voltage V determined as described above, and an ordinary copying operation is executed with the logarithmic conversion table (FIG. 21(a)) and the masking coefficient set suitably. There are eight tables 1 to 8 for logarithmic conversion one of which is selected in accordance with a 3-bit change-over signal as explained before in connection with FIG. 11(a). For instance, the table 1 is used for reflection-type originals, table 2 is used for color positive films, table 3 is used for monochromatic positive films, table 4 is used for negative color films (ASA less than 400), table 5 is used for color nageative films (ASA 400 or greater), table 6 is used for monochromatic negative films (ASA 400 or greater), and so forth.

Figure 21:
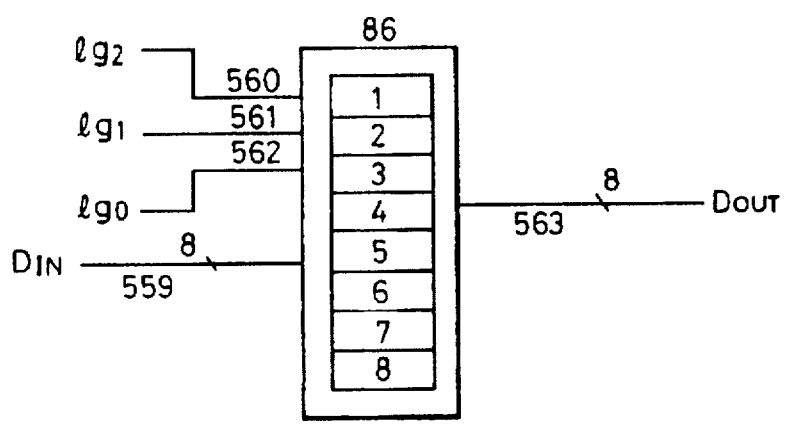
FIG. 21(a) is an illustration of a logarithmic conversion circuit.
FIG. 21(b) is a chart illustrating logarithmic conversion characteristics.
Figure 21:
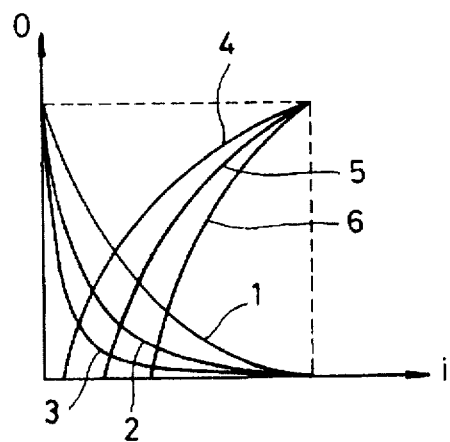

The contents of each table can be set for each of R, G and B colors independently. FIG. 21(b) shows an example of the content of the table.

The copying operation is thus completed. For commencing copying of the next film, the operator checks whether there is a change in the characteristics (negative or positive, color or monochromatic and so forth) of the film. If there is a change, the process returns to (A) shown in FIG. 37(a), whereas, if no change exists, the process returns to B, and the described operation is repeated.

It is thus possible to obtain a print output correspnding to the type of the film, i.e., negative, positive, color or monochromatic, of the film projected by the film projector 211. In the illustrated embodient, the film image is projected in a greater scale on the original table as will be seen from FIG. 31, so that the projected image contains few fine letters and lines. In addition, reproduction with specifically smooth gradation is necessay also from the view point of the use of the film. According to the present invention, therefore, a gradation processing characteristic adopted in the color LBP for the projected film image is diffeent from that used for the copying of an image on reflection-type original images. The change-over of the gradation processing characteristic is executed by a PWM circuit 778 in a printer controller 700.

The detail of the PWM control circuit 778 will be explained below.

Figure 34A:
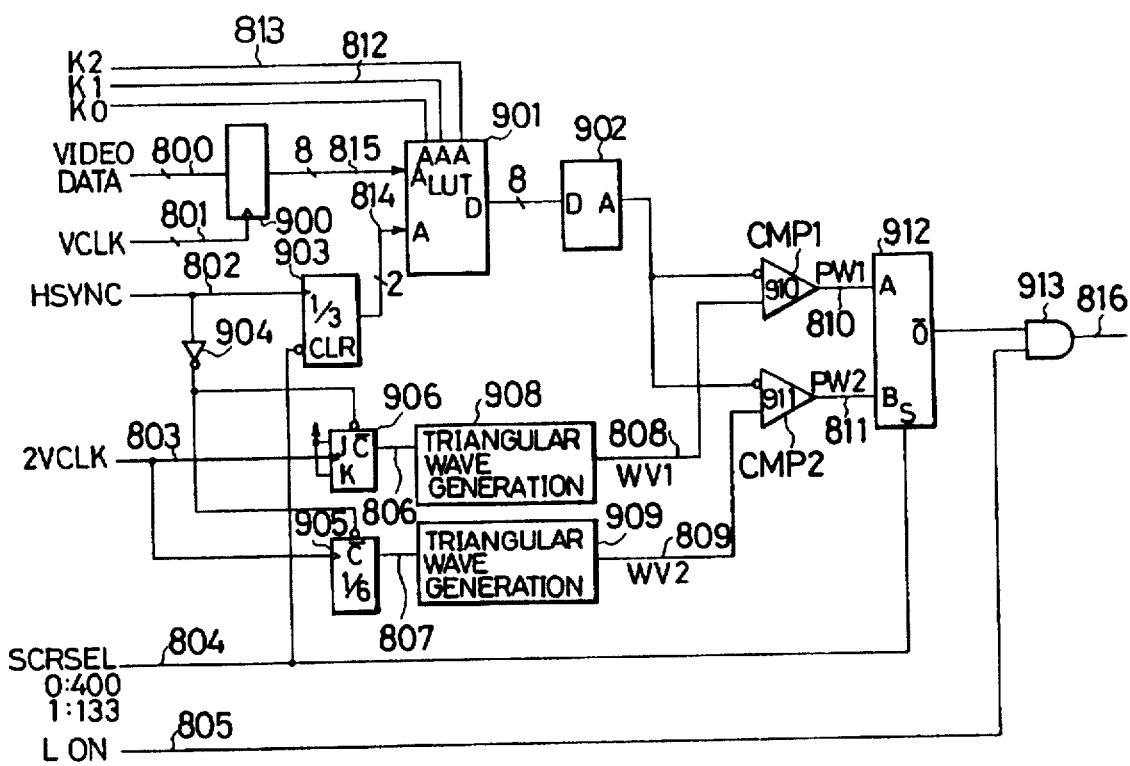
FIGS. 34(A), 34(B) and 34(C) are illustrations of a PWM circuit and its operation.
Figure 34B:
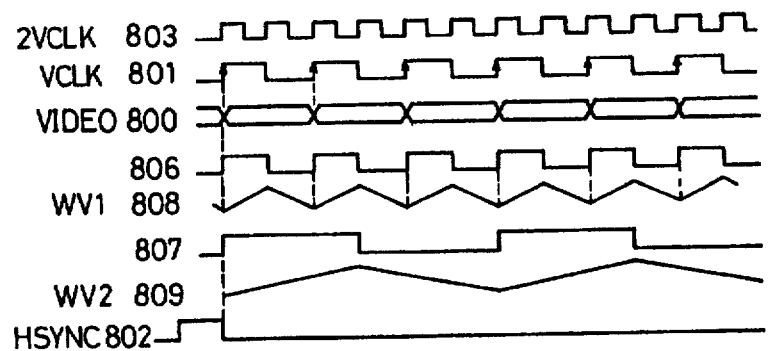

FIG. 34(A) is a block diagram of a PWM circuit, while FIG. 34(B) is a timing chart illustrating the operation of the circuit shown in FIG. 34(A).

Figure 34C:
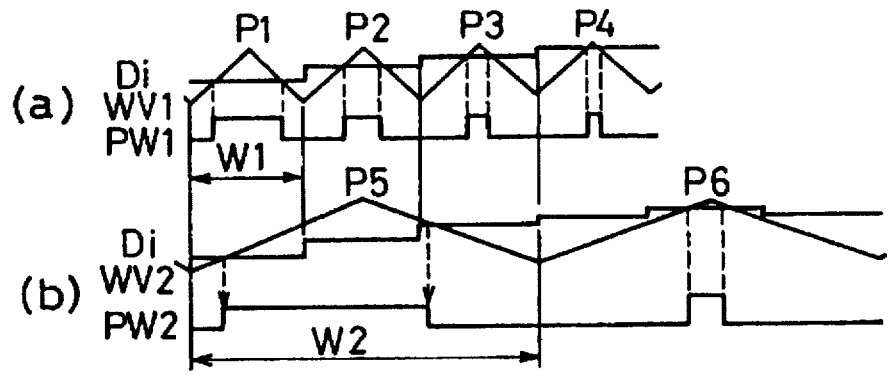
Figure 35A:
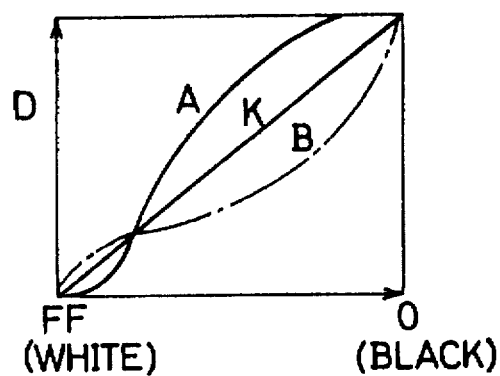
FIGS. 35(A) and 35(B) are gradation correction characteristic diagrams.
Figure 35B:
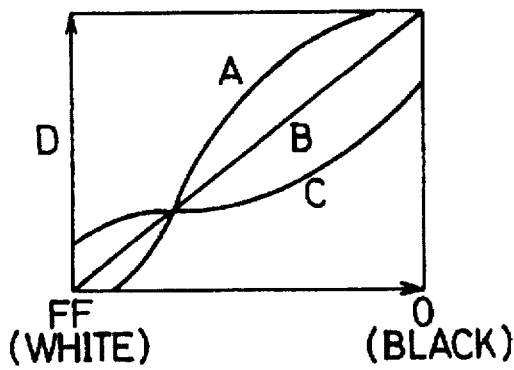
Figure 38:
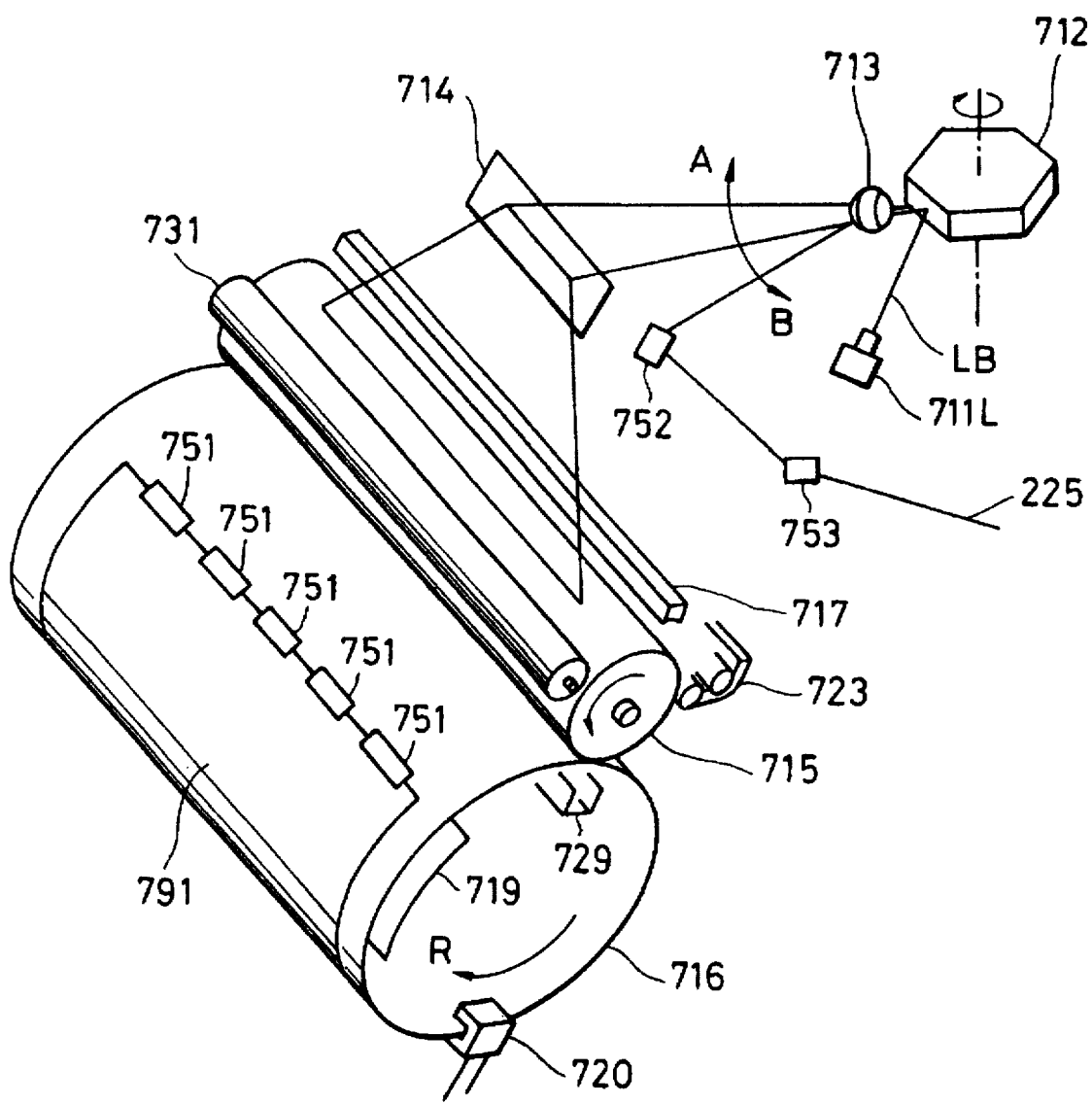
FIG. 38 is a perspective view of a laser print section.

The input VIDEO DATA 800 is latched by a latch circuit 900 at the timing of rise of VCLK 801 so as to be synchronized with the clock (see 800 and 801 of FIG. 34(B)). Then, the VIDEO DATA 815 is subjected to a gradation correction conducted by an LUT 901 (look-up table) constituted by a ROM or a RAM and then to a D/A conversion effected by a D/A converter (digital-to-analog) 902, whereby a single analog video signal is generated. The thus generated analog signal is input to the comparators 910, 911 of the next stage so as to be compared with a later-mentioned triangular wave. Signals 808 and 809 input to other input terminals of the comparators are triangular waves (see 808, 809 in FIG. 34(B)) which are independently generated in synchrnism with VCLK.. More specifically, one of the triangular waves WVI is generated by a triangular wave generating circuit 908 in accordance with a triangular wave generating reference signal 806 obtained by demultiplying into ½, by means of a J-K flip-flop 906, synchronizing clock 2VCLK 803 having a frequency which is twice as high as that of the clock VCLK. The other triangular wave WV2 is generated by a triangular wave generating circuit 909 in accordance with a signal 807 (see 807 of FIG. 34(B)) which is formed by dividing the clock 2VCLK into ⅙ by means of a ⅙ frequency dividing circuit 905. The triangular wave and the VIDEO DATA are generated in synchronism with VCLK as shown in FIG. 34(B). In order that these triangular waves are synchronized with the signal HSYNC 802 generated in synchronism with VCLK, the circuits 905 and 906 are initialized at the same timing as HSYNC by an inverted HSYNC. As a result of the operation described above, signals of pulse widths as shown in FIG. 34(C) are obtained at the outputs 810, 811 of the comparators 910, 911, in accordance with the values of the input VIDEO DATA 800, whereby the signal of a pulse width as shown in FIG. 34(C) is obtained. Namely, the laser lights up when the output of the AND gate 913 is "1" so that a dot is printed on the print paper, whereas, when the output is "0", the laser is not activated so that no printing is conducted on the print paper. It is therefore possible to control the turning off of the laser by means of the control signal LON (805). FIG. 34(C) illustrates a manner in which the level of the image signal D is changed from "black" to "white" from the left to the right. The "white" is input to the PWM circuit as "FF", while the "black" is input as "00", so that the output of the D/A converter 902 is changed as designated by Di in FIG. 34(C). In contrast, the triangular wave WV1 appears in (a), while the other triangular wave WV2 appears in (b), so that the pulse widths of the outputs from CMP1 910 and CNP2 911 are gradually decreased as the color changes from black to white, as represented by PW1 and PW2. When PW1 is selected, the dots are formed on the print paper at an interval of $P_1$ to $P_2$, $P_2$ to $P_3$, $P_3$ to $P_4$ and the variance of the pulse width has a dynamic range W1. On the other hand, when the triangular wave PW2 has been selected, the dots are formed with an interval of $P_5$ to $P_6$ so that the pulse width has a dynamic range W2 which is about 3 times as large as that of PW1. The printing density (resolution) is about 400 lines/inch when PW1 is used, whereas,when PW2 is used the printing density is about 133 lines/inch. As will be understood from this fact, when the triangular wave PW1 has been selected, a resolution is about three times as high as that obtained when the triangular wave PW2 is selected. Conversely, when the triangular wave PW2 has been selected, a superior gradation characteristics is obtained because in this case the dynamic range is about three times as large as that obtained when the wave PW1 is used. Therefore, a signal SCRSEL 804 is given from an external circuit such as to select the triangular wave PW1 when a high resolution is required and to select the triangular wave PW2 when superior gradation is to be obtained. More specifically, a selector 912 in FIG. 34(A) selects input A so that it delivers from its output 0 the triangular wave PW1 when the level of input signal SCRSEL 804 thereto is "0". Conversely, when the level of the input signal SCRSEL is "1", it selects B so as to deliver the triangular wave PW2 from its output 0. The laser lights up for a period corresponding to the pulse width delivered through the selector 912 so as to print the dot. An LUT 901 is a table conversion ROM which is used for the purpose of gradation correction. When signals $K_1$, $K_2$ 812, 813, table change-over signal 814 and video signal 815 are input to the respective addresses, the LUT 901 delivers corrected VIDEO DATA. For instance, if the signal SCRSEL 804 is set "0" to select the triangular wave PW1, the outputs of a ternary counter 903 are all "0" so that the correction table for the wave PW1 is selected from the LUT 901. The values $K_0$, $K_1$ and $K_2$ are changed-over in accordance with the color signals. For instance, an yellow output is obtained when the values are set as $K_0$, $K_1$, $K_2$=0,0,0, whereas, when the values are set as $K_0$, $K_1$, $K_2$=1,0,0, a magneta output is obtained. Similarly, black output is produced when the values are set as $K_0$, $K_1$, $K_2$=1, 1, 0. Thus, the gradation correction characteristics are changed over each time the color image to be printed is changed, thereby to compensate for any difference in the gradation characteristics attributable to the difference in the image reproducing characteristics between colors in the laser beam printer. It is possible to conduct a gradation correction over a wider range by changing the combination between the value $K_2$ and the values $K_0$, $K_1$. For instance, it is possible to switch the gradation conversion characteristics of the respective colors according to, for example, the type of the input image. When the input signal SCRSEL is changed to "1" to select the wave PW2, the ternary counter 903 counts the synchronizing signals of the lines and repeatedly delivers series of count values "1", "2" and "3" to the address 814 of the LUT. In consequence, the gradation correction table is changed-over each time the line is changed so that the gradation is further improved. This operation will be described in more detail with reference to FIGS. 35(A) to 35(B). A curve A in FIG. 35(A) is a characteristic curve which represents the relationship between the input data and the printing density and which is obtained when the input data is changed from "FF", i.e., white to "0", i.e., black under a condition that the triangular wave PW1 has been selected. As a standard, the characteristic is preferably as indicated by K, so that the characteristic B which is inverse to the characteristic A has been set in the gradation correction table. FIG. 35(B) shows gradation correction characteristics A, B and C for different lines obtained when the wave PW2 has been selected. The pulse width in the direction of the main scan (laser scan) is varied by the triangular wave described before and, at the same time, three steps of gradation are provided in the direction of the sub-scan (direction of feed of image), whereby a further improvement in the gradation is attained. Namely, the characteristic A becomes a ruling characteristic in the region where the density changes steeply so as to reproduce the image with a steep gradation, whereas the region of a gentle gradation is reproduced mainly by the characteristic C. The characteristic B provides a gradation characteristic which is effective in the region where the density changes .not so steeply but not so gently. Therefore, even when the wave PW1 has been selected, a certain high degree of gradation is ensured , whereas, when the wave PW2 has been selected, an extremely high gradation is obtained. A discussion will be made as to the pulse width. When the wave PW2 has been selected for example, ideally the pulse widths should meet the condition of $0 \leq W \leq W2$. Actually, however, there are invalid regions of pulse width due to electrophotographic characteristics of the laser beam printer and response characteristics of the laser driving circuit. For instance, when the pulse width is smaller than a predetermined value wp ($0 \leq W < wp$), the printer does not respond so that no dot is formed. On the other hand, when the pulse width exceeds a certain value wq (wq<W≦W2), the density is saturated. In this embodiment, therefore, the adjustment has been done such that the pulse width varies only within an effective region wp≦W≦wq in which a linear relation exists between the pulse width and the density. Namely, when the data input has been chaged from 0 (black) to FFH (white) as shown in FIG. 35(B), the pulse width changes from wp to wq so as to maintain the linearity of the relationship between the input data and the density of reproduced image. As shown in FIG. 38, the videos signal thus converted into pulse width is applied to the laser driver 711L through the line 224 thereby modulating the laser beam LB.

The signals $K_0$, $K_1$, $K_2$, SCRSEL and LON shown in FIG. 34A are output from a control circuit (not shown) in the printer controller shown in FIG. 10 in accordance with the serial communication between the reader 1 and the printer 2. More specifically, the signal SCRSEL is set to be "0" when a reflection-type original is used and to be "1" when a film projector is used, thus ensuring a smooth gradation.

[IMAGE FORMING OPERATION]

The laser beam LB modulated in accordance with the image data is reflected by a polygonal mirror 712 which rotates at a high speed, so as to scan the original horizontally at a high speed with a scanning breadth indicated by arrows A–B in FIG. 38. The laser beam LB is then made to focus on the surface of a photosensitive drum 715 through an f/0 lens 713 and a mirror 714, thereby to conduct dot exposure corresponding to the image data. One horizontal scan of the laser beam corresponds to one horizontal scan on the original image. Thus, in this embodiment, one horizontal scan of the laser beam corresponds to the width of 1/16 mm which is the width of one sub-scan.

Meanwhile, the photosensitive drum 715 rotates at a constant speed in the direction of the arrow L so that that the main scan on the drum surface is effected by the movement of the laser beam in the direction of the main scan while the sub-scan is effected by the rotation of the photosensitive drum 715, whereby the drum surface is progressively exposed so that a latent image is formed thereon. Before the exposure, a uniform charging is conducted by means of a charger 717 so that the latent image is developed by means of toner which is applied in a developing process conducted after the exposure. For instance, if the development is effected by yellow toner on the developing sleeve 731Y corresponding to the first exposure of the original in the color reader, a toner image corresponding to the yellow component of the original image 3 is formed on the photosensitive drum 715.

Subsequntly, the yellow toner image is transferred to a sheet wound on a transfer drum 716, by means of a transfer charger 729 which is disposed at the line of contact between the photosensitive drum 715 and the transfer drum 716. The described process is executed also for the magenta, cyan and black clor components of the image so that the toner images of the respective colors are transferred to the sheet 754 in a superposed manner, whereby a full-color image composed of four-color components is formed. Then, the transfer paper 791 is separated from the transfer drum 716 by the operation of a movable separation claw 750 which is shown in FIG. 9 and is introduced to the image fixing portion 743 where the toner image is fixed to the transfer sheet 791 by heat and pressure applied by heat-pressing rollers 744 and 745.

[DESCRIPTION OF OPERATING SECTION]

Figure 39:
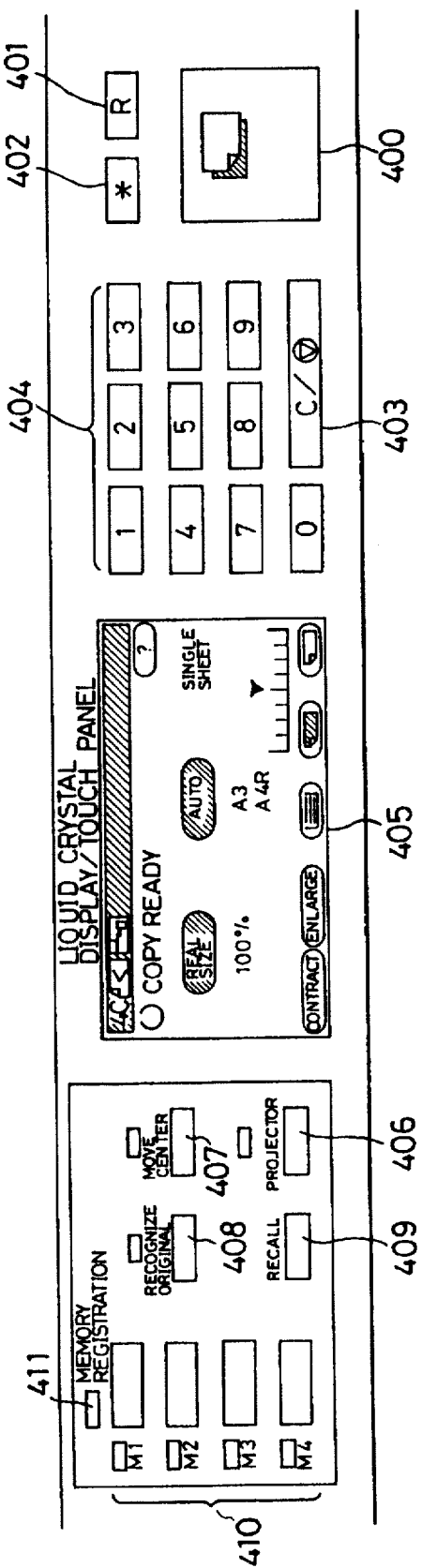
FIG. 39 is a top plan view of a control section.

FIG. 39 is an illustration of the operating section of the color copying machine of this embodiment. The operating section has a reset key 401 for resetting the operation to a standard mode, an enter key 402 for setting a later-mentioned registration mode, a panel of ten-keys 404 for inputting numerical data such as the number of the copies to be obtained, a clear/stop key 403 for clearing the set number or for stopping the copying operation during continuous copying operation, and a touch panel 405 which displays setting of various modes by means of touch panel keys, as well as the status of the printer. A center move key 407 is a key for appointing a center move operation in a move mode which will be explained later. An original recognition key 408 is adapted for automatically detecting the size and position of the original in the copying operation. A projector key 406 is used for appointing a later-mentioned projector mode. A recall key 409 is used for recovering the state set in the previous copying operation. A memory key 410 is used for storing or reading the values set in each mode which has been programmed beforehand. The memory key includes keys M1, M2, M3 and M4. A registration key 411 is used for registering data in the respective memories.

<DIGITIZER>

FIG. 40 illustrates the appearance of the digitizer. The digitizer has entry keys 422, 423, 424, 425, 426 and 427 for setting various modes which will be explained later, as well as a coordinate detecting plate 420 which is adapted for allowing appointment of a specific region of the original or for a setting zooming ratio, through detection of coordinate positions. The inputs through these keys and the coordinate input data from the coordinate detection plate are sent to the CPU 22 through a BUS 505 and are stored in RAM 24 and RAM 25. <Description of Standard Picture Frame>

Figure 41B:
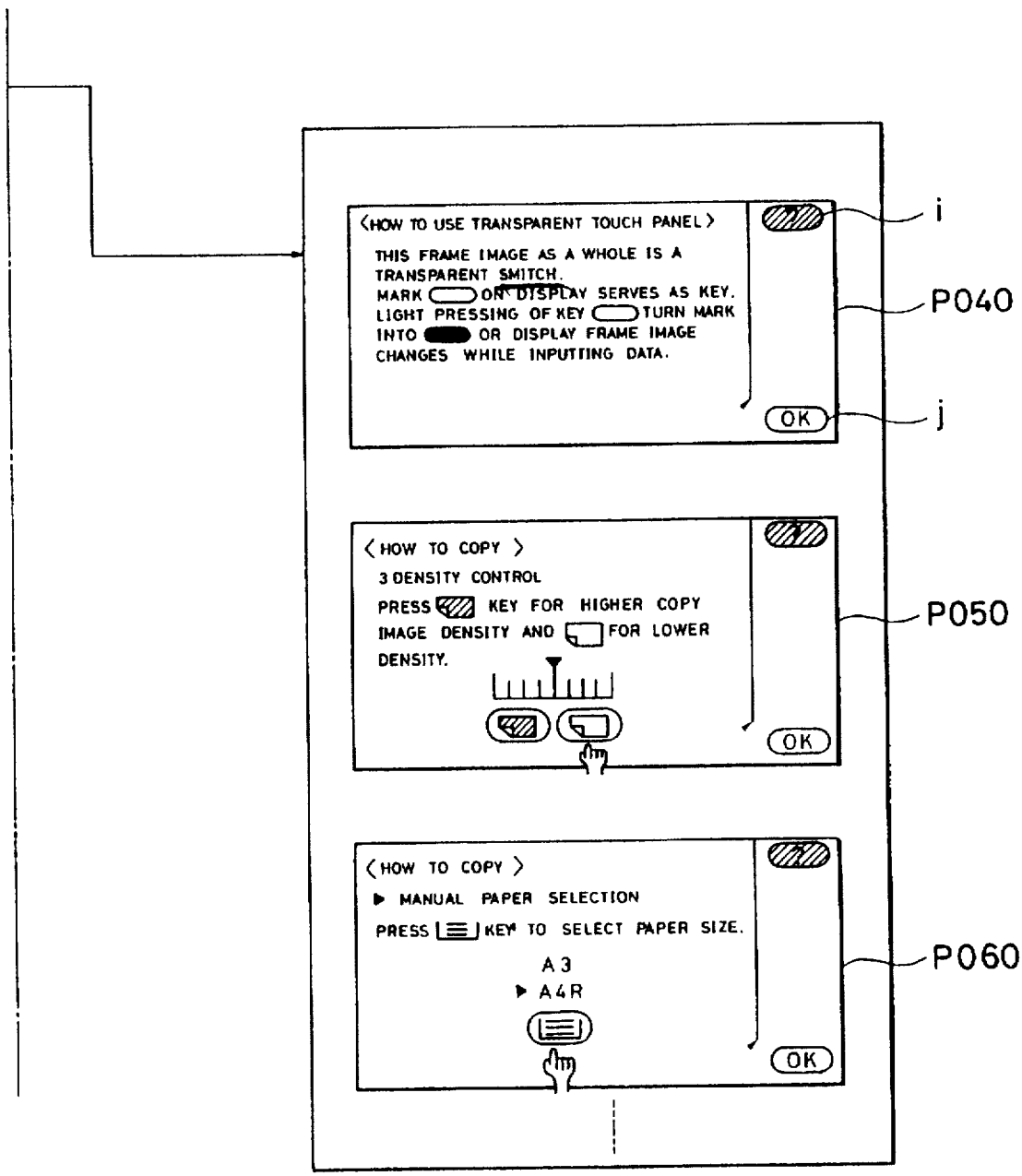
Figure 49:
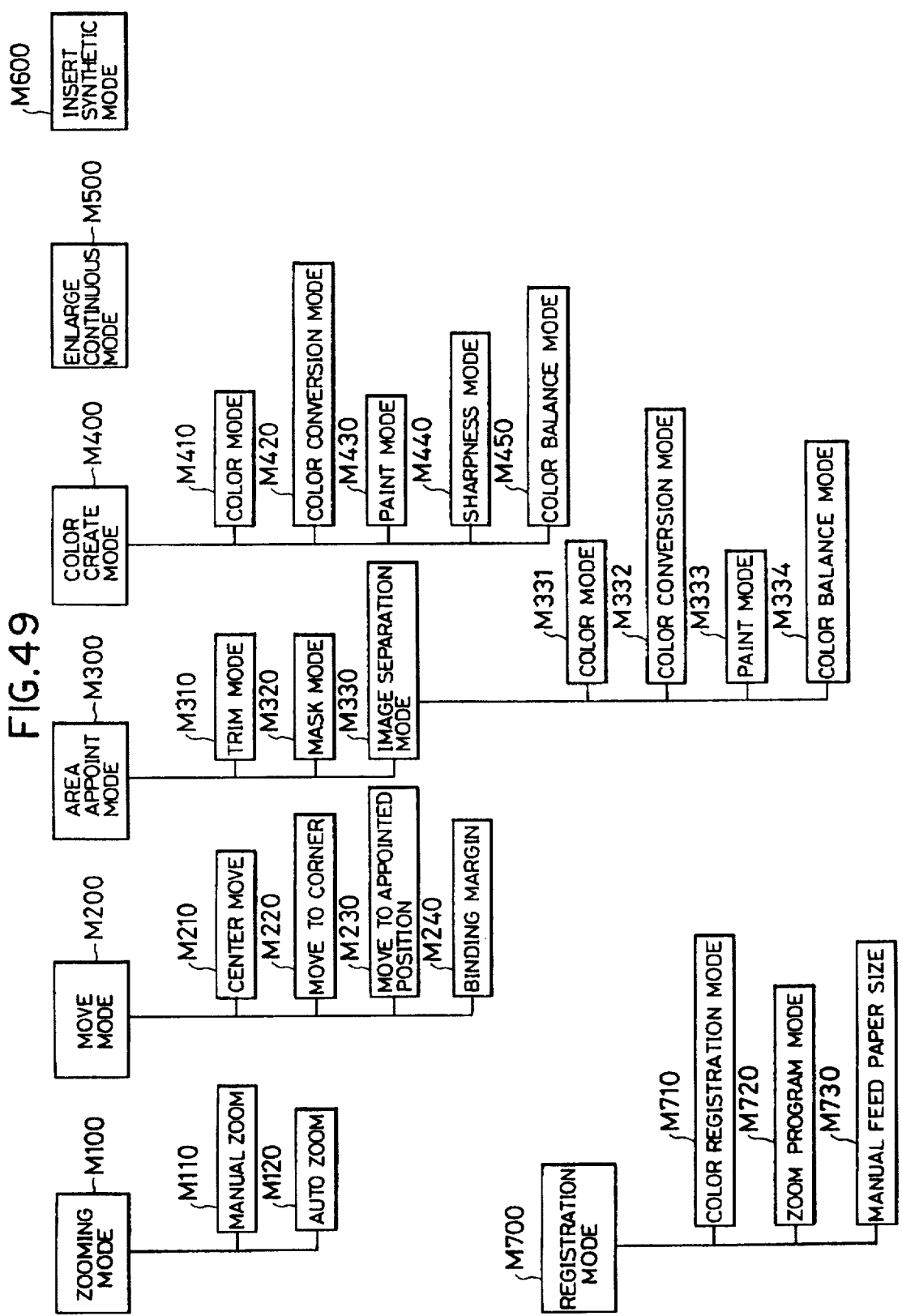
FIG. 49 is an illustration of functions of a color copying machine of this embodiment.

FIGS. 41(a) and 41(b) are an illustration of a standard picture frame. The standard pictue frame P000 is displayed when the copying operation or the setting operation is being conducted. This picture frame enables the setting of the zooming ratio, paper selection and density control. The left lower corner portion of this frame enables appointment of so-called constant-shape zooming. For instance, when a touch key a (contraction) is pressed, the degree of change in the size and the magnification are displayed. Similarly, the degree of change in the size and the magnification are displayed when a touch key b (enlargement) is pressed. In this embodiment, three contracting stages and three enlarging stages are available. For recovering the real size mode, the user simply presses a touch key h (magnification 100%). The user can select either an upper paper cassette or a lower paper cassette by touching a touch key c located at the center of the display area. When a touch key d is pressed, an auto-paper-select mode is selected in which the cassette containing the paper of the size most appropriate for the original size is automatically selected. Touch keys e and f on the right portion of the frame are density control keys for controlling the density level of the print image. These density control keys are valid even during copying. A touch key q is a key for providing guidance as to the natures of various touch keys and the method of manipulating the copying machine. When this key is touched, the natures of the touch keys and the manner of manipulation are displayed to facilitate the operation by the user. Each of later-mentioned modes has a display of the nature of such mode. In a black stripe or belt appearing on the top of the frame, the set states of various modes are displayed to avoid any erroneous setting and to confirm the set states. A message display region under the black stripe displays the state of the color copying machine or any message informing, for example, of an erroneous manipulation. In case of a trouble in the printer 16 such as paper jam or shortage of toner, an illustration of the printer appears on the whole area of the frame so that the user can visually recognize in what portion the trouble is taking place, e.g., in what portion a jam has occurred. The various modes of operation of the present invention are shown in FIG. 49.

<ZOOMING MODE>

The zooming mode M100 is a mode which allows the original to be copied in variable size. The zooming mode includes two modes, that is, a manual zoom mode M110 and an auto-zoom mode M120. The manual zoom mode M110 permits the magnification to be set in the X-direction (sub-scan direction) and in the Y-direction (main scan direction) independently and freely on 1% unit by means of an editor or through the touch panel. In contrast, the auto-zoom mode M120 is a mode in which the optimum zooming ratio is automatically computed in accordance with the size of the original and the size of the selected paper. There are four types of auto-zoom mode M120: namely, X,Y independent auto zooming, X,Y equal zooming, X auto-zooming and Y auto-zooming. In the X,Y independent zooming, the zooming ratios are computed independently for X- and Y-directions such that the whole or a portion of the original is copied on a selected paper. In the X,Y zooming, the copying operation is conducted equally in the X- and Y-directions with the zooming ratio which is the smaller one of two zooming ratios computed in the X,Y independent zooming. In the X zooming, the automatic zooming is conducted only in the X-direction. Similarly, the automatic zooming is effected only in the Y-direction when the Y auto-zooming is selected.

Figure 42:
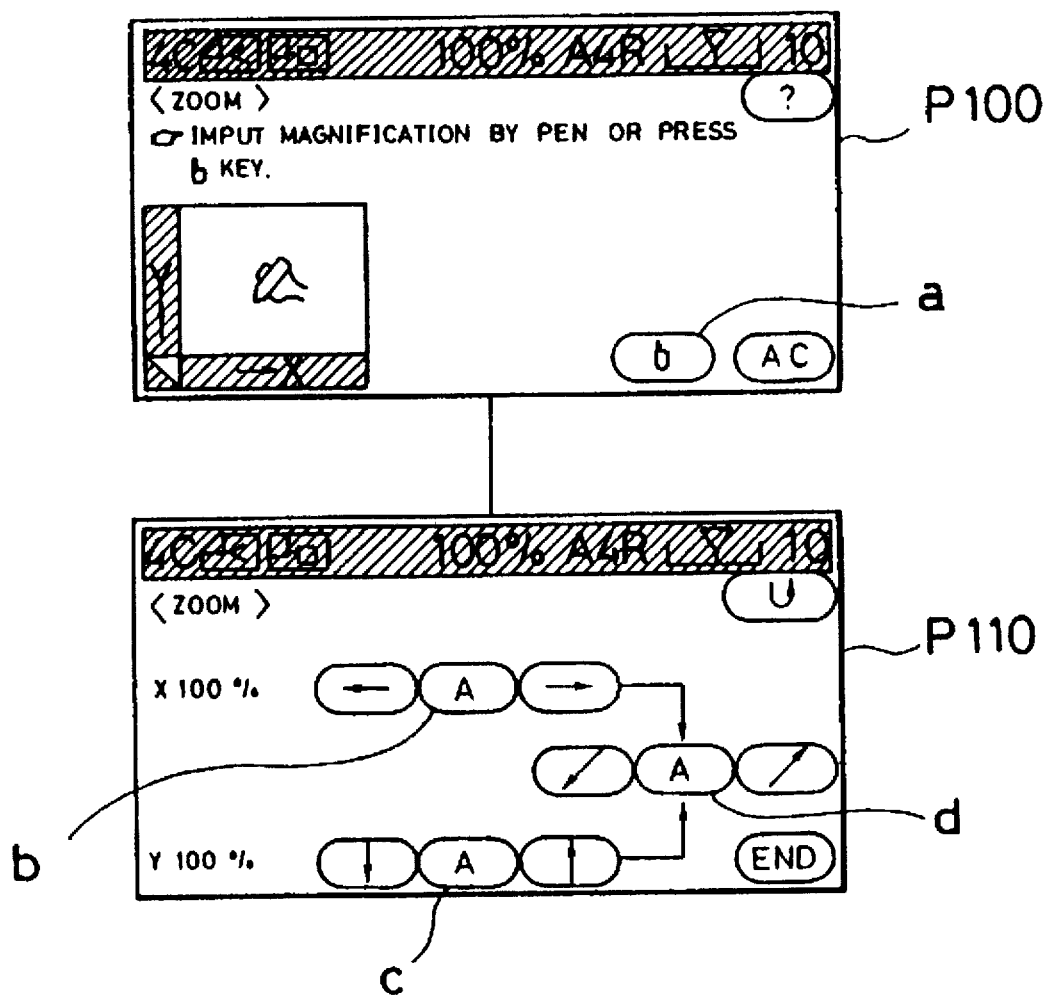
FIG. 42 is an illustration of manipulation of the apparatus in a zoom mode.

The manipulation in zooming mode will be described with reference to a liquid crystal display panel shown in FIG. 42. As a zoom key 422 on the digitizer 116 is pressed, the display is changed to the picture frame P 100 shown in FIG. 42. When the operator wishes to set the operation mode to manual zooming mode, the operator points by a point pen 421 the point where the lines on the coordinate detection plate 420 of the digitizer representing the zooming ratios in X- and Y-directions intersect each other. In response to this operation, the display is switched to a picture frame P 110 in which the appointed zooming ratios in X- and Y-directions are displayed. If the operator wishes to effect a delicate adjustment of the displayed zooming ratios, the operator presses one of the keys (up, down) on both sides of the touch key b if the adjustment is necessary only in the X-direction. If the adjustment is to be effected both in the X- and Y-directions at the same rate, the operator presses one of the keys on the left and right sides of the touch key d.

When the operator wishes to select the auto-zoom mode, the operator manipulates the digitizer in the same manner as that described before or touches the touch key a so as to switch the display from the pictue frame P 100 to a picture frame P 110. The operator can then select one of the four types of auto-zooming mentioned before, i.e., X,Y independent auto-zooming, X,Y equal auto-zooming, X auto-zooming and Y auto-zooming, by pressing touch keys b,c, touch key d, touch key b and the touch key c, respectively.

<MOVE MODE>

Figure 51:
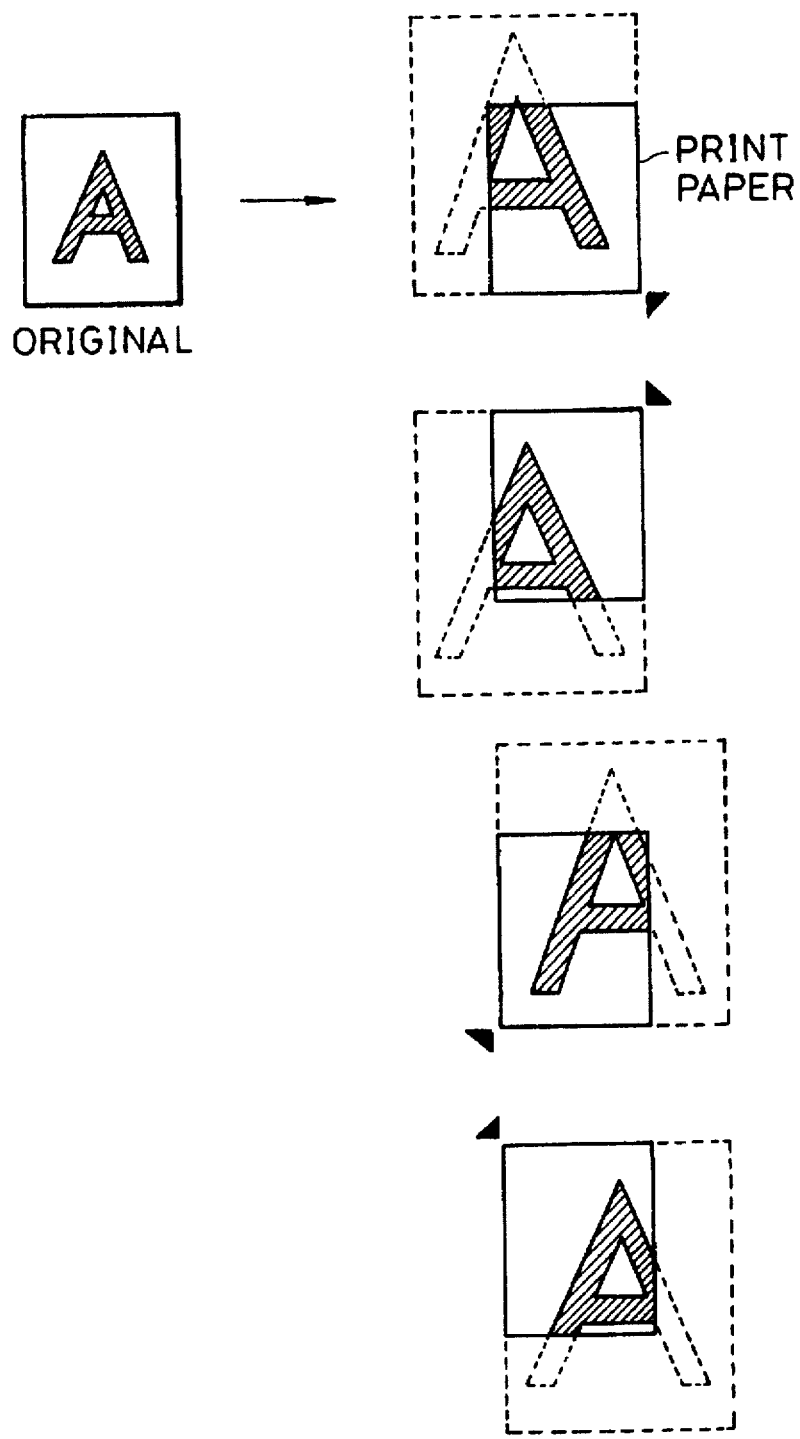
FIG. 51 is an illustration of a print image in operation in a corner moving mode.

The move mode M 200 includes four move modes: namely, a center move mode M 210, a corner move mode M 220, an appointed move mode M 230 and a binding margin move mode M240. The center move mode M 210 is a mode in whch the whole or a selected region of the original image printed on the center of the copy paper. The corner move mode M 220 is a mode in which the whole or a selected portion of the original image is copied on one of four corners of the copy paper. If .the corner move mode has been selected, the image is moved such as to start from the appointed corner even when the print image is greater than the selected paper size, as shown in FIG. 51. The appointed move mode M 230 is a mode in which the whole or a part of the original image is copied on any desired portion of the selected copy paper. The binding margin move mode M 240 is a mode in which the image is moved in such a manner as to leave a blank portion for a binding margin on the left or right portion of the selected copy paper.

Figure 43A:
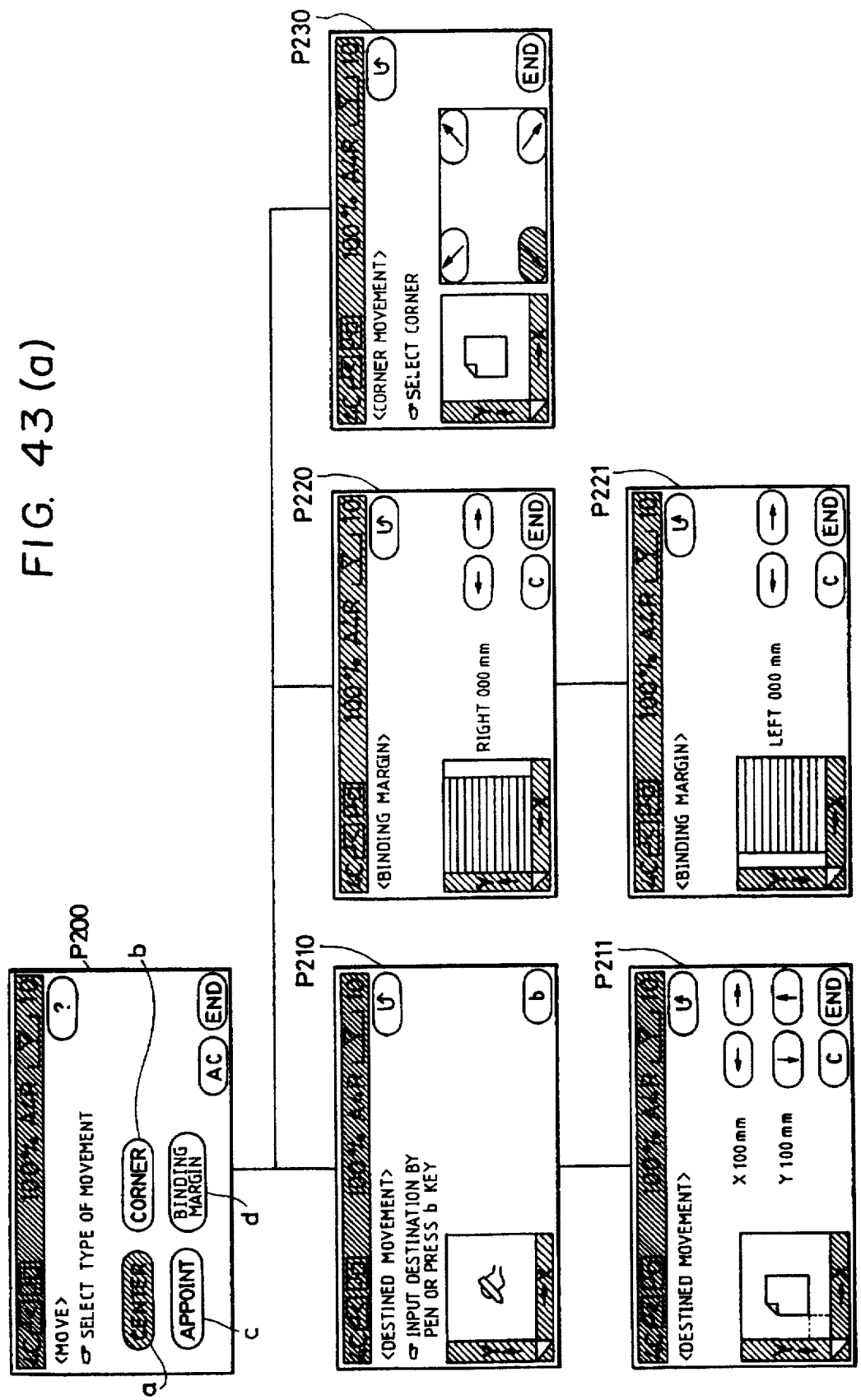
FIGS. 43(a) and 43(b) are illustrations of manipulation of the apparatus in a moving mode.
Figure 43B:
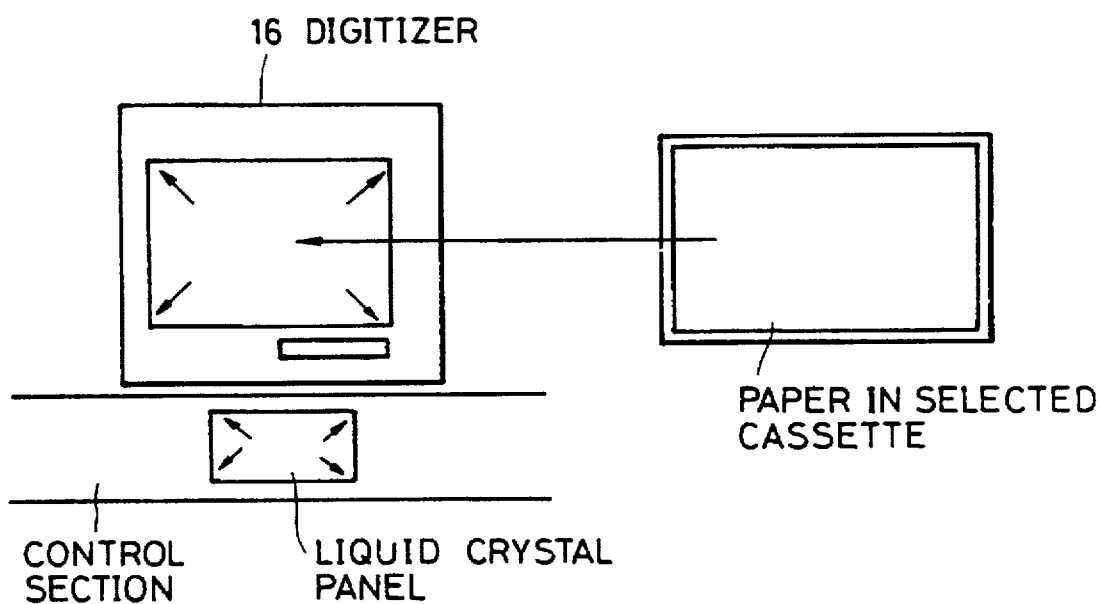

The actual manner of manipulation of the color copying apparatus of this embodiment will be explained with reference to FIG. 43(a). As the operator presses a move key 423 on the digitizer 16, the display is switched to a picture frame P 200 which allows the operator to select one of the above-mentioned four types of move mode. When the operator wishes to select the center move mode, the operator presses the touch key a on the picture frame P 200. For conducting the corner move mode, the operator presses the touch key b so that the display is switched to a picture frame P 230 which allows the operator to select one of four corners. The relationship between the direction of movement of the copy image with respect to the actual print paper and the direction of appointment on the picture frame P 230 is as if the the selected paper is directly placed on the digitizer 16 without changing the orientation of the paper. For selecting the appointed move mode, the operator presses the touch key c on the picture frame P 200 so that the display proceeds to a picture frame P 210 which enables the operator to appoint the destination position by means of the digitizer 16. In response to this operation, the display changes to a picture frame P 211 which shows an up/down key through which the destination position can be delicately adjusted. For the purpose of executing the binding margin move mode, the operator presses a touch key d on the picture frame P 200 which shows the up/down key by means of which the operator can appoint the length of the margin.

<DESCRIPTION OF AREA APPOINT MODE>

The area appoint mode M 300 enables te operator to appoint one or more areas on the original. One of three modes including a trimming mode M 310, a masking mode M 320 and an image separation mode M 330 can be selected for each area. The trimming mode M 310 is the mode in which only the image portion within an appointed area is copied, while the masking mode M 320 is a mode in which the copying is conducted while covering the inside of the appointed area with a white blank. The image separation mode M 330 is further classified into a color mode M 331, a color conversion mode M 332, a paint mode M 333 and a color balance mode M 334. In the color mode M 331, the inside of an appointed area is printed in selected one of nine types of color modes: namely, 4-full color mode, three full-color mode, Y mode, M mode, C mode, Bk mode, RED mode, GREEN mode and BLUE mode. The color conversion mode M 332 is a mode in which a portion or portions of a predetermined color within a given density range are converted into any desired color within the appointed area.

The paint mode M 333 is a mode in which the copy is obtained such that the whole of the appointed area is uniformly "painted' in a desired color. The color balance mode M 334 is a mode in which the image within an appointed area is copied in a color balance (color tone) different from that of the portion out of the appointed area.

by conducting density control of the Y,M, C and Bk components for the image portion with in the appointed area.

Figure 45B:
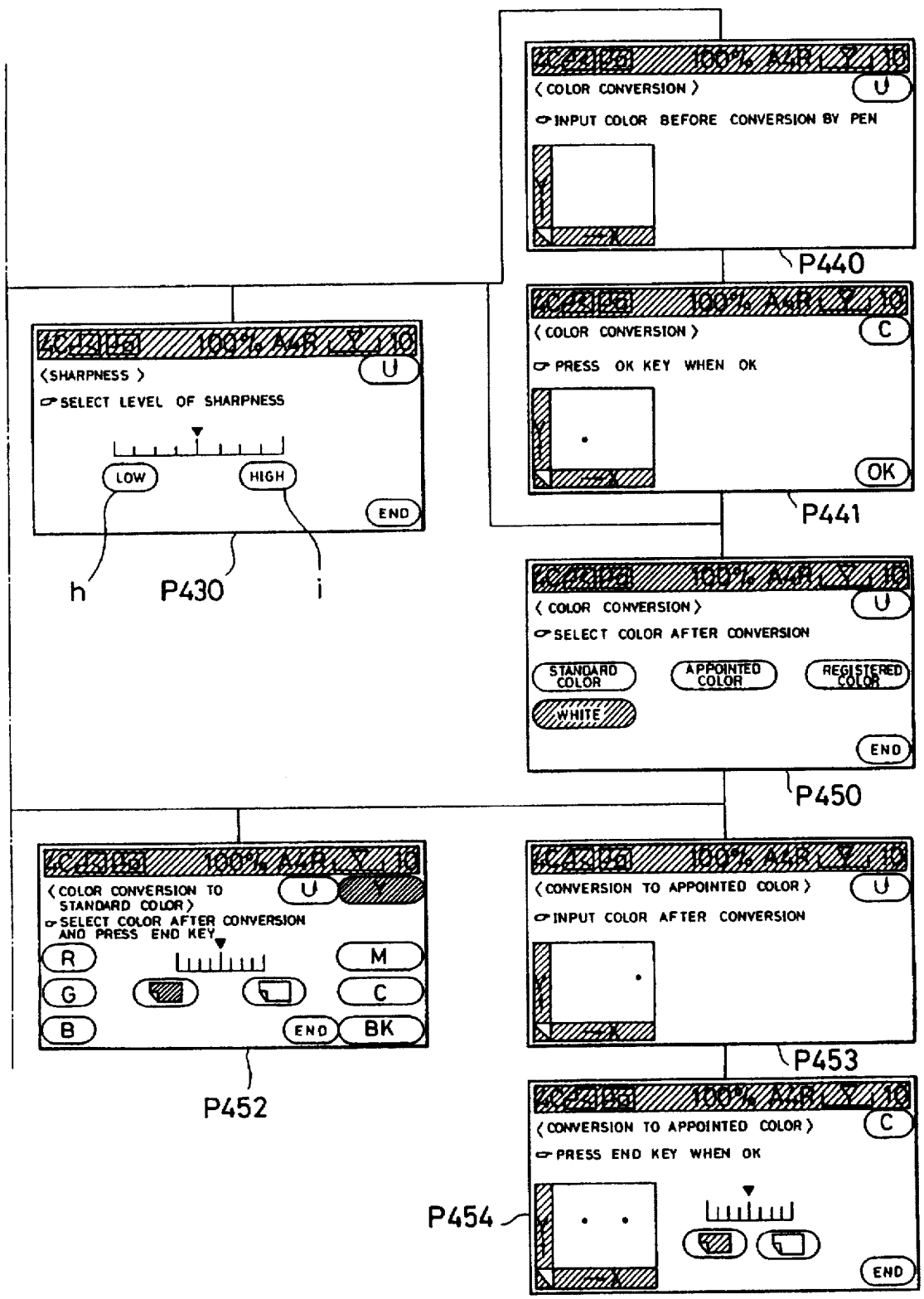

The practical method of manipulation of the color copying machine in the area appoint mode M 300 will be described hereinunder with reference to FIGS. 44(a) through 44(c). As the operator presses an area appoint key 424 on the digitizer 16, the content of the liquid crystal display is changed to a picture frame P 300. The operator then places the original on the digitizer 16 and appoints a desired area by means of the point pen 421. When two points demarcating the area have been pressed, the display is changed to a picture frame P 310. If the displayed area of appointment is correct, the operator presses touch key a on the picture frame P 310 so that the display proceeds to a picture frame P 320 which enables the user to select one of the trimming mode, masking mode and the image separation mode. The operator then appoints one of these three modes by pressing the corresponding key. If the trimming or masking mode is appointed, the operator presses the touch key on the picture frame P 320 so that the process proceeds to a next step which enables the user to appoint the area. On the other hand, if the color separation mode is appointed on the picture frame P 320, the display proceeds to a picture frame p 330 on which the operator can select one of the color conversion mode, paint mode, color mode and color balance mode. For instance, if the operator wishes to print the image portion within an appointed area in four full-color having Y, M, C and Bk color components, the operator presses the touch key a (color mode) on the picture frame P 330 so that the display is changed to a picture frame P 360. The operator then pushes the touch key a on this picture frame P 360 thus completing the appointment for printing the selected area in four full-color mode. If the operatopr has pressed a touch key a on the picture frame P 330 for appointing the color conversion mode, the display proceeds to a picture frame P 340 which enables the operator to appoint a point having the color information to be converted, by means of the point pen. If the correct appointment is confirmed through the display, the operator presses the touch key a on the picture frame P 341 so that the display proceeds to picture frame P370. The picture frame P 370 is intended for enabling the operator to appoint the color to which a selected color is to be changed. The operator can select one of four types of color, i.e., standard color, appointed color, registered color and white color as the color to be obtained after the conversion. If the operator wishes to select the color to be obtained after the color conversion out of the standard colors, he presses the touch key a on the picture frame P 370 so that the display is changed to a picture frame P 390 which enables the operator to select one of yellow, magenta, cyan, black, red, green and blue. Thus, the standard colors are the color information which the color copying machine inherently possesses. In this embodiment, the print image is obtained at an intermediate density level with ratios as shown in FIGS. 45(a) and 45(b). When the operator wishes to obtain a copy image color which is slightly lighter or darker than a selected registered color, he manipulates a density appointing key on the center of the picture frame P 390, whereby the copy can be obtained in the selected registered color at a desired density level. When the operator has selected the touch key c (appointed color) on the picture frame P 370, the display proceeds to a picture frame P 380 through which the operator can appoint the point having the color information which is to be obtained after the color conversion, by the same manner as the appointment of the color coordinate before the conversion, so that the display proceeds to a picture frame P 381. If the operator wishes to conduct the color conversion by varying only the density level without changing the color tone, the operator presses a density control key a on the center of the picture frame P 381 so that a color copy image is obtained at the desired level of density.

If the color to be obtained after the conversion cannot be found in the standard colors and the colors in the original when the picture frame P 370 is on display, the operator can conduct the color conversion by making use of one of colors Which have been registered in a later-mentioned color registration mode. In such a case, the operator presses the touch key c on the picture frame P 370 to change the display to a picture frame P 391 which shows identification numbers of registered colors. The operator then presses a touch key of the number corresponding to the registered color which he would like to obtain after the conversion. In this case also, the conversion can be conducted without changing the ratios of the color components while changing the density level solely. Pressing of a touch key c on the picture frame P 370 provides the same effect as that produced in the masking mode M 310 explained before.

If the operator wishes to appoint the paint mode M 333 in the image separation mode M 330, he presses the touch key c on the picture frame P 330 so that the display is changed to the picture frame P 370. Subsequent appointment of the color is conducted in the same manner as that conducted on the picture frame P 370 in the color conversion mode M 332.

In some cases, the operator may wish to print only the image portion within an appointed area in a desired color balance (color tone). In such a case, he presses a touch key d on the picture frame P 350 through which the operator can conduct the density control by means of the up/down touch key to Vary the density levels of the yellow, magneta, cyan and black which are the toner components of the printer. On the picture frame P 350, the black bar graph indicates the state of appointment of the density level in combination with a gradation placed beside the bar graph.

<DESCRIPTION OF COLOR CREATE MODE>

The color create mode M 400 shown in FIG. 39 enables the operator to select one or more of five types of mode: namely, a color mode M 410, a color conversion mode M 420, a paint mode M 430, a sharpness mode M 440 and a color balance mode M 450. The difference between the color mode M 410, color conversion mode M 420, paint mode M 430 and the color balance mode M 450 and those modes M 331, M 332, M 333 and M 334 of the area appoint mode M 300 resides only in that in the color create mode is applied to the entire portion of the original rather than a selected area or areas of the original. The description of the modes M 410, M 420, M 430 and M 450 therefore is omitted.

The sharpness mode M 440 is a mode which enables the sharpness of the display image to be controlled. For instance, this mode is used for the purpose of so-Called edge stressing on letter images or for controlling the rate of smoothing effect on half-tone images.

The manner in which the color create mode (1) is set will be described with reference to FIGS. 45(a) and 45(b). As the operator presses a color create mode key 425 on the digitizer 16, the liquid crystal display is switched to a picture frame P 400. As the touch key b (color mode) on the picture frame P 400 is pressed, the display proceeds to a picture frame P 410 through which the operator can select the color mode to be copied. When the color mode to be selected is monochromatic color mode other than three-color or four-color, the display further proceeds to a picture frame P 411 through which the operator can select the negative or positive film. When the touch key c (sharpness) on the picture frame P 400 is pressed, the display proceeds to a picture frame P 430 which enables the operator to control the shaprness of the copy image. More specifically, pressing of a touch key i (strong) on the picture frame P 430 causes the edge stressing effect to be enhanced as explained before so as to provide a higher sharpness of letter and line images. On the otehr hand, pressing of a touch key h (weak) causes the smoothing of the peripheral pixels with the result that the amount of smoothing is enhanced to eliminate any moire which is generated when a half-tone image is copied. The operation in the color conversion mode M 420, paint mode M 430 and color balance mode M 450 are not described because they are the same as those in the area appointing mode.

<DESCRIPTION OF INSERT SYNTHESIS MODE>

Figure 50:
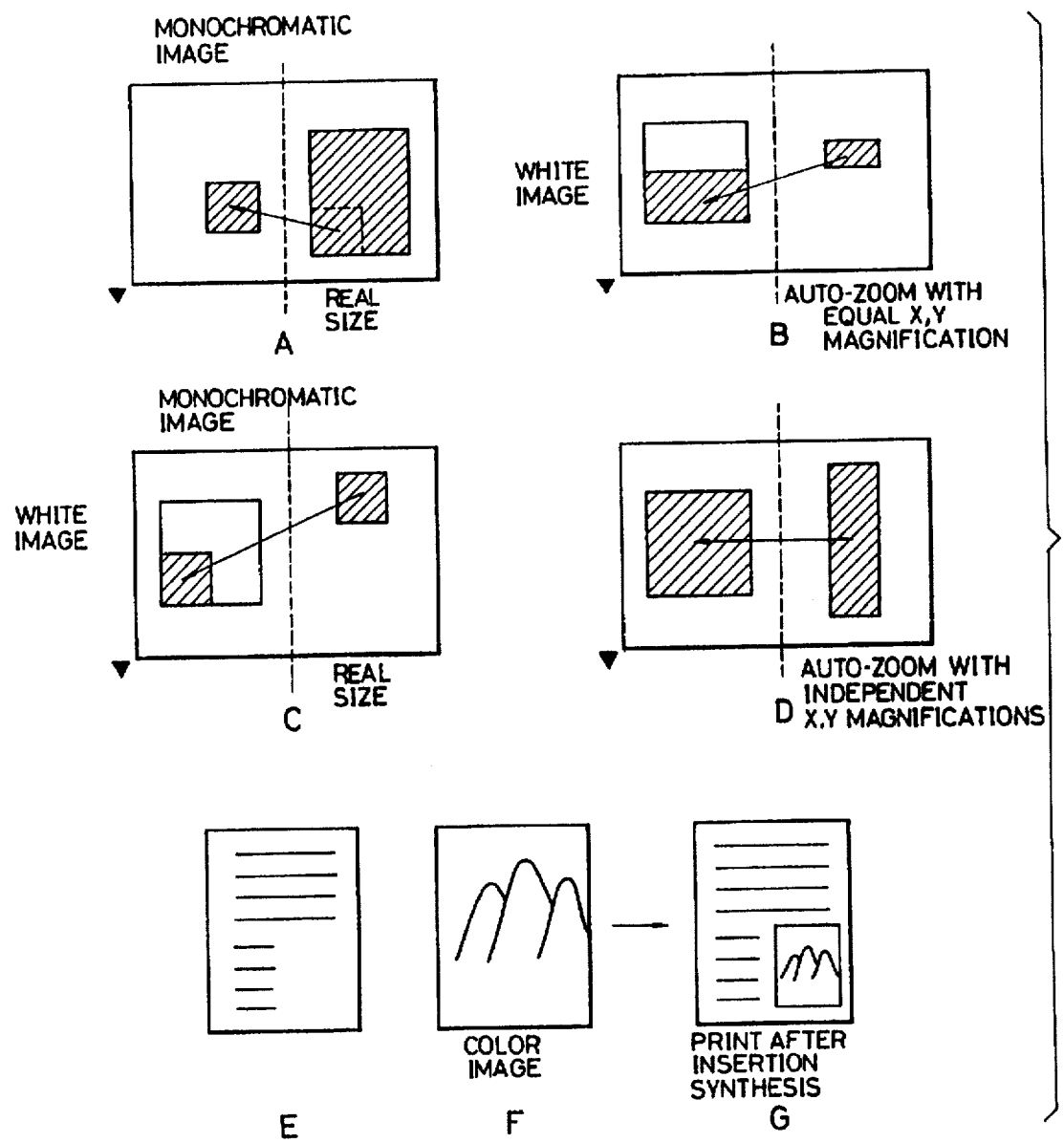
FIG. 50 is an illustration of insert synthesis mode.

The insert synthesis mode is one in which, when there are originals as shown by E and F of FIG. 50, a selected region Of the color image is shifted to an appointed region of the monochromatic image (or a color image) with or without zooming so that a synthetic image is printed.

Figure 47:
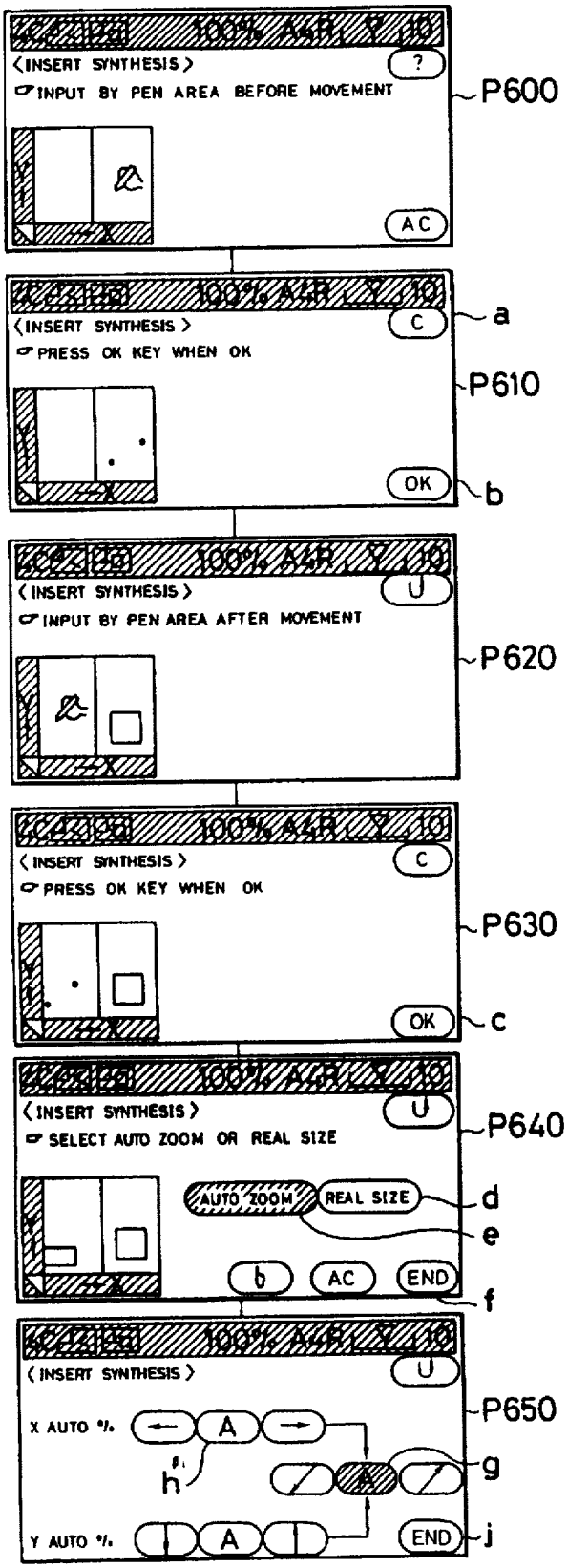
FIG. 47 is an illustration of manipulation of the apparatus in an insert synthesis mode.
Figure 46:
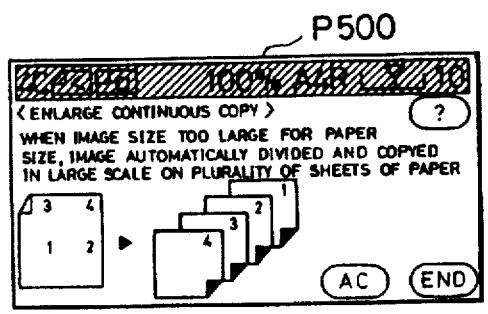
FIG. 46 is an illustration of a manipulation of the apparatus in enlarging continuous copying mode.

The manner in which the insert synthesis mode is set will be explained with referene to illustration on the liquid crystal panel and the touch panel key. The operator places the original on the coordinate detection plate of the digitizer 16 and presses an insert synthesis key 427 which is the entry key for this mode. As a result, the display is changed from the standard frame P000 to a picture frame P 600 shown in FIG. 47. Then, the operator appoints two points on the orthogonal line of the color image region to be shifted by means of the point pen 421. As a result, dots are displayed on two points corresponding to the appointed point, on a picture frame P 610 of the liquid crystal display. If the operator wishes to change the appointed region to another region, the operator presses the touch key a on the picture frame P 610 and appoints two points of the region of interest. Upon confirming that the region of interest has been correctly appointed, the operator presses the touch key c on the picture frame P 630 so that the display is changed to a picture frame 640 which enables the operator to select the zooming ratio of the color image region to be shifted. If the operator wishes to insert the color image region in real size, he presses the touch key d and then presses an end touch key, thus completing the setting. An automatic control is conducted such that, when the size of the shifted image region is greater than the size of the destination region to which the image region is to be shifted, the shifted image region is inserted in conformity with the size of the destination region, whereas, if not, the unfilled space or area in the destination region is printed as a white image. When the operator wishes to insert an appointed color image region to a destination region while changing the size of the image region to be inserted, he presses a touch key e appearing in the picture frame P 640. In consequence, the display is changed to a picture frame P 650, and the zooming ratios in the X-direction (sub-scan direction) and Y-direction (main scan direction) are set in the same manner as that explained before in connection with the zooming mode. When it is desired to insert the appointed color image region while effecting X,Y equal auto-zooming mode, the operator touches a touch key g on the picture frame P 650 so as to reverse the key display. When it is desired to print the appointed color image region in the same size as the destinaion region, the operator presses the touch keys h and i to reverse the key display. When the zooming of the shifted color image region is to be conducted only in the X-direction, Y-direction or in the X,Y manual equal zooming mode, such a mode can be set by means of the up/down touch keys.

After the completion of the setting operation, the operator presses a touch key j so that the picture frame is returned to the standard picture frame P000 in FIG. 33, whereby the setting of the insert synthesis mode is completed.

<ENLARGING CONTINUOUS COPYING MODE>

In some cases, the size of the copy image of the whole or a part of an original copied at the set zooming ratio exceeds the size of the selected paper size. In such a case, the original image to be copied is automatically divided into two or more sections taking into account both the set zooming ratio and the selected paper size, and the sections are successively copied on successive sheets of copy paper of the selected size. This mode of operation is referred to as enlarging, continuous copying mode. By assembling the copy sheets, it is possible to obtain a copy image of a size which is greater than the selected paper size.

This mode is set simply by pressing an enlarging continuous copy key 426 on the digitizer 16 and then pressing the touch key a appearing in the picture frame P 500 in FIG. 38, followed by selection of the zooming ratio and the paper size.

<REGISTRATION MODE>

The registration mode M 700 is composed of three modes: namely, a color registration mode M 710, a zoom program mode M 720 and a manual paper feed appointing mode M 730. The color registration mode enables various colors to be registered so as to be selected as the color after the color conversion in the color conversion mode and paint mode which are included in the aforementioend color create mode M 400 and area appoint mode M 300. The zoom programming mode M 720 is a mode in which the zooming ratio is automatically computed in accordance with the input data concerning the size of the original and the size of the copy paper. The result of the computation is displayed on the standard frame P000 and the copying operation is executed with this zooming ratio. The color copying machine of this embodiment enables manual feed of copy paper besides the paper feed from the upper and lower paper cassettes. When the machine is to be used in so-called APS (Auto-Paper-Select) mode, it is possible to appoint the size of the paper to be fed manually.

Figure 48:
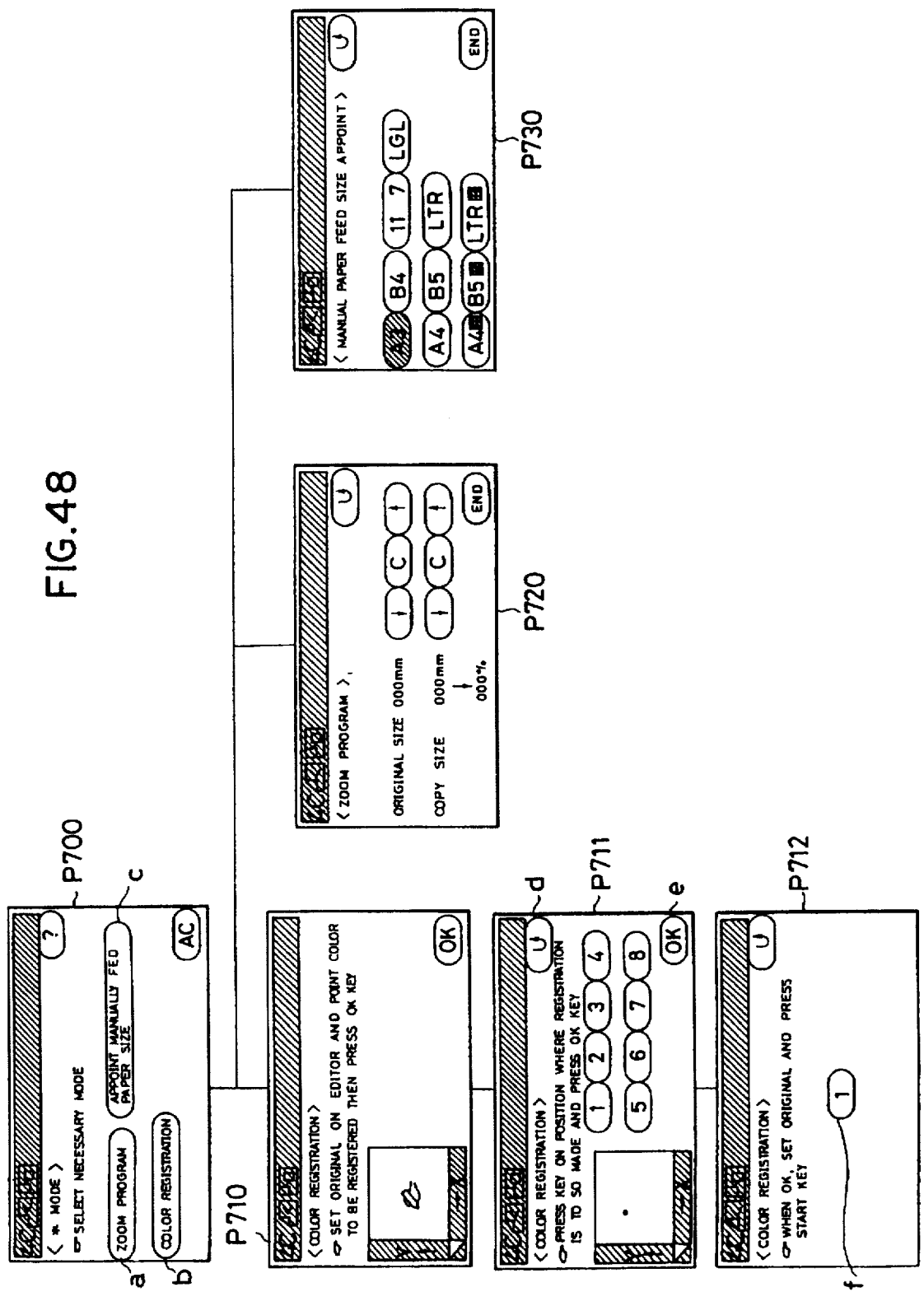
FIG. 48 is an illustration of manipulation of the apparatus in a registration mode.

As a * key 402 on the operating section shown in FIG. 39 is pressed, the display is changed to the picture frame P 700 shown in FIG. 48. If the operator wishes to register a color or colors by the color registration mode, he presses the touch key a so that the display is advanced to a picture frame P 710. The operator then registers a desired color by placing the original having the color to be registered on the digitizer 16 and appointing the portion of the color by means of the point pen 421.

As a result, the display proceeds to a picture frame P 711 which shows registration numbers which are to be allocated to the registered colors. The user then presses the key corresponding to the number which is to be allocated to the newly registered color. For registering another color, the operator presses the touch key d on the picture frame P 711 so that the display returns to the picture frame P 710 so that the additional color can be registered in the same manner as that described above. When the input of the coordinate values to be registered is finished, the operator presses a touch key e and then presses a touch key f which is a read start signal appearing on a picture frame P 712.

Figure 52:
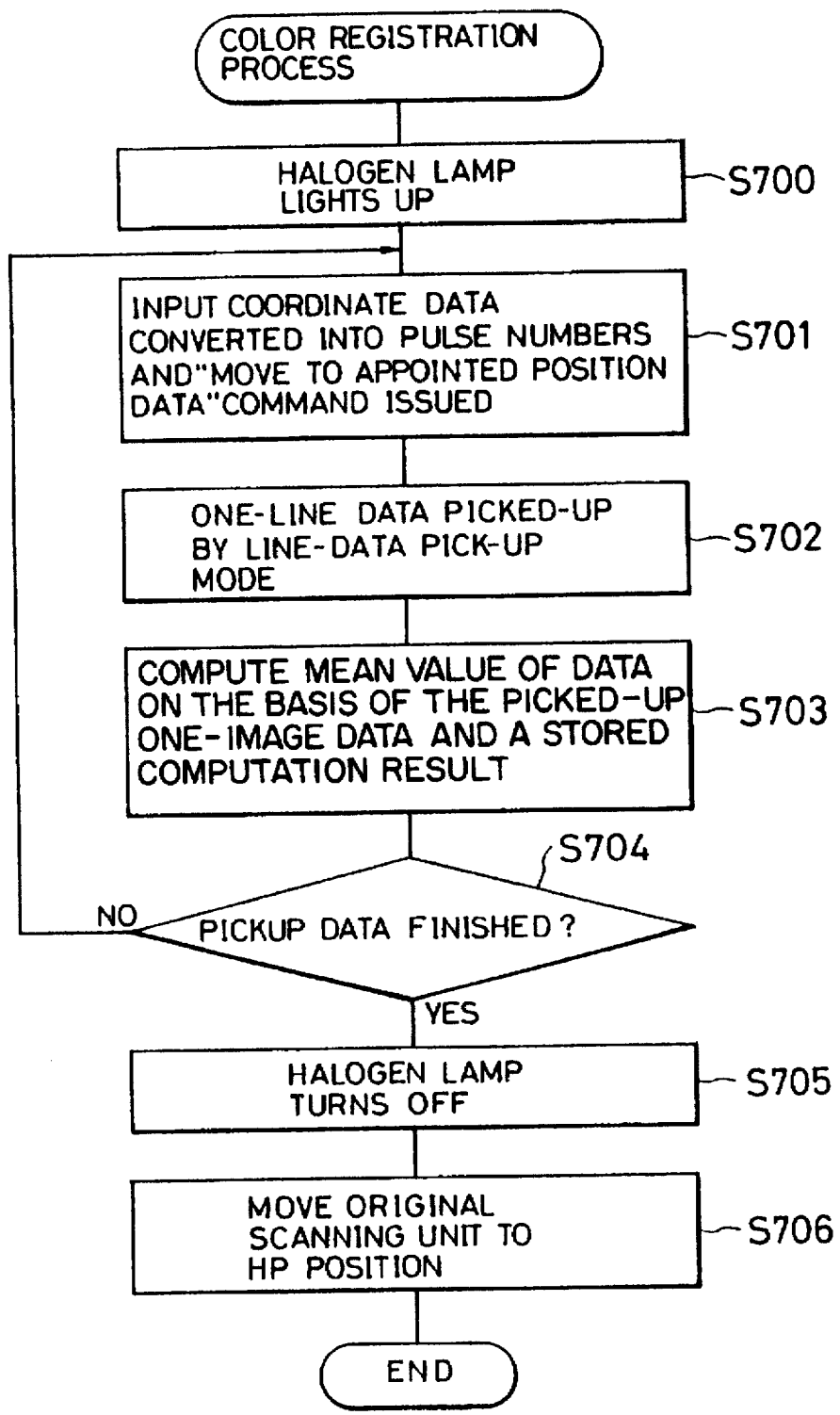
FIG. 52 is a control flow chart of operation in a color registration mode.

Once the touch key f is pressed, the process automatically proceeds in accordance with the process of the flow chart shown in FIG. 52. In Step S 700, the halogen lamp 10 lights up and, in Step S 701, the number of driving pulses to be supplied to the stepping motor is computed on the basis of the distance to the appointed coordinate in the direction of the sub-scan and the aforementioned appointed move command is issued so that the original scanning unit 11 is moved. In Step S 702, the line pick-up mode is executed so that the data concerning one line in the coordinate-appointed sub-scan position is picked up and stored in the RAM 78' shown in FIG. 11(a). In Step S 703, the CPU 22 computes the mean value of the data carried by 8 pixels before and after the main scan position appointed in terms of coordinate, on the basis of the one-line data picked up in the RAM 78', and the result of the computation is stored in the RAM 24. In Step S 704, a judgment is executed as to whether all the registered coordinates have been read. If not, the process returns to Step S 701 so that the described operation is repeated. If the reading of data has been finished with all the registered portions, the halogen lamp 10 is turned off in Step S 705 and the original scanning unit is returned to the reference or home position H.P., thus completing the process.

As the touch key a (zoom program) is pressed in the picture frame P 700, the display is changed to the picture frame P 720 through which the length of the original and the length of the copy paper are set by means of the up/down key. The set value is displayed on the picture frame P 720 and, at the same time, the value of the ratio copy size/ original size is displayed in terms of %. The result of the computation is displayed also on the zooming ratio display position of the standard picture frame P 000, whereby the zooming ratio for the copying operation is set.

As the touch key S (manual feed paper size appoint) is pressed on the picture frame P 700, the display proceeds to a picture frame P 730 in which the operator can appoint the size of the paper to be fed manually. This mode enables the APS mode and the auto-zooming mode to be executed under manual feed of the copy paper.

Numerical data and information set through the touch panel operation or coordinate input through the digitizer in the described operation modes are stored in predetermined regions of RAMs 24 and 25 under the control of the CPU 22 and are read as desired so as to be used as operation parameters in the subsequent copy sequence.

Figure 59:
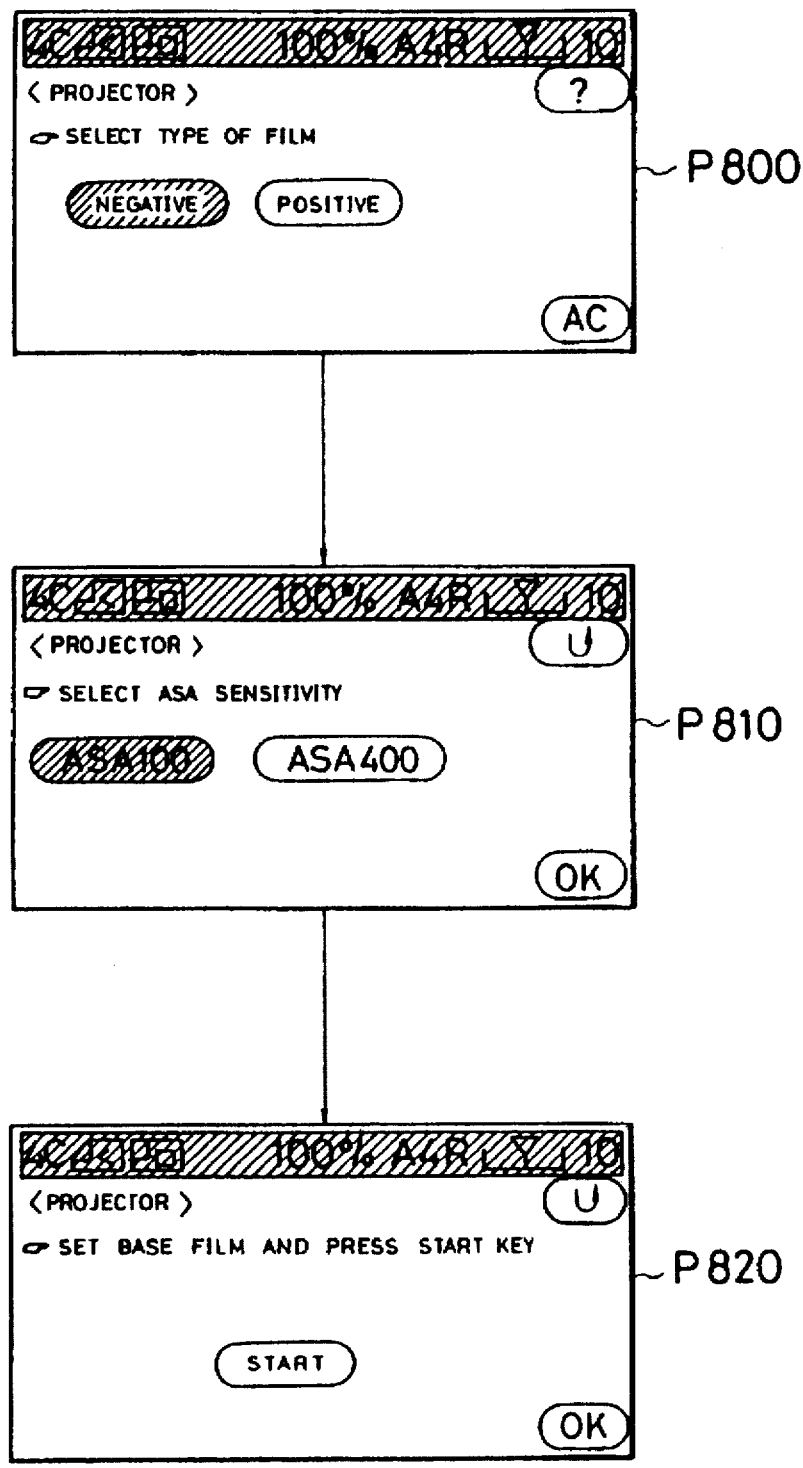
FIG. 59 is an illustration of operation of a projector.

FIG. 59 shows the procedure of operation of the copying machine when the same is used in combination with the film projector 211 (see FIG. 32).

After connecting the film projector 211 to the copying machine, the projector mode selection key 406 (see FIG. 39) is pressed so that the display on the liquid crystal touch panel is changed to P 800. In this pictue frame, the operator inputs whether the film is a negative film or a positive film. If the negative film is selected, the display is switched to a picture panel P 810 which allows the operator to select the ASA sensitivity of the film. It is assumed here that ASA 100 is selected at this stage. Then, the nega-base film is set in accordance with the procedure explained before in connection with FIG. 29 and then the shading start key on the picture panel P 820 is turned on whereby a shading correction is executed. Then, the negative film to be printed is set on the holder 215 and the copy button 400 (see FIG. 39) is pressed so that the AE operation is executed for the purpose of determining the exposure voltage. Then, the image formation process is repeated to sequentially form yellow, magenta, cyan and black images as shown in FIG. 33(a).

Figure 54:
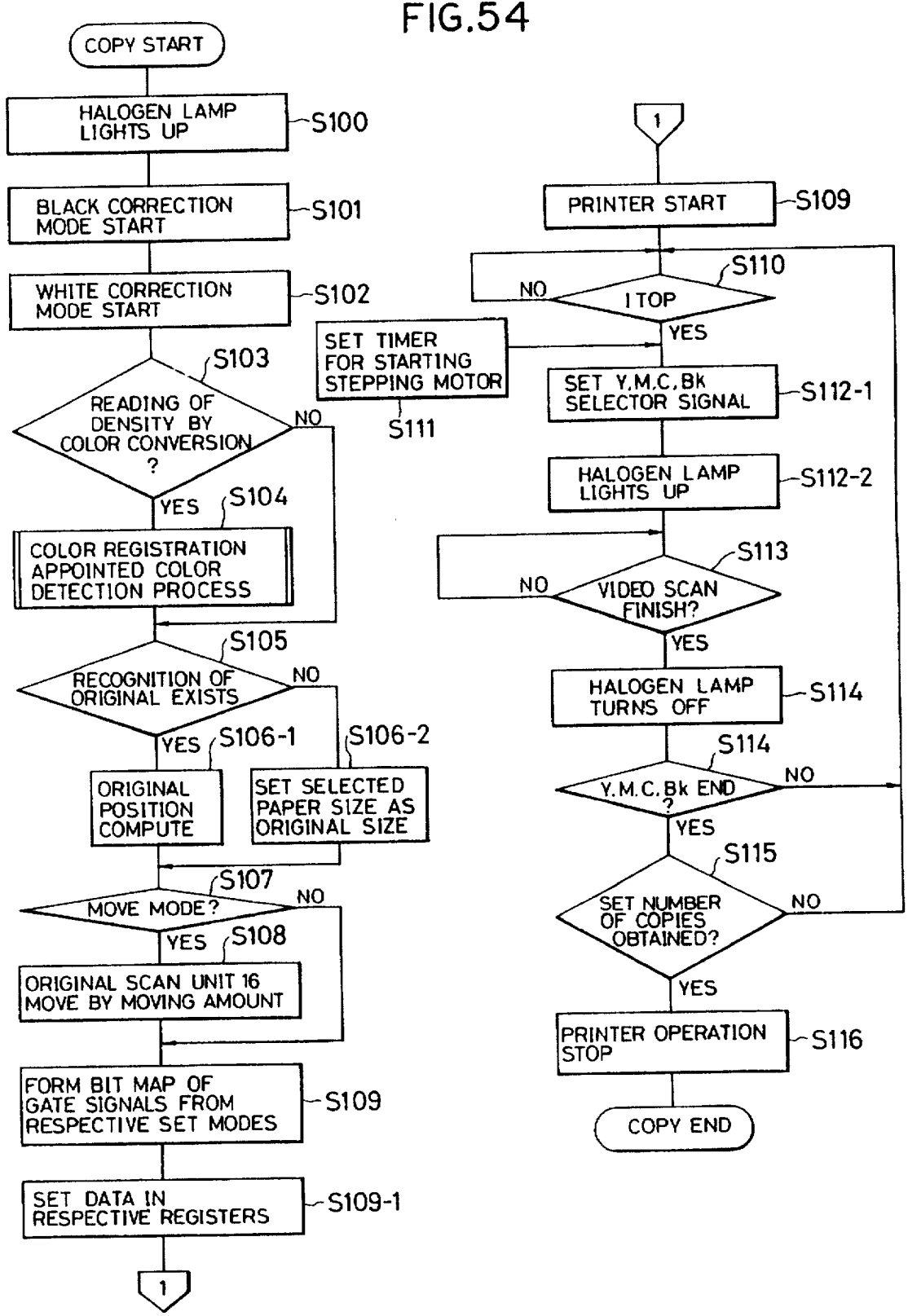
FIG. 54 is a control flow chart showing the flow of control of the whole system.

FIG. 54 is a flow chart illustrating the sequence control adopted in the color copying machine of this embodiment. The operation of the copying machine will be explained in accordance with this flow chart. As the copy key is pressed, the halogen lamp is turned on in Step S 100, shading processes for the black level correction and white level correction are executed in Steps S 101 and S 102 as explained before. If the appointed color conversion has been set in the color conversion mode or the paint mode, coot registration operation and appointed color reading operation are executed in Step S 104 so that the color-separated density data of the appointed coordinates are stored in predetermined areas depending on whether the mode is the registration mode or the appointed color detection mode, as explained before in connection with FIG. 52. In Step S 105, a judgment is executed as to whether the original recognition mode has been set. If this mode has been set, the scanning unit 11 is made to scan the original over the maximum original detection stroke of 435 mm in Step S 106-1, whereby the position and the size of the original are detected through the CPU BUS by the original recognition function 200 explained before. If the original recognition mode has not been set, the size of the copy paper selected in Step S 106-2 is recognized as the original size and the information concerning this original size is stored in the RAM 24. In Step S 107, a judgment is executed as to whether the move mode has been set or not. If this mode has been set, the original scanning unit 11 is beforehand moved towards the original by an amount corresponding to the amount sat in the move mode.

In Step S 109, a bit map is formed for the outputs of gate signals of various functions derived from the RAM 136 or the RAM 137.

Figure 57A:
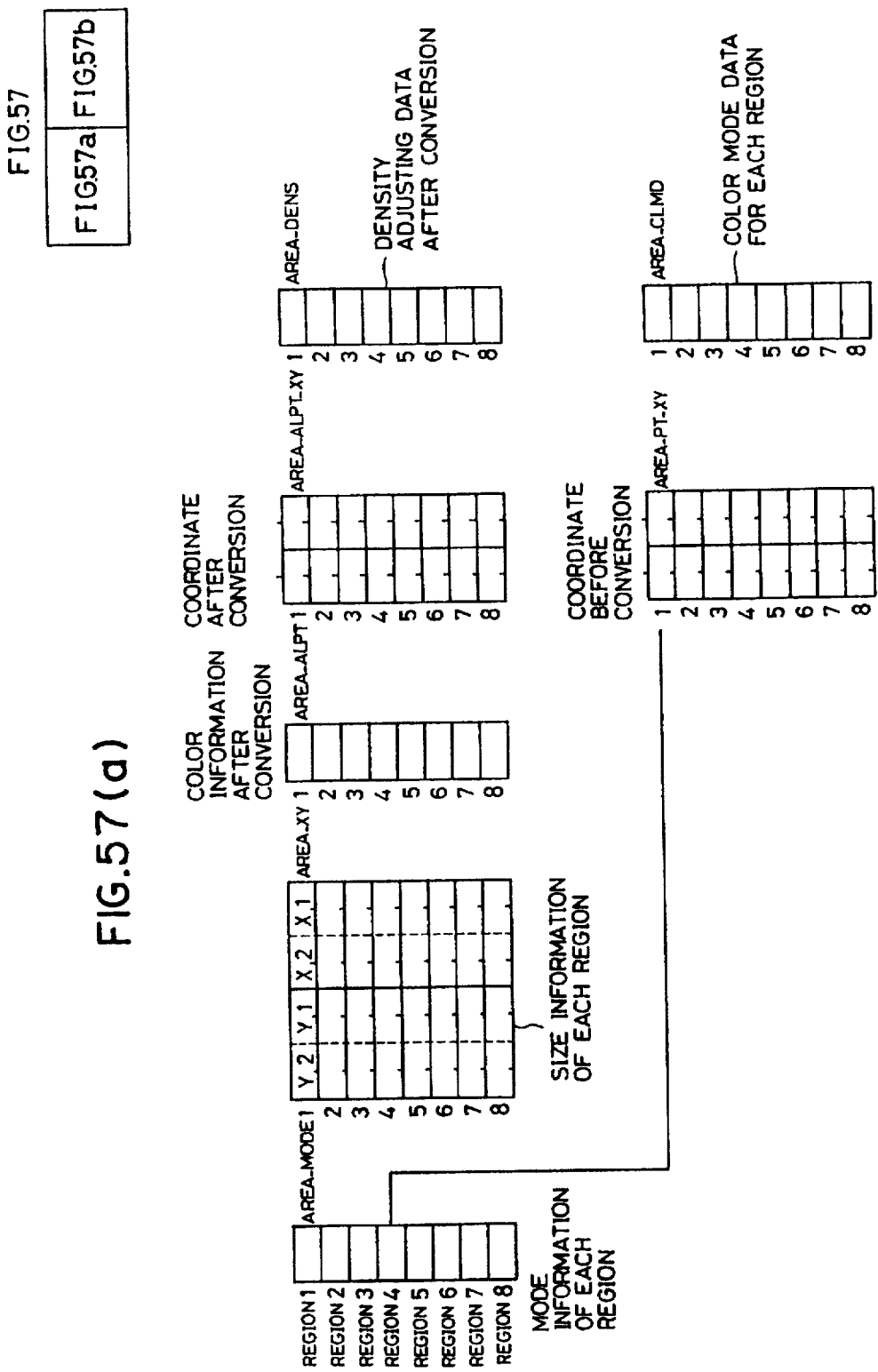
FIGS. 57a and 57b are assembled to form an illustration of a memory map in a RAM.
Figure 57B:
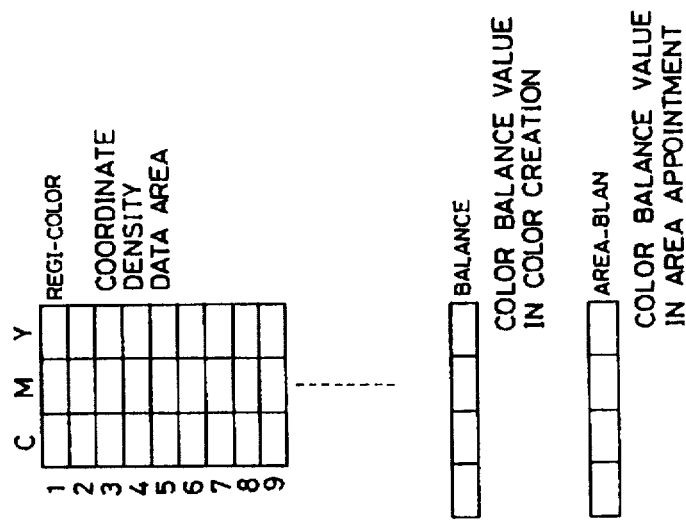

FIGS. 57(a) and 57(b) illustrate a RAM map of information set in the RAMs 24 and 25 in various modes which have been described. AREA MODE stores information for identifying various modes which are to be executed on appointed areas, such as the paint mode, trimming mode and so forth. AREA XY is an area which stores size information such as the original size and the sizes of various areas. AREA ALPT stores information concerning the colors after the color conversion, e.g., information for discriminating whether the colors are standard colors, appointed colors or registered colors. AREA ALPT XY is an area which stores information concerning the color information used when the content of the AREA ALPT indicates appointed color, while AREA DENS is an area for storing information concerning the density control after the color conversion. AREA PT XY is an information area for the color coordinate before the conversion of color in the color conversion mode. AREA CLMD stores color mode information concerning the color of the original or an appointed area of the original.

Figure 58:
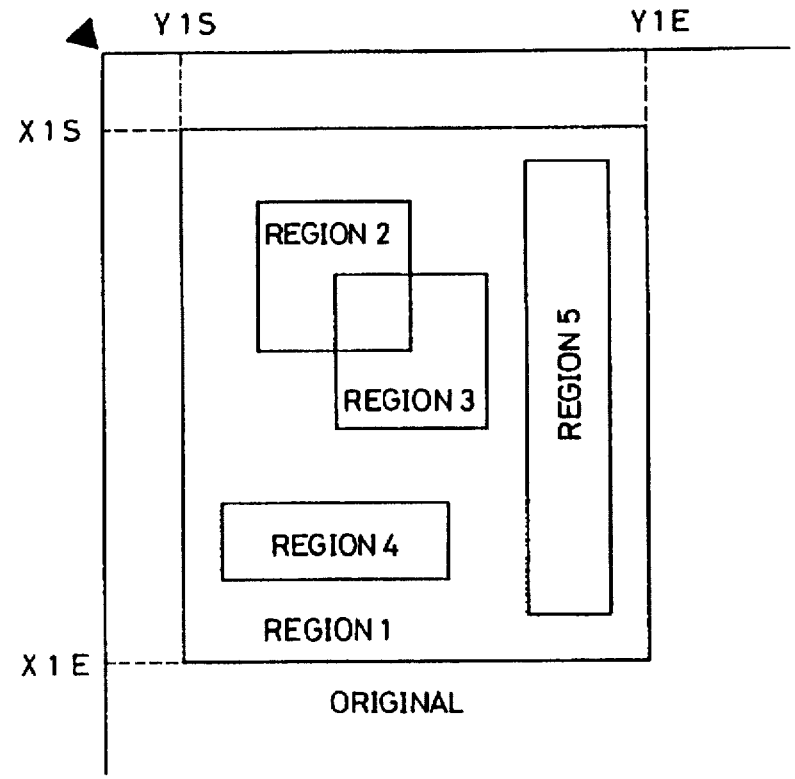
FIG. 58 is an illustration of a bit map.

REGI COLOR is an area which stores information concerning the colors registered in the color registration mode, the information being used as registered colors. This AREA is stored in a back-up memory of the RAM 25 so that the information is not lost even when the power is turned off. The bit map of FIG. 58 is formed by using this information. As the first step, the coordinate data in the direction of sub-scan are picked up from the AREA XY of FIG. 57 storing the area size informations and the data thus derived are sorted and put in order from the smallest one in the X ADD area. A similar sorting operation is executed also in the direction of the main scan.

Subsequently, "1" is set in the BIT MAP position of each of the start and finish point of each area in the direction of main scan. The bit position in which "1" is set corresponds to the gate signals derived from the RAM A 136 or the RAM B 137, whereby the bit positions are determined by the mode within the area. For instance, the area 1 which is the whole area of the original corresponds to TMAREA 60, while the area 6 in which the color balance is appointed corresponds to CAREA 626. This operation is executed also for other areas so that the BIT MAP corresponding to these areas is formed in the BIT MAP area shown in FIG. 58. Then, in Step S 109 d, the following process is executed for the mode appointed for each area. A uni-color mode Of cyan color has been set for the area 2, so that this area is copied in monochromatic image even when the original is a four full-color image. Even if the video is transmitted during cyan color development of this area 2, only the cyan color portions of the image is printed in this area, portions of other colors such as yellow and magenta are not printed. Therefore, the following coefficients are set in the masking coefficient register of FIG. 24(a) which is selected when TMAREA has become active, so that ND image may be formed when the monochromatic color mode has been selected for an appointed area.

| | |
|---|---|
| $\alpha Y_1, \alpha Y_2, \alpha Y_3$ | 0, 0, 0 |
| $\beta M_1, \beta M_2, \beta M_3$ | 0, 0, 0 |
| $\gamma C_1, \gamma C_2, \gamma C_3$ | 1/3, 1/3, 1/3 |
| $k_2, l_2, m_2$ | 0, 0, 0 |

Then, the data which are used in the four or three full-color mode and which are stored in the RAM 23 of FIG. 10 are set in the masking register which is selected on condition that MAREA 564 is "0".

Figure 26A:
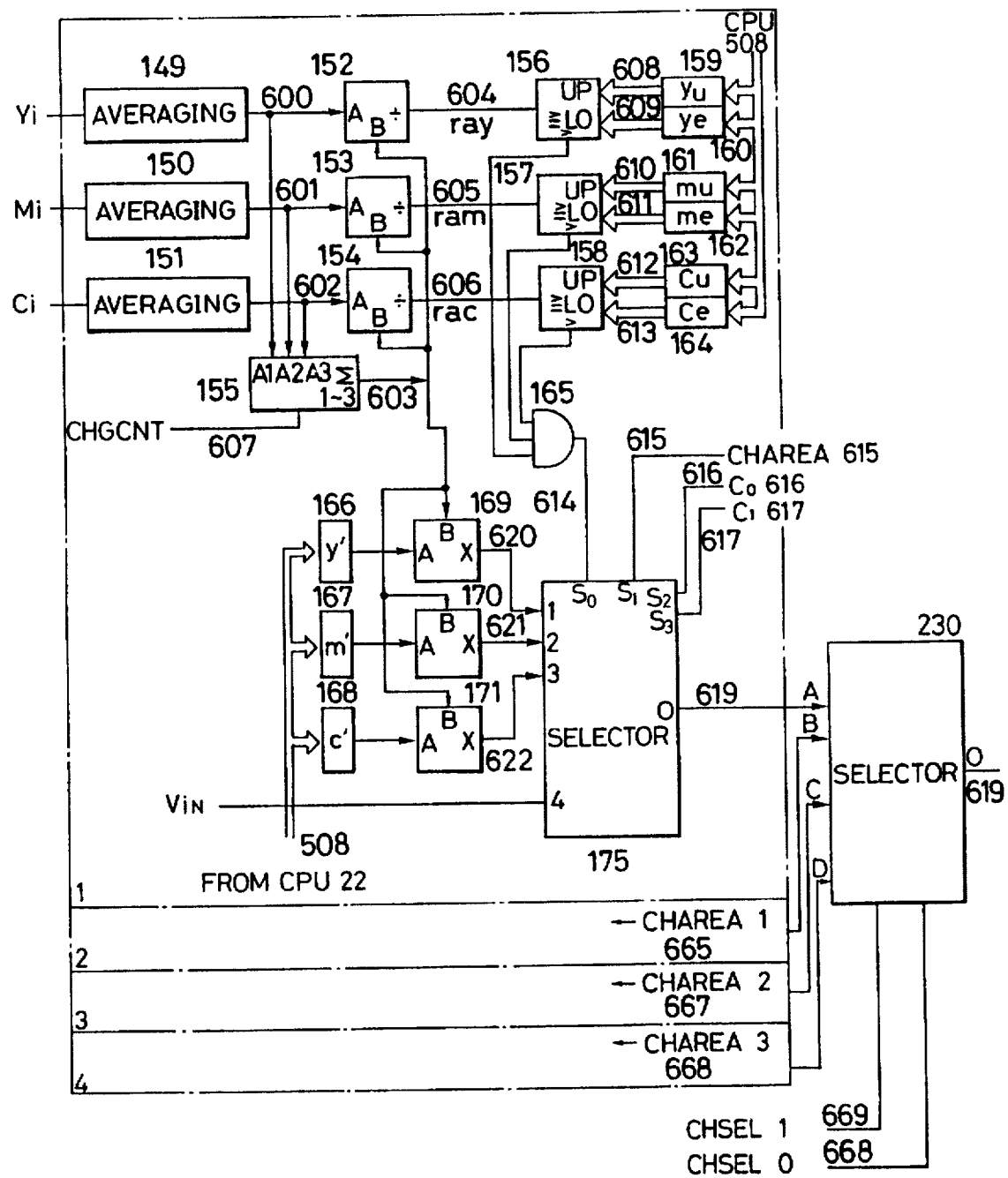
Figure 26D:
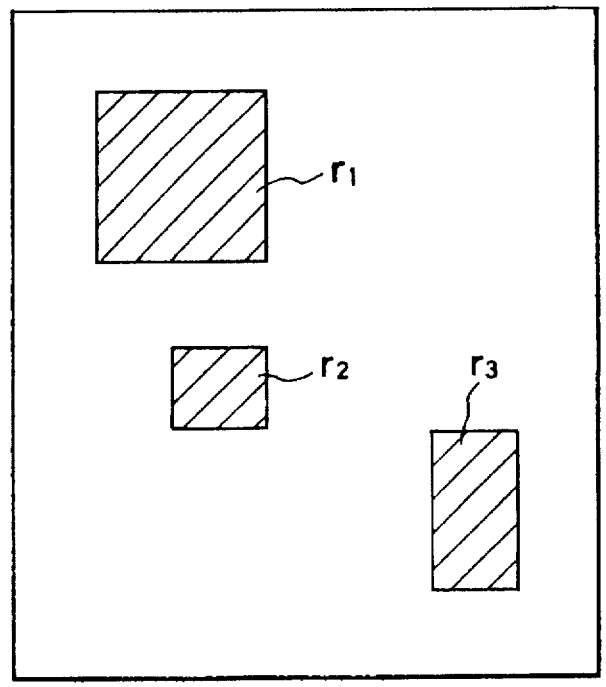
Figure 26E:
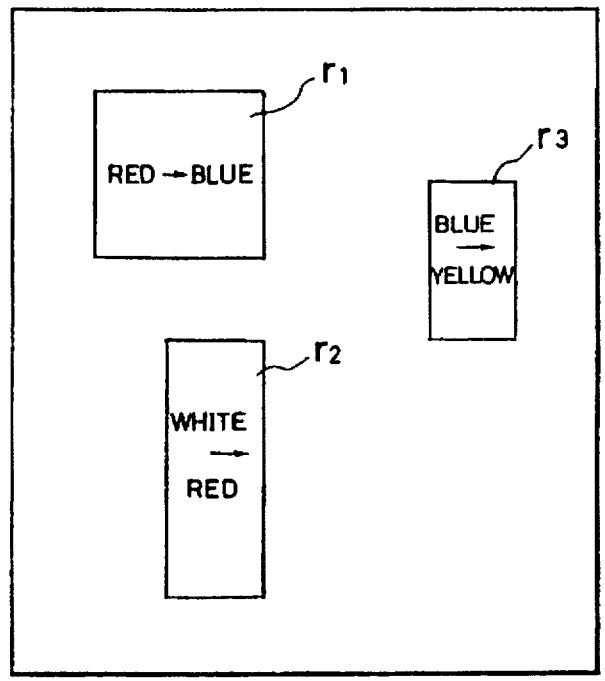

In regard to the area 2 in which the paint mode has been set, data in the registers of FIG. 26(a), which are selected respectively by gate signals CHAREA0, 1, 2, 3 corresponding to the aforementiond MIIMAP area, are set. In order to conduct the conversion for all the input video, FF is set on the yu 159, 00 is set on yl 160, FF is set on mu 161, 00 is set on ml 162, FF is set on Cu 163 and 00 is set on Cl 164, and the color information concerning the colors after the conversion stored in the process explained in connection with FIG. 57 are loaded from AREA ALPT or REGI COLOR and the respective color data are multiplied with the coefficients of the density control data derived from AREA DENS. In regard to the color conversion to be conducted on the area 4, values obtained by multiplying the density data before conversion shown in FIG. 57 with a certain offset value are set in the aforementioend registers yu 159, . . . , cl 164. Then the data after the conversion are set in the same manner. In regard to the color balance set for the area 5, the data values derived from the color balance value AREA BLAN storing the color balance values in the area appointing mode of FIG. 57 are set in the Y, M, C and Bk regions of the RAM 177 which is selected when the gate signal GAREA 626 is "1". At the same time, data is set from BALANCE storing the color balance values in the color create mode are stored in the respective regions which are selected on condition of GAREA 626 is "0".

Figure 55:
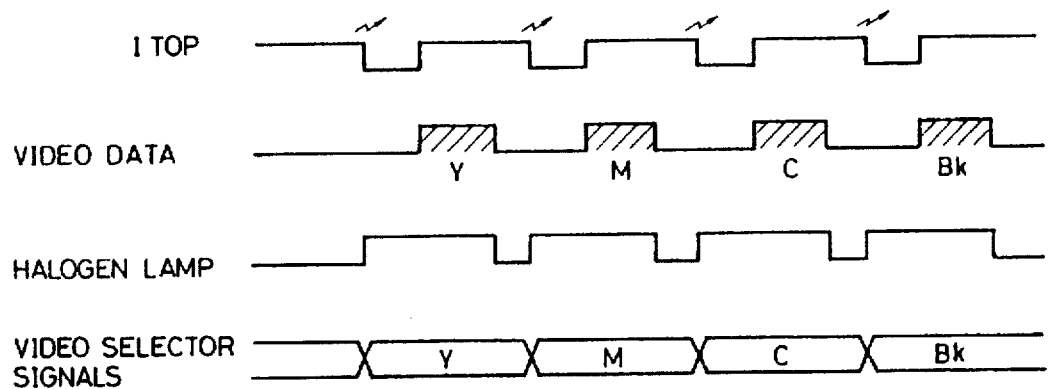
FIG. 55 is a time chart showing timing of operation of the whole system.

In Step S 109, a printer start instruction is given through the SRCOM 516. In Step S 110, ITOP shown in the timing chart of FIG. 55 is detected and, in Step S 111, operations such as change-over of the output video signals $C_0, C_1, C_2$ of Y, M, C and Bk are executed, followed by turning on of the halogen lamp in Step S 112. In Step S 113, completion of each video scan is judged and, if completed, the process proceeds to Step S 114 in which the halogen lamp is turned off. Then, checking for the completion of copying operation is executed in Steps S114 and S115. Upon confirmation of completion of the copying operation, a stopping instruction is given to the printer in Step S 116, thus finishing the copying operation.

Figure 56:
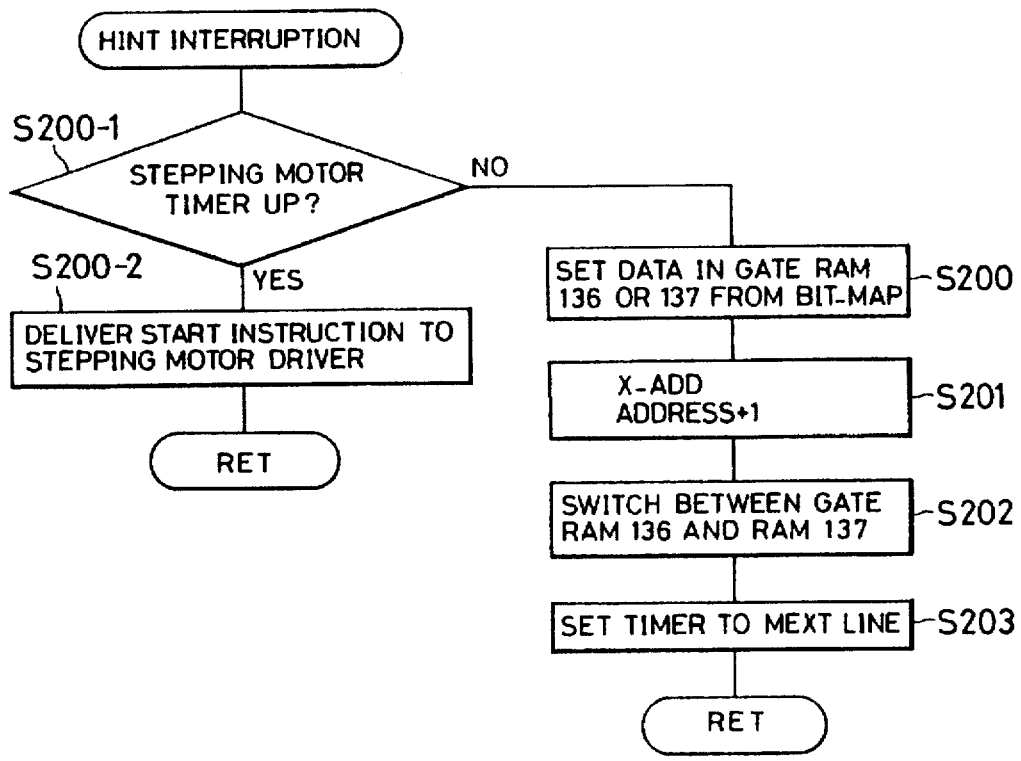
FIG. 56 is an interruption control flow chart.

FIG. 56 shows a flow chart of a process effected as a result of interruption by a signal HINT derived from the timer 28. In Step S 200-1, a judgment is conducted as to whether the timer for starting the stepping motor has counted up. If the counting has been finished, the stepping motor is started and, in Step S 200, the one-line BIT MAP data represented by X ADD in FIG. 50 is set in the RAM 136 or the RAM 137. In Step S 201, the data to be set in the next interruption is incremented by +1. In Step S 202, change-over signals $C_3595$, $C_4596$, $C_5593$ for changing over the RAMs 136 and 137 are issued and the time until the next switching of sub-scan is set in the timer 28 in Step S 203. Thereafter, the content of the BIT MAP expressed by ADD is successively set in the RAM 136 or the RAM 137 thereby switching the gate signal.

Thus, the processing in the X-direction is changed-over each time the interruption is generated as a result of the movement of the carriage in the direction of sub-scan, whereby various color processings such as color conversion can be effected on different areas independently of other areas.

As will be understood from the foregoing description, the color copying machine embodying the present invention realizes various color modes so as to enable the image to be reproduced with a high degree of freedom in color selection.

Although the invention has been described with specific reference to an electrophotographic color image forming apparatus, this is only illustrative and the invention can be carried out with various other types of recording methods such a ink jet recording, thermal transfer recording, and so forth. It is also possible to situate the reader and the printer (image forming section) at a distance from each other with a communication line connected therebetween so as to realize transmission of image information from a remote place, although the described embodiment is a copying machine in which the reader and the printer are located in the vicinity of each other.

What is claimed is:

1. A color image processing method comprising the steps of:

inputting a color image signal;

setting a discrimination mode for discriminating whether both of at least two components, which comprise hue information and density information obtained on the basis of the color image signal input by the input means, meet respective predetermined conditions, wherein in the discrimination mode set in said setting step, the respective predetermined conditions designate differing amounts of importance to said at least two components; and discriminating whether both of said at least two components meet the respective predetermined conditions in accordance with the discrimination mode set in said setting step.

2. A color image processing method according to claim 1, further comprising the step of converting a color to another color when it is discriminated that both of said at least two components meet respective predetermined conditions.

3. A color image processing method according to claim 1, wherein the respective predetermined conditions designate hue as being more important.

4. A color image processing method according to claim 1, wherein said predetermined conditions comprise both of said at least two components being larger than predetermined lower levels, and both of said at least two components being smaller than predetermined upper levels.

5. A color image processing method according to claim 1, wherein said discriminating step makes respectively different discriminations in accordance with the mode set in said setting step.

6. A method according to claim 1, wherein the hue information is based on a ratio of color component signals which comprise the color image signal.

7. A method according to claim 1, wherein the density information is based on amplitudes of a plurality of color component signals which comprise the color image signal.

8. A color image processing method according to claim 1, wherein said inputting step comprises the step of reading an original and generating the color image signal.

9. A color image processing method according to claim 8, wherein said predetermined conditions comprise both of said at least two components being larger than predetermined lower levels, and both of said at least two components being smaller than predetermined upper levels.

10. A color image processing method according to claim 9, wherein said predetermined lower levels and said predetermined upper levels are determined in accordance with the color image signal generated from said original.

11. A color image processing apparatus comprising:
inputting means for inputting a color image signal;
discriminating means for discriminating, in accordance with a discrimination mode, whether both of at least two components, which comprise hue information and density information obtained on the basis of the color image signal inputted by said inputting means, meet respective predetermined conditions; and
setting means for setting the discrimination mode for said discriminating means, wherein in the discrimination mode, the respective predetermined conditions designate differing amounts of importance to said at least two components.

12. A color image processing apparatus according to claim 11, wherein the respective predetermined conditions designate hue as being important.

13. A color image processing apparatus according to claim 11, comprising means for converting a color to another color when said discrimination means discriminates that both of said at least two components meet respective predetermined conditions.

14. A color image processing apparatus according to claim 11, wherein said predetermined conditions comprise both of said at least two components being larger than predetermined lower levels, and both of said at least two components being smaller than predetermined upper levels.

15. A color image processing apparatus according to claim 11, wherein said discriminating means makes respectively different discriminations in accordance with the mode set by said setting means.

16. A color image processing apparatus according to claim 11, further comprising manual designation means for permitting the designation of importance to be made manually.

17. An apparatus according to claim 11, wherein the hue information is based on a ratio of color component signals which comprise the color image signal.

18. An apparatus according to claim 11, wherein the density information is based on amplitudes of a plurality of color component signals which comprise the color image signal.

19. A color image processing apparatus according to claim 11, wherein said inputting means comprises means for reading an original and for generating the color image signal.

20. A color image processing apparatus according to claim 19, wherein said predetermined conditions comprise both of said at least two components being larger than predetermined lower levels, and both of said at least two components being smaller than predetermined upper levels.

21. A color image processing apparatus according to claim 20, wherein said predetermined lower levels and said predetermined upper levels are determined in accordance with the color image signal generated by said reading means.

22. A color copying apparatus comprising:
input means for inputting a color image signal corresponding to a color original;
discriminating means for discriminating, in accordance with a discrimination mode, whether both of at least two components, which comprise hue information and density information obtained on the basis of the color image signal inputted by said input means, meet respective predetermined conditions;
setting means for setting the discrimination mode for said discriminating means, wherein, in the discrimination mode set by said setting means, the respective predetermined conditions designate differing amounts of importance to said at least two components; and
output means for outputting the color image signal in accordance with a result of discrimination by said discriminating means.

23. A color copying apparatus according to claim 22, comprising means for converting a color to another color when said discriminating means discriminates that both of said at least two components meet respective predetermined conditions.

24. A color copying apparatus according to claim 22, wherein the respective predetermined conditions designate hue as being more important.

25. A color copying apparatus according to claim 22, wherein said predetermined conditions comprise both of said at least two components being larger than predetermined lower levels, and both of said at least two components being smaller than predetermined upper levels.

26. A color copying apparatus according to claim 22, wherein said discriminating means makes respectively different discriminations in accordance with the mode set by said setting means.

27. A color copying apparatus according to claim 22, further comprising manual designation means for permitting the designation of importance to be made manually.

28. An apparatus according to claim 22, wherein the hue information is based on a ratio of color component signals which comprise the color image signal.

29. An apparatus according to claim 22, wherein the density information is based on amplitudes of a plurality of color component signals which comprise the color image signal.

30. A color copying apparatus according to claim 22, wherein said input means comprises means for reading the original and for generating the color image signal.

31. A color copying apparatus according to claim 30, wherein said predetermined conditions comprise both of said at least two components being larger than predetermined lower levels, and both of said at least two components being smaller than predetermined upper levels.

32. A color copying apparatus according to claim 31, wherein said predetermined lower levels and said predetermined upper levels are determined in accordance with the color image signal generated by said reading means.

33. A color image processing apparatus comprising:

inputting means for inputting a color image signal;

discriminating means having a plurality of discrimination modes, each for discriminating whether both of at least two components, which comprise hue information and density information obtained on the basis of the color image signal inputted by said inputting means, meet respective predetermined conditions; and setting means for setting a discrimination mode of said discriminating means from among the plurality of discrimination modes, wherein in the discrimination mode set by said setting means, the respective predetermined conditions designate differing amounts of importance to said at least two components;

wherein the plurality of discrimination modes includes at least first and second discrimination modes, wherein said discriminating means discriminates whether one component of said at least two components meets a first predetermined condition in the first discrimination mode which is different from a condition in the second discrimination mode, and said discriminating means discriminates whether another component of said at least two components meets a second predetermined condition in the second discrimination mode.

34. A color image processing apparatus according to claim 33, further comprising manual designation means for permitting the designation of importance to be made manually.

35. An apparatus according to claim 33, wherein the hue information is based on a ratio of color component signals which comprise the color image signal.

36. An apparatus according to claim 33, wherein the density information is based on amplitudes of a plurality of color component signals which comprise the color image signal.

37. A color image processing method comprising the steps of:

inputting a color image signal;

discriminating, in accordance with a discrimination mode, whether both of at least two components, which include hue information and density information obtained on the basis of the color image signal input in the inputting step, meet respective predetermined conditions; and setting the discrimination mode of said discriminating step, wherein in the discrimination mode set in said setting step, the respective predetermined conditions designate differing amounts of importance to said at least two components.

38. A method according to claim 37, wherein the hue information is based on a ratio of color component signals which comprise the color image signal.

39. A method according to claim 37, wherein the density information is based on amplitudes of a plurality of color component signals which comprise the color image signal.

40. A color image processing apparatus comprising:

input means for inputting a color image signal;

discriminating means for discriminating, in accordance with a discrimination mode, whether both of at least two components, which comprise hue information and density information obtained on the basis of the color image signal inputted by said input means, meet respective predetermined conditions; and setting means for setting the discrimination mode of said discriminating means from among a plurality of discrimination modes, wherein in the discrimination mode set by said setting means, the respective predetermined conditions designate differing amounts of importance to said at least two components, the plurality of discrimination modes including first and second discrimination modes, wherein said discriminating means discriminates whether one component of said at least two components meets a first predetermined condition in the first mode which is different from a condition in the second discrimination mode, and said discriminating means discriminates whether another component of said at least two components meets a second predetermined condition in the second discrimination mode.

41. An apparatus according to claim 40, wherein the hue information is based on a ratio of color component signals which comprise the color image signal.

42. An apparatus according to claim 40, wherein the density information is based on amplitudes of a plurality of color component signals which comprise the color image signal.

* * * * *

UNITED STATES PATENT AND TRADEMARK OFFICE
CERTIFICATE OF CORRECTION

PATENT NO. : 5,726,779

DATED : March 10, 1998

INVENTORS : Kadowaki et al.

It is certified that error appears in the above-identified patent and that said Letters Patent is hereby corrected as shown below:

COLUMN 5

Line 27, "45(b)" should read --45(b) and 45(c)--.

COLUMN 12

Line 47, "Raper" should read --paper--.

COLUMN 13

Line 40, delete "10".

COLUMN 21

Line 19, "(-Cc11)" should read --(Cc1)--.

COLUMN 24

Line 28, "+_3," should read --+3,--.

UNITED STATES PATENT AND TRADEMARK OFFICE
CERTIFICATE OF CORRECTION

PATENT NO. : 5,726,779

DATED : March 10, 1998

INVENTORS : Kadowaki et al.

Page 2 of 2

It is certified that error appears in the above-identified patent and that said Letters Patent is hereby corrected as shown below:

COLUMN 41

Line 37, "S" should read --c--.

COLUMN 42

Line 12, "coot" should read --color--.

Line 31, "sat" should read --set--.

COLUMN 43

Line 10, "BIT MAP" should read --bit map--.

Signed and Sealed this

Twentieth Day of October, 1998

Attest:

BRUCE LEHMAN

*Attesting Officer*   *Commissioner of Patents and Trademarks*